US011063918B2

United States Patent
Winig et al.

(10) Patent No.: US 11,063,918 B2
(45) Date of Patent: *Jul. 13, 2021

(54) FACILITATING VIRTUAL TRANSPONDER UTILIZING INBAND TELEMETRY

(71) Applicant: The Boeing Company, Chicago, IL (US)

(72) Inventors: Robert J. Winig, Chicago, IL (US);
Kristina Miller, Chicago, IL (US);
Eric Anden, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,544

(22) Filed: Nov. 7, 2019

(65) Prior Publication Data

US 2020/0076775 A1 Mar. 5, 2020

Related U.S. Application Data

(63) Continuation of application No. 15/451,291, filed on Mar. 6, 2017, now Pat. No. 10,530,751.

(51) Int. Cl.
*H04L 29/06* (2006.01)
*H01Q 1/28* (2006.01)
(Continued)

(52) U.S. Cl.
CPC .......... *H04L 63/0428* (2013.01); *H01Q 1/28* (2013.01); *H01Q 3/24* (2013.01); *H04B 1/006* (2013.01);
(Continued)

(58) Field of Classification Search
CPC ........ H04L 63/0428; H01Q 1/28; H01Q 3/24; H04B 1/59; H04B 1/006; H04B 7/0408;
(Continued)

(56) References Cited

U.S. PATENT DOCUMENTS 5,701,603 A 12/1997 Norimatsu
6,125,261 A 9/2000 Anselmo et al.
(Continued)

FOREIGN PATENT DOCUMENTS

CN 1512711 A 7/2004
EP 1085680 3/2001
(Continued)

OTHER PUBLICATIONS

Pang et al., "CHIRP Program Lessons Learned From the Contractor Program Management Team Perspective", 2012 IEEE Aerospace Conference, Mar. 3, 2012, pp. 1-7, XP032230091, DOI: 10.1109/AERO.2012.6187278, ISBN: 978-1-4577-0556-4, IEEE.
(Continued)

*Primary Examiner* — Nelson S. Giddins
(74) *Attorney, Agent, or Firm* — Haynes and Boone, LLP

(57) ABSTRACT

Systems, methods, and apparatus for a virtual transponder utilizing inband telemetry are disclosed. A disclosed method for a virtual transponder utilizing inband telemetry comprises transmitting, by a hosted payload (HoP) operation center (HOC), encrypted hosted commands to a host spacecraft operations center (SOC). The method further comprises transmitting, by the host SOC, encrypted host commands and encrypted hosted commands to a vehicle. Also, the method comprises reconfiguring a payload on the vehicle according to unencrypted host commands and/or unencrypted hosted commands. In addition, the method comprises transmitting payload data to a host receiving antenna and/or a hosted receiving antenna. Also, the method comprises transmitting encrypted host telemetry to the host SOC. In addition, the method comprises transmitting encrypted hosted telemetry to the hosted receiving antenna. Further, the method comprises transmitting, by the hosted (Continued)

receiving antenna, the encrypted hosted telemetry to the HOC.

27 Claims, 47 Drawing Sheets

(51) Int. Cl.
*H01Q 3/24* (2006.01)
*H04B 7/185* (2006.01)
*H04B 1/00* (2006.01)

(52) U.S. Cl.
CPC ..... *H04B 7/18502* (2013.01); *H04B 7/18515* (2013.01)

(58) Field of Classification Search
CPC .. H04B 7/0695; H04B 7/088; H04B 7/18519; H04B 7/18593; H04B 7/18515; H04B 7/18502; H04W 12/02
See application file for complete search history.

(56) References Cited

U.S. PATENT DOCUMENTS

| | | |
|---|---|---|
| 7,542,716 B2 | 6/2009 | Bell et al. |
| 8,200,149 B1 | 6/2012 | Chen |
| 8,521,427 B1 | 8/2013 | Luyks |
| 8,614,945 B2 | 12/2013 | Brunnenmeyer |
| 8,873,456 B2 | 10/2014 | Krikorian et al. |
| 9,042,295 B1 | 5/2015 | Baiter et al. |
| 9,337,918 B2 | 5/2016 | Bell et al. |
| 9,876,563 B1 | 1/2018 | Coleman et al. |
| 2002/0104920 A1 | 8/2002 | Thompson et al. |
| 2003/0017827 A1 | 1/2003 | Ciaburro et al. |
| 2004/0072561 A1 | 4/2004 | LaPrade |
| 2007/0133528 A1 | 6/2007 | Jin et al. |
| 2007/0139143 A1 | 6/2007 | Rumer |
| 2008/0055151 A1 | 3/2008 | Hudson et al. |
| 2008/0149776 A1 | 6/2008 | Benedict |
| 2008/0153414 A1* | 6/2008 | Ho .............. H04B 7/18515 455/12.1 |
| 2009/0052369 A1 | 2/2009 | Atkinson et al. |
| 2012/0259485 A1 | 10/2012 | Boileau et al. |
| 2013/0046422 A1 | 2/2013 | Cabos |
| 2013/0046819 A1 | 2/2013 | Bocirnea |
| 2013/0077788 A1 | 3/2013 | Blanchard et al. |
| 2013/0137365 A1 | 5/2013 | Taylor |
| 2014/0099986 A1 | 4/2014 | Kikuchi et al. |
| 2014/0119385 A1 | 5/2014 | Hoffmeyer et al. |
| 2014/0303813 A1 | 10/2014 | Ihns |
| 2015/0162955 A1 | 6/2015 | Burch |
| 2015/0203213 A1 | 7/2015 | Levien et al. |
| 2015/0284109 A1 | 10/2015 | Newton et al. |
| 2016/0087713 A1 | 3/2016 | Oderman et al. |
| 2017/0012697 A1 | 1/2017 | Gong et al. |
| 2017/0041065 A1 | 2/2017 | Goettle, Jr. et al. |
| 2017/0134103 A1* | 5/2017 | Tessandori ............ H04W 24/08 |
| 2018/0198516 A1 | 7/2018 | Garcia et al. |
| 2018/0234496 A1 | 8/2018 | Ratias |
| 2018/0254822 A1 | 9/2018 | Miller et al. |
| 2018/0254823 A1 | 9/2018 | Miller et al. |
| 2018/0254866 A1 | 9/2018 | Chen et al. |
| 2018/0255024 A1 | 9/2018 | Chen et al. |
| 2018/0255025 A1 | 9/2018 | Chen et al. |
| 2018/0255026 A1 | 9/2018 | Winig et al. |
| 2018/0255027 A1 | 9/2018 | Winig et al. |
| 2018/0255455 A1 | 9/2018 | Winig et al. |
| 2019/0082319 A1 | 3/2019 | Chen et al. |

FOREIGN PATENT DOCUMENTS

| | | |
|---|---|---|
| EP | 1936833 | 6/2008 |
| EP | 1950893 A1 | 7/2008 |
| EP | 2573956 | 3/2013 |
| EP | 2881331 | 6/2015 |
| JP | 2000166046 | 6/2000 |
| RU | 2600564 C2 | 10/2016 |
| WO | WO 1996/032568 | 10/1996 |
| WO | WO 1999/040693 | 8/1999 |
| WO | WO 2013/130812 | 9/2013 |

OTHER PUBLICATIONS

Halimi et al., "Applicability of Asymmetric Cryptography for Space Data Links Security Systems", 2016 IEEE Aerospace Conference, Mar. 5, 2016, pp. 1-13, IEEE.

Office Action dated Mar. 3, 2021 from related Russian application No. 2018103722/07(005373), 14 pages, original and English translation.

First Offic Action dated Apr. 16, 2021 from related Chinese Patent Application No. 2018101911753, original and translation, 20 pages.

* cited by examiner

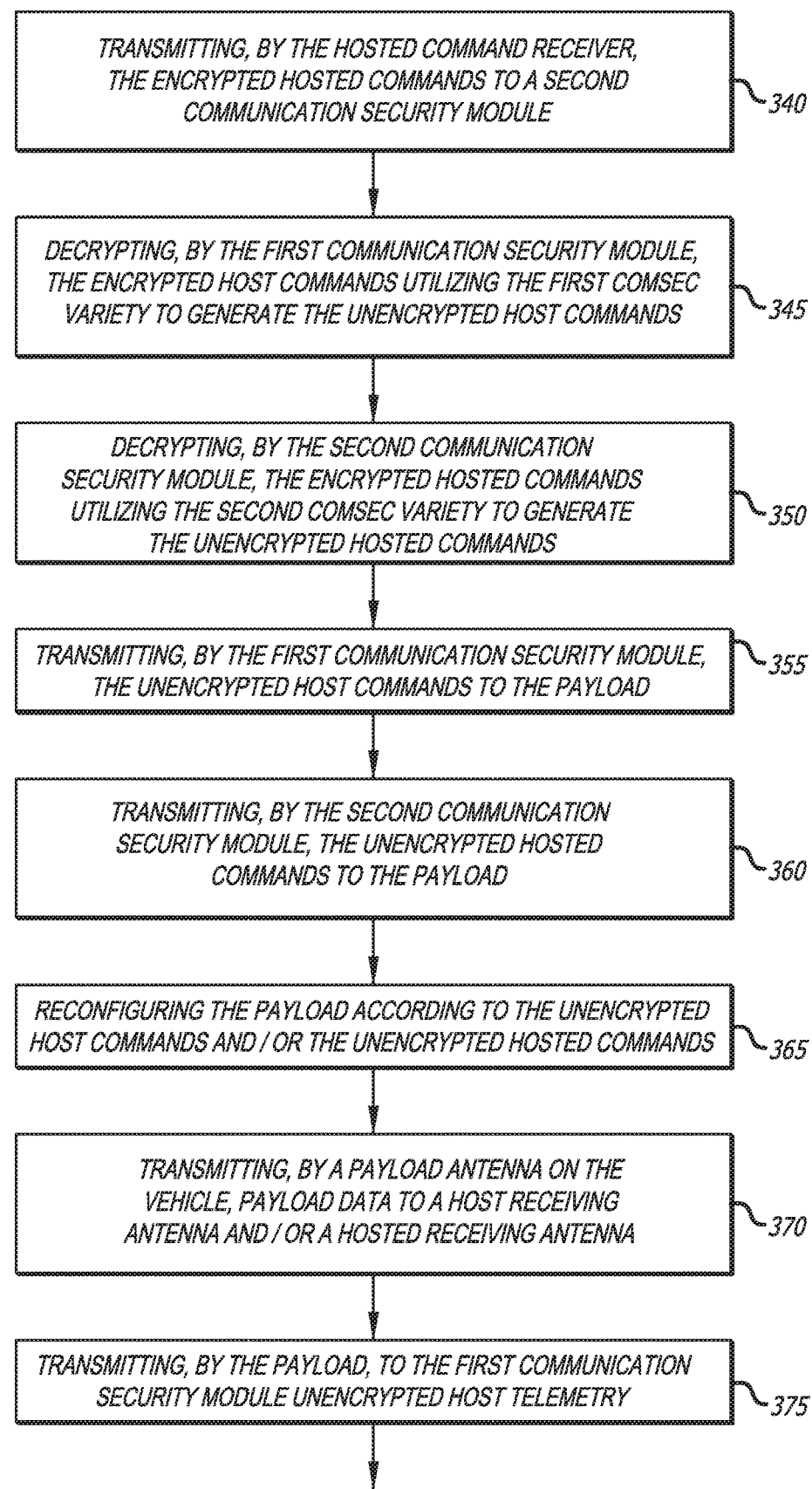

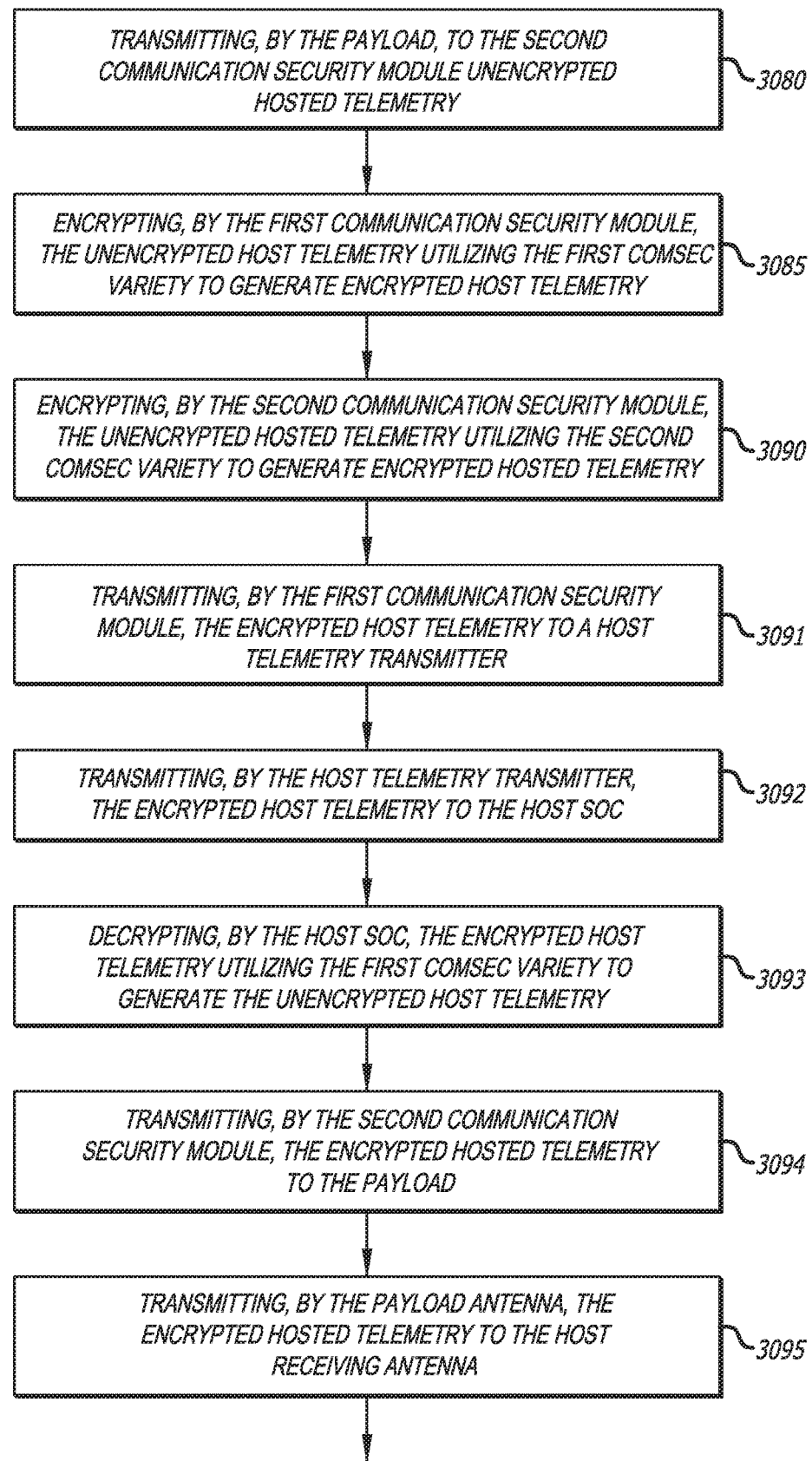

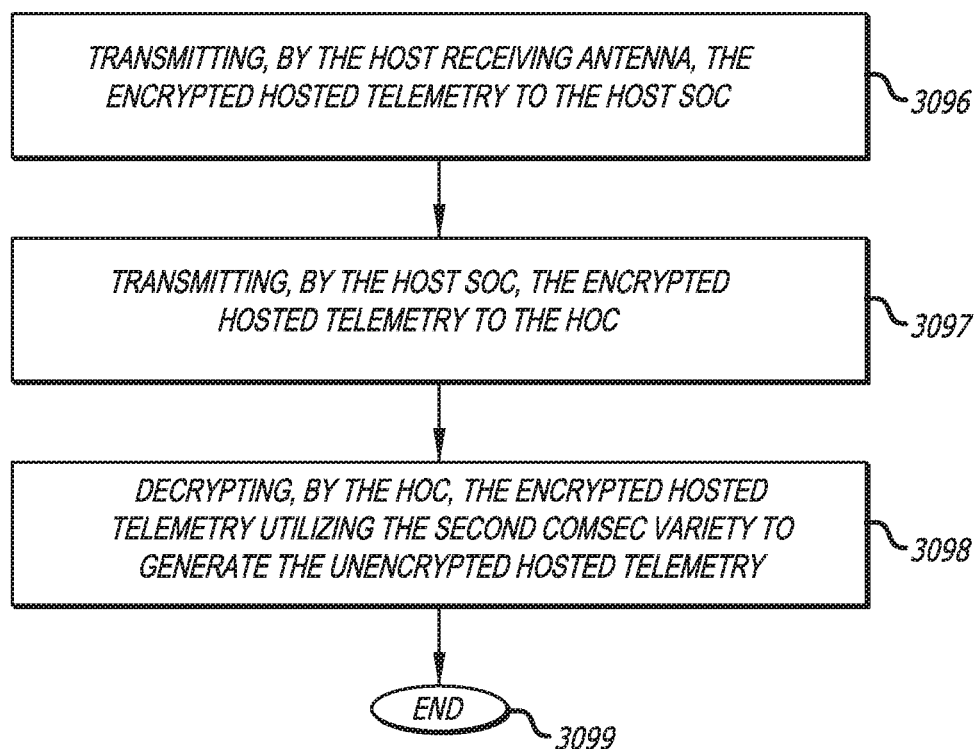

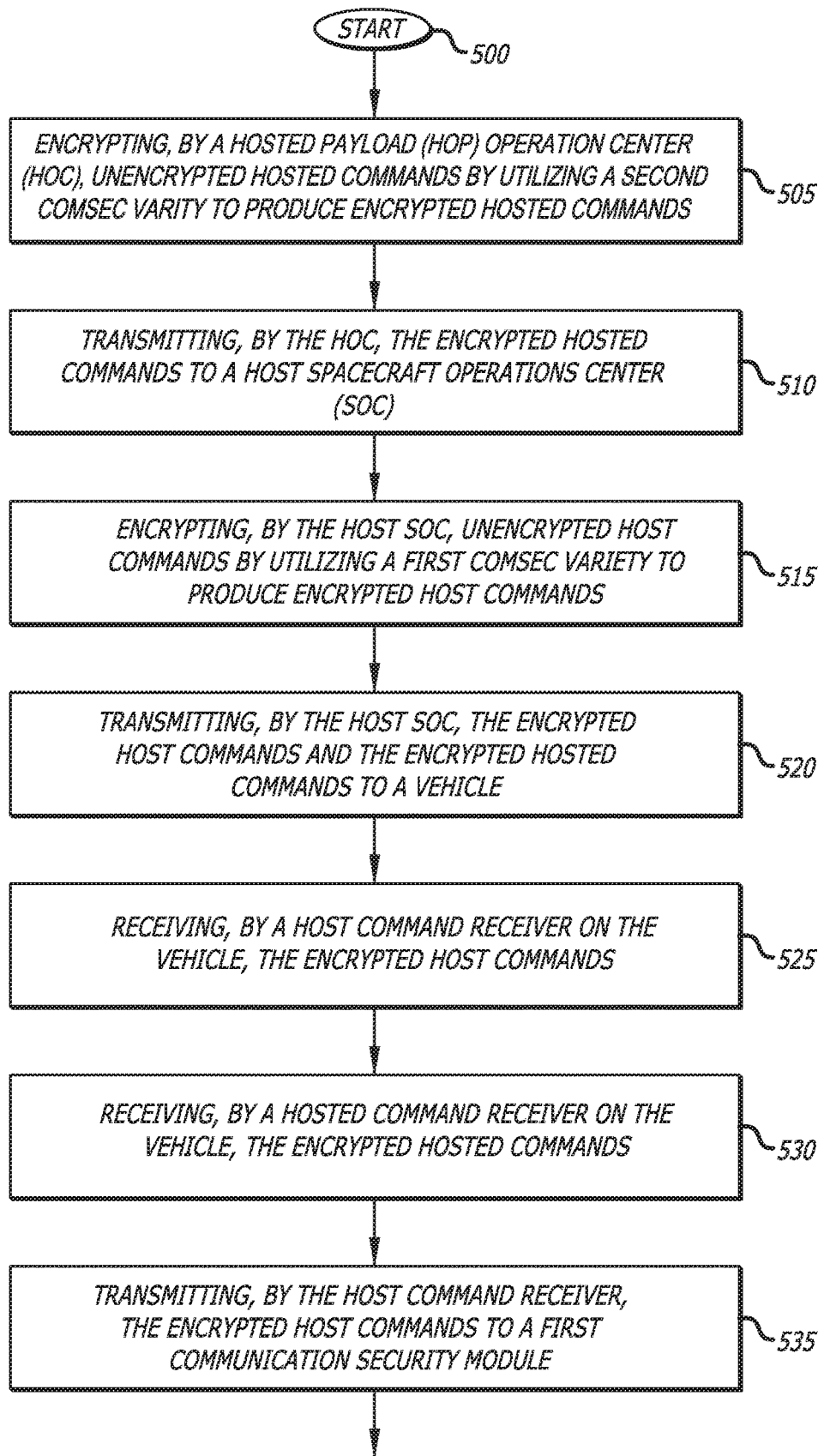

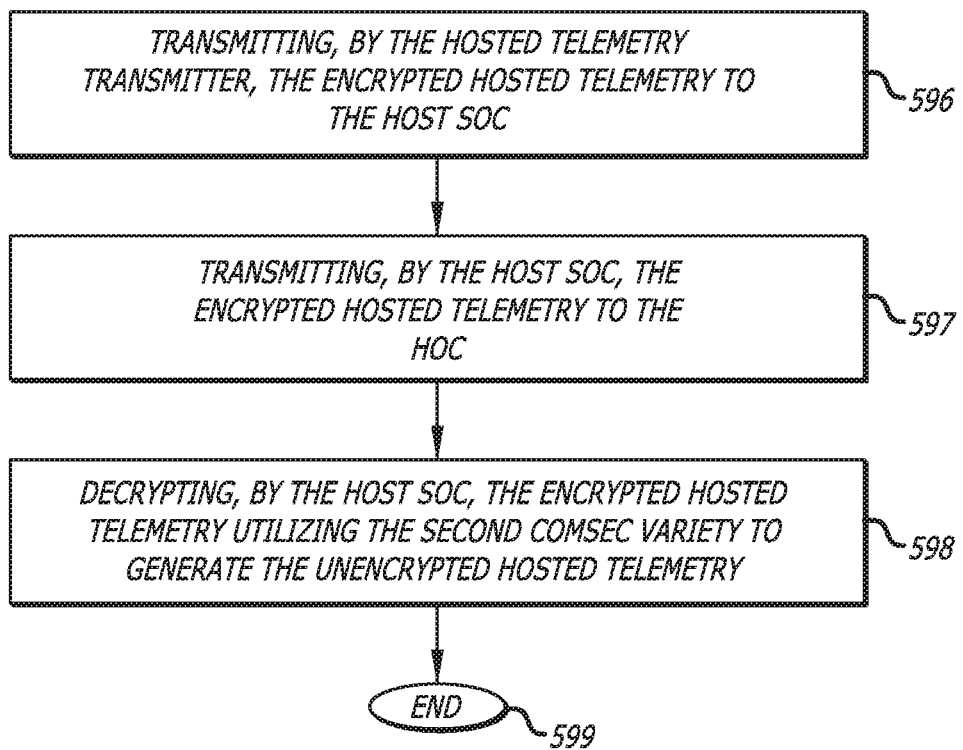

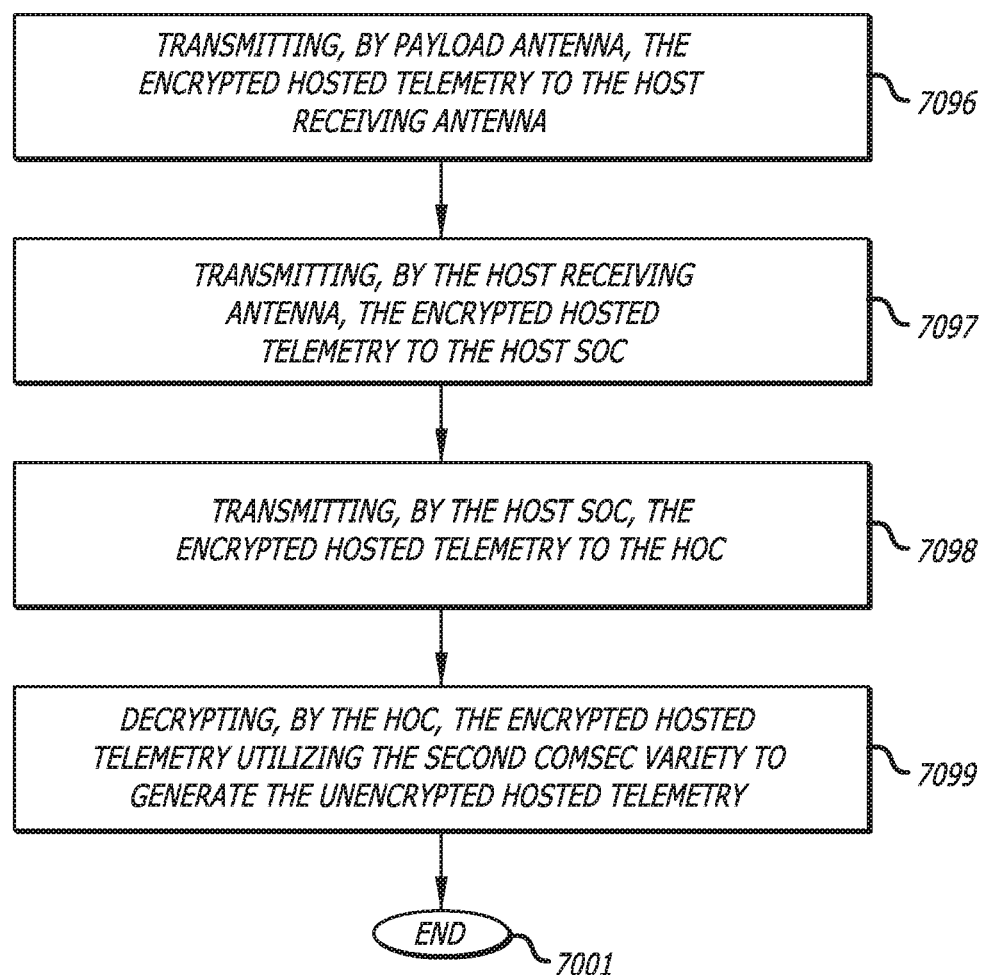

FACILITATING VIRTUAL TRANSPONDER UTILIZING INBAND TELEMETRY

CROSS-REFERENCE TO RELATED APPLICATION

This application is a Continuation application of, and claims priority to and the benefit of, U.S. patent application Ser. No. 15/451,291, filed on Mar. 6, 2017, the entire disclosure of which is expressly incorporated by reference herein.

FIELD

The present disclosure relates to virtual transponders. In particular, it relates to virtual transponders utilizing inband telemetry.

BACKGROUND

Currently, typical transponders on a vehicle (e.g., a satellite) have the ability to perform switching of inputs to outputs of the payload. All of this switching on the payload is commanded and controlled by a single satellite controller with no resource allocation privacy. For example, in a digital transponder, when a user request for a channel with specific bandwidth and antenna characteristics is made, the channel is then set up, used, and then disconnected.

As such, there is a need for an improved transponder design that allows for privacy in the allocation of resources on the payload.

SUMMARY

The present disclosure relates to a method, system, and apparatus for virtual transponders utilizing inband telemetry. In one or more embodiments, a method for a virtual transponder utilizing inband telemetry comprises transmitting, by a hosted payload (HoP) operation center (HOC), encrypted hosted commands to a host spacecraft operations center (SOC). The method further comprises transmitting, by the host SOC, encrypted host commands and the encrypted hosted commands to a vehicle, where the encrypted host commands are encrypted utilizing a first communication security (COMSEC) variety and the encrypted hosted commands are encrypted utilizing a second COMSEC variety. Also, the method comprises decrypting, by a first communication security module on the vehicle, the encrypted host commands utilizing the first COMSEC variety to generate unencrypted host commands. In addition, the method comprises decrypting, by a second communication security module on the vehicle, the encrypted hosted commands utilizing the second COMSEC variety to generate unencrypted hosted commands. Additionally, the method comprises reconfiguring a payload on the vehicle according to the unencrypted host commands and/or the unencrypted hosted commands. Also, the method comprises transmitting, by a payload antenna on the vehicle, payload data to a host receiving antenna and/or a hosted receiving antenna. Additionally, the method comprises encrypting, by the first communication security module, unencrypted host telemetry from the payload by utilizing the first COMSEC variety to generate encrypted host telemetry. In addition, the method comprises encrypting, by the second communication security module, unencrypted hosted telemetry from the payload by utilizing the second COMSEC variety to generate encrypted hosted telemetry. Also, the method comprises transmitting, by a host telemetry transmitter on the vehicle, the encrypted host telemetry to the host SOC. Additionally, the method comprises transmitting, by the payload antenna, the encrypted hosted telemetry to the hosted receiving antenna. Further, the method comprises transmitting, by the hosted receiving antenna, the encrypted hosted telemetry to the HOC.

In one or more embodiments, the reconfiguring of the payload according to the unencrypted host commands and/or the unencrypted hosted commands comprises adjusting transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, and/or beam steering.

In at least one embodiment, the reconfiguring of the payload according to the unencrypted host commands and/or the unencrypted hosted commands comprises reconfiguring at least one antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, the vehicle is an airborne vehicle. In at least one embodiment, the airborne vehicle is a satellite, aircraft, unmanned aerial vehicle (UAV), or space plane.

In at least one embodiment, the method further comprises encrypting, by the host SOC, the unencrypted host commands by utilizing the first COMSEC variety to produce the encrypted host commands. In addition, the method comprises encrypting, by the HOC, the unencrypted hosted commands by utilizing the second COMSEC variety to produce the encrypted hosted commands.

In at least one embodiment, the method further comprises receiving, by a host command receiver on the vehicle, the encrypted host commands. Also, the method comprises receiving, by a hosted command receiver on the vehicle, the encrypted hosted commands. In addition, the method comprises transmitting, by the host command receiver, the encrypted host commands to the first communication security module. Further, the method comprises transmitting, by the hosted command receiver, the encrypted hosted commands to the second communication security module.

In one or more embodiments, the method further comprises transmitting, by the first communication security module, the unencrypted host commands to the payload. Also, the method comprises transmitting, by the second communication security module, the unencrypted hosted commands to the payload.

In at least one embodiment, the method further comprises transmitting, by the payload, to the first communication security module the unencrypted host telemetry. Also, the method comprises transmitting, by the payload, to the second communication security module the unencrypted hosted telemetry.

In one or more embodiments, the method further comprises transmitting, by the first communication security module, the encrypted host telemetry to a host telemetry transmitter. In addition, the method comprises transmitting, by the second communication security module, the encrypted hosted telemetry to the payload.

In at least one embodiment, the method further comprises decrypting, by the host SOC, the encrypted host telemetry utilizing the first COMSEC variety to generate the unencrypted host telemetry. Also, the method comprises decrypting, by the HOC, the encrypted hosted telemetry utilizing the second COMSEC variety to generate the unencrypted hosted telemetry.

In one or more embodiments, a method for a virtual transponder utilizing inband telemetry comprises transmitting, by a hosted payload (HoP) operation center (HOC), encrypted hosted commands to a host spacecraft operations center (SOC). The method further comprises transmitting, by the host SOC, encrypted host commands and the encrypted hosted commands to a vehicle, where the encrypted host commands are encrypted utilizing a first COMSEC variety and the encrypted hosted commands are encrypted utilizing a second COMSEC variety. Also, the method comprises decrypting, by a first communication security module on the vehicle, the encrypted host commands utilizing the first COMSEC variety to generate unencrypted host commands. In addition, the method comprises decrypting, by a second communication security module on the vehicle, the encrypted hosted commands utilizing the second COMSEC variety to generate unencrypted hosted commands. Additionally, the method comprises reconfiguring a payload on the vehicle according to the unencrypted host commands and/or the unencrypted hosted commands. Also, the method comprises transmitting, by a payload antenna on the vehicle, payload data to a host receiving antenna and/or a hosted receiving antenna. In addition, the method comprises encrypting, by the first communication security module, unencrypted host telemetry from the payload by utilizing the first COMSEC variety to generate encrypted host telemetry. Also, the method comprises encrypting, by the second communication security module, unencrypted hosted telemetry from the payload by utilizing the second COMSEC variety to generate encrypted hosted telemetry. In addition, the method comprises transmitting, by the payload antenna, the encrypted host telemetry to the host receiving antenna. Also, the method comprises transmitting, by the host receiving antenna, the encrypted host telemetry to the host SOC. In addition, the method comprises transmitting, by a hosted telemetry transmitter on the vehicle, the encrypted hosted telemetry to the host SOC. Further, the method comprises transmitting, by the host SOC, the encrypted hosted telemetry to the HOC.

In at least one embodiment, a method for a virtual transponder utilizing inband telemetry comprises transmitting, by a hosted payload (HoP) operation center (HOC), encrypted hosted commands to a host spacecraft operations center (SOC). The method further comprises transmitting, by the host SOC, encrypted host commands and the encrypted hosted commands to a vehicle, where the encrypted host commands are encrypted utilizing a first COMSEC variety and the encrypted hosted commands are encrypted utilizing a second COMSEC variety. Also, the method comprises decrypting, by a first communication security module on the vehicle, the encrypted host commands utilizing the first COMSEC variety to generate unencrypted host commands. In addition, the method comprises decrypting, by a second communication security module on the vehicle, the encrypted hosted commands utilizing the second COMSEC variety to generate unencrypted hosted commands. Additionally, the method comprises reconfiguring a payload on the vehicle according to the unencrypted host commands and/or the unencrypted hosted commands. Also, the method comprises transmitting, by a payload antenna on the vehicle, payload data to a host receiving antenna and/or a hosted receiving antenna. In addition, the method comprises encrypting, by the first communication security module, unencrypted host telemetry from the payload by utilizing the first COMSEC variety to generate encrypted host telemetry. Also, the method comprises encrypting, by the second communication security module, unencrypted hosted telemetry from the payload by utilizing the second COMSEC variety to generate encrypted hosted telemetry. In addition, the method comprises transmitting, by the payload antenna, the encrypted host telemetry to the host receiving antenna. Additionally, the method comprises transmitting, by the host receiving antenna, the encrypted host telemetry to the host SOC. Also, the method comprises transmitting, by the payload antenna, the encrypted hosted telemetry to the hosted receiving antenna. Further, the method comprises transmitting, by the hosted receiving antenna, the encrypted hosted telemetry to the HOC.

In one or more embodiments, a method for a virtual transponder utilizing inband telemetry comprises transmitting, by a hosted payload (HoP) operation center (HOC), encrypted hosted commands to a host spacecraft operations center (SOC). The method further comprises transmitting, by the host SOC, encrypted host commands and the encrypted hosted commands to a vehicle. Also, the method comprises decrypting, by a first communication security module, the encrypted host commands utilizing a first communication security (COMSEC) variety to generate unencrypted host commands. In addition, the method comprises decrypting, by a second communication security module, the encrypted hosted commands utilizing a second COMSEC variety to generate unencrypted hosted commands. Additionally, the method comprises reconfiguring the payload according to the unencrypted host commands and/or the unencrypted hosted commands. Also, the method comprises transmitting, by a payload antenna on the vehicle, payload data to a host receiving antenna and/or a hosted receiving antenna. In addition, the method comprises encrypting, by the first communication security module, unencrypted telemetry utilizing the first COMSEC variety to generate encrypted telemetry. Additionally, the method comprises transmitting, by the payload antenna, the encrypted telemetry to the host receiving antenna. Also, the method comprises transmitting, by the host receiving antenna, the encrypted telemetry to the host SOC. In addition, the method comprises transmitting, by the payload antenna, the encrypted telemetry to the hosted receiving antenna. Further, the method comprises transmitting, by the hosted receiving antenna, the encrypted telemetry to the HOC.

In at least one embodiment, a system for a virtual transponder utilizing inband telemetry comprises a hosted payload (HoP) operation center (HOC) to transmit encrypted hosted commands to a host spacecraft operations center (SOC). The system further comprises the host SOC to transmit encrypted host commands and the encrypted hosted commands to a vehicle, wherein the encrypted host commands are encrypted utilizing a first communication security (COMSEC) variety and the encrypted hosted commands are encrypted utilizing a second COMSEC variety. Also, the system comprises a first communication security module on the vehicle to decrypt the encrypted host commands utilizing the first COMSEC variety to generate unencrypted host commands. In addition, the system comprises a second communication security module on the vehicle to decrypt the encrypted hosted commands utilizing the second COMSEC variety to generate unencrypted hosted commands. Additionally, the system comprises a payload on the vehicle reconfigured according to the unencrypted host commands and/or the unencrypted hosted commands. Also, the system comprises a payload antenna on the vehicle to transmit payload data to a host receiving antenna and/or a hosted receiving antenna. In addition, the system comprises the first communication security module to encrypt unencrypted host telemetry from the payload by utilizing the first COMSEC variety to generate encrypted host telemetry. Additionally, the system comprises the second communication security module to encrypt unencrypted hosted telemetry from the payload by utilizing the second COMSEC variety to generate encrypted hosted telemetry. Also, the system comprises a host telemetry transmitter on the vehicle to transmit the encrypted host telemetry to the host SOC. In addition, the system comprises the payload antenna to transmit the encrypted hosted telemetry to the hosted receiving antenna. Further, the system comprises the hosted receiving antenna to transmit the encrypted hosted telemetry to the HOC.

In one or more embodiments, a system for a virtual transponder utilizing inband telemetry comprising a hosted payload (HoP) operation center (HOC) to transmit encrypted hosted commands to a host spacecraft operations center (SOC). The system further comprises the host SOC to transmit encrypted host commands and the encrypted hosted commands to a vehicle, wherein the encrypted host commands are encrypted utilizing a first communication security (COMSEC) variety and the encrypted hosted commands are encrypted utilizing a second COMSEC variety. Also, the system comprises a first communication security module on the vehicle to decrypt the encrypted host commands utilizing the first COMSEC variety to generate unencrypted host commands. In addition, the system comprises a second communication security module on the vehicle to decrypt the encrypted hosted commands utilizing the second COMSEC variety to generate unencrypted hosted commands. Additionally, the system comprises a payload on the vehicle reconfigured according to the unencrypted host commands and/or the unencrypted hosted commands. Also, the system comprises a payload antenna on the vehicle to transmit payload data to a host receiving antenna and/or a hosted receiving antenna. In addition, the system comprises the first communication security module to encrypt unencrypted host telemetry from the payload by utilizing the first COMSEC variety to generate encrypted host telemetry. Additionally, the system comprises the second communication security module to encrypt unencrypted hosted telemetry from the payload by utilizing the second COMSEC variety to generate encrypted hosted telemetry. Also, the system comprises the payload antenna to transmit the encrypted host telemetry to the host receiving antenna. Also, the system comprises the host receiving antenna to transmit the encrypted host telemetry to the host SOC. In addition, the system comprises a hosted telemetry transmitter on the vehicle to transmit the encrypted hosted telemetry to the host SOC. Further, the system comprises the host SOC to transmit the encrypted hosted telemetry to the HOC.

In at least one embodiment, a system for a virtual transponder utilizing inband telemetry comprises a hosted payload (HoP) operation center (HOC) to transmit encrypted hosted commands to a host spacecraft operations center (SOC). The system further comprises the host SOC to transmit encrypted host commands and the encrypted hosted commands to a vehicle, where the encrypted host commands are encrypted utilizing a first communication security (COMSEC) variety and the encrypted hosted commands are encrypted utilizing a second COMSEC variety. Also, the system comprises a first communication security module on the vehicle to decrypt the encrypted host commands utilizing the first COMSEC variety to generate unencrypted host commands. In addition, the system comprises a second communication security module on the vehicle to decrypt the encrypted hosted commands utilizing the second COMSEC variety to generate unencrypted hosted commands. Additionally, the system comprises a payload on the vehicle reconfigured according to the unencrypted host commands and/or the unencrypted hosted commands. Also, the system comprises a payload antenna on the vehicle to transmit payload data to a host receiving antenna and/or a hosted receiving antenna. In addition, the system comprises the first communication security module to encrypt unencrypted host telemetry from the payload by utilizing the first COMSEC variety to generate encrypted host telemetry. Additionally, the system comprises the second communication security module to encrypt unencrypted hosted telemetry from the payload by utilizing the second COMSEC variety to generate encrypted hosted telemetry. Also, the system comprises the payload antenna to transmit the encrypted host telemetry to the host receiving antenna. In addition, the system comprises the host receiving antenna to transmit the encrypted host telemetry to the host SOC. Additionally, the system comprises the payload antenna to transmit the encrypted hosted telemetry to the hosted receiving antenna. Further, the system comprises the hosted receiving antenna to transmit the encrypted hosted telemetry to the HOC.

In one or more embodiments, a system for a virtual transponder utilizing inband telemetry comprises a hosted payload (HoP) operation center (HOC) to transmit encrypted hosted commands to a host spacecraft operations center (SOC). The system further comprises the host SOC to transmit encrypted host commands and the encrypted hosted commands to a vehicle. Also, the system comprises a first communication security module to decrypt the encrypted host commands utilizing a first communication security (COMSEC) variety to generate unencrypted host commands. In addition, the system comprises a second communication security module to decrypt the encrypted hosted commands utilizing a second COMSEC variety to generate unencrypted hosted commands. Additionally, the system comprises a payload on the vehicle reconfigured according to the unencrypted host commands and/or the unencrypted hosted commands. Also, the system comprises a payload antenna on the vehicle to transmit payload data to a host receiving antenna and/or a hosted receiving antenna. In addition, the system comprises the first communication security module to encrypt unencrypted telemetry utilizing the first COMSEC variety to generate encrypted telemetry. Additionally, the system comprises the payload antenna to transmit the encrypted telemetry to the host receiving antenna. Also, the system comprises the host receiving antenna to transmit the encrypted telemetry to the host SOC. In addition, the system comprises the payload antenna to transmit the encrypted telemetry to the hosted receiving antenna. Further, the system comprises the hosted receiving antenna to transmit the encrypted telemetry to the HOC.

In one or more embodiments, a method for a virtual transponder utilizing inband telemetry comprises transmitting, by a hosted payload (HoP) operation center (HOC), encrypted hosted commands to a host spacecraft operations center (SOC). The method further comprises transmitting, by the host SOC, encrypted host commands and the encrypted hosted commands to a vehicle, where the encrypted host commands are encrypted utilizing a first communication security (COMSEC) variety and the encrypted hosted commands are encrypted utilizing a second COMSEC variety. Also, the method comprises decrypting, by a first communication security module on the vehicle, the encrypted host commands utilizing the first COMSEC variety to generate unencrypted host commands. In addition, the method comprises decrypting, by a second communication security module on the vehicle, the encrypted hosted commands utilizing the second COMSEC variety to generate unencrypted hosted commands. Additionally, the method comprises reconfiguring a payload on the vehicle according to the unencrypted host commands and/or the unencrypted hosted commands. Also, the method comprises transmitting, by a payload antenna on the vehicle, payload data to a host receiving antenna and/or a hosted receiving antenna. Additionally, the method comprises encrypting, by the first communication security module, unencrypted host telemetry from the payload by utilizing the first COMSEC variety to generate encrypted host telemetry. In addition, the method comprises encrypting, by the second communication security module, unencrypted hosted telemetry from the payload by utilizing the second COMSEC variety to generate encrypted hosted telemetry. Also, the method comprises transmitting, by a host telemetry transmitter on the vehicle, the encrypted host telemetry to the host SOC. Additionally, the method comprises transmitting, by the payload antenna, the encrypted hosted telemetry to the host receiving antenna. Also, the method comprises transmitting, by the host receiving antenna, the encrypted hosted telemetry to the host SOC. Further, the method comprises transmitting, by the host SOC, the encrypted hosted telemetry to the HOC.

In at least one embodiment, a method for a virtual transponder utilizing inband telemetry comprises transmitting, by a hosted payload (HoP) operation center (HOC), encrypted hosted commands to a host spacecraft operations center (SOC). The method further comprises transmitting, by the host SOC, encrypted host commands and the encrypted hosted commands to a vehicle, where the encrypted host commands are encrypted utilizing a first COMSEC variety and the encrypted hosted commands are encrypted utilizing a second COMSEC variety. Also, the method comprises decrypting, by a first communication security module on the vehicle, the encrypted host commands utilizing the first COMSEC variety to generate unencrypted host commands. In addition, the method comprises decrypting, by a second communication security module on the vehicle, the encrypted hosted commands utilizing the second COMSEC variety to generate unencrypted hosted commands. Additionally, the method comprises reconfiguring a payload on the vehicle according to the unencrypted host commands and/or the unencrypted hosted commands. Also, the method comprises transmitting, by a payload antenna on the vehicle, payload data to a host receiving antenna and/or a hosted receiving antenna. In addition, the method comprises encrypting, by the first communication security module, unencrypted host telemetry from the payload by utilizing the first COMSEC variety to generate encrypted host telemetry. Also, the method comprises encrypting, by the second communication security module, unencrypted hosted telemetry from the payload by utilizing the second COMSEC variety to generate encrypted hosted telemetry. In addition, the method comprises transmitting, by the payload antenna, the encrypted host telemetry and the encrypted hosted telemetry to the host receiving antenna. Additionally, the method comprises transmitting, by the host receiving antenna, the encrypted host telemetry and the encrypted hosted telemetry to the host SOC. Further, the method comprises transmitting, by the host SOC, the encrypted hosted telemetry to the HOC.

In one or more embodiments, a method for a virtual transponder utilizing inband telemetry comprises transmitting, by a hosted payload (HoP) operation center (HOC), encrypted hosted commands to a host spacecraft operations center (SOC). The method further comprises transmitting, by the host SOC, encrypted host commands and the encrypted hosted commands to a vehicle. Also, the method comprises decrypting, by a first communication security module, the encrypted host commands utilizing a first communication security (COMSEC) variety to generate unencrypted host commands. In addition, the method comprises decrypting, by a second communication security module, the encrypted hosted commands utilizing a second COMSEC variety to generate unencrypted hosted commands. Additionally, the method comprises reconfiguring the payload according to the unencrypted host commands and/or the unencrypted hosted commands. Also, the method comprises transmitting, by a payload antenna on the vehicle, payload data to a host receiving antenna and/or a hosted receiving antenna. In addition, the method comprises encrypting, by the first communication security module, unencrypted telemetry utilizing the first COMSEC variety to generate encrypted telemetry. Additionally, the method comprises transmitting, by the payload antenna, the encrypted telemetry to the host receiving antenna. Also, the method comprises transmitting, by the host receiving antenna, the encrypted telemetry to the host SOC. In addition, the method comprises transmitting, by the payload antenna, the encrypted telemetry to the host receiving antenna. Also, the method comprises transmitting, by the host receiving antenna, the encrypted telemetry to the host SOC. Further, the method comprises transmitting, by the host SOC, the encrypted telemetry to the HOC.

In at least one embodiment, a system for a virtual transponder utilizing inband telemetry comprises a hosted payload (HoP) operation center (HOC) to transmit encrypted hosted commands to a host spacecraft operations center (SOC). The system further comprises the host SOC to transmit encrypted host commands and the encrypted hosted commands to a vehicle, wherein the encrypted host commands are encrypted utilizing a first communication security (COMSEC) variety and the encrypted hosted commands are encrypted utilizing a second COMSEC variety. Also, the system comprises a first communication security module on the vehicle to decrypt the encrypted host commands utilizing the first COMSEC variety to generate unencrypted host commands. In addition, the system comprises a second communication security module on the vehicle to decrypt the encrypted hosted commands utilizing the second COMSEC variety to generate unencrypted hosted commands. Additionally, the system comprises a payload on the vehicle reconfigured according to the unencrypted host commands and/or the unencrypted hosted commands. Also, the system comprises a payload antenna on the vehicle to transmit payload data to a host receiving antenna and/or a hosted receiving antenna. In addition, the system comprises the first communication security module to encrypt unencrypted host telemetry from the payload by utilizing the first COMSEC variety to generate encrypted host telemetry. Additionally, the system comprises the second communication security module to encrypt unencrypted hosted telemetry from the payload by utilizing the second COMSEC variety to generate encrypted hosted telemetry. Also, the system comprises a host telemetry transmitter on the vehicle to transmit the encrypted host telemetry to the host SOC. In addition, the system comprises the payload antenna to transmit the encrypted hosted telemetry to the host receiving antenna.

Also, the system comprises the host receiving antenna to transmit the encrypted hosted telemetry to the host SOC. Further, the system comprises the host SOC to transmit the encrypted hosted telemetry to the HOC.

In at least one embodiment, a system for a virtual transponder utilizing inband telemetry comprises a hosted payload (HoP) operation center (HOC) to transmit encrypted hosted commands to a host spacecraft operations center (SOC). The system further comprises the host SOC to transmit encrypted host commands and the encrypted hosted commands to a vehicle, where the encrypted host commands are encrypted utilizing a first communication security (COMSEC) variety and the encrypted hosted commands are encrypted utilizing a second COMSEC variety. Also, the system comprises a first communication security module on the vehicle to decrypt the encrypted host commands utilizing the first COMSEC variety to generate unencrypted host commands. In addition, the system comprises a second communication security module on the vehicle to decrypt the encrypted hosted commands utilizing the second COMSEC variety to generate unencrypted hosted commands. Additionally, the system comprises a payload on the vehicle reconfigured according to the unencrypted host commands and/or the unencrypted hosted commands. Also, the system comprises a payload antenna on the vehicle to transmit payload data to a host receiving antenna and/or a hosted receiving antenna. In addition, the system comprises the first communication security module to encrypt unencrypted host telemetry from the payload by utilizing the first COMSEC variety to generate encrypted host telemetry. Additionally, the system comprises the second communication security module to encrypt unencrypted hosted telemetry from the payload by utilizing the second COMSEC variety to generate encrypted hosted telemetry. Also, the system comprises the payload antenna to transmit the encrypted host telemetry and encrypted hosted telemetry to the host receiving antenna. In addition, the system comprises the host receiving antenna to transmit the encrypted host telemetry and the encrypted hosted telemetry to the host SOC. Further, the system comprises the hosted SOC to transmit the encrypted hosted telemetry to the HOC.

In one or more embodiments, a system for a virtual transponder utilizing inband telemetry comprises a hosted payload (HoP) operation center (HOC) to transmit encrypted hosted commands to a host spacecraft operations center (SOC). The system further comprises the host SOC to transmit encrypted host commands and the encrypted hosted commands to a vehicle. Also, the system comprises a first communication security module to decrypt the encrypted host commands utilizing a first communication security (COMSEC) variety to generate unencrypted host commands. In addition, the system comprises a second communication security module to decrypt the encrypted hosted commands utilizing a second COMSEC variety to generate unencrypted hosted commands. Additionally, the system comprises a payload on the vehicle reconfigured according to the unencrypted host commands and/or the unencrypted hosted commands. Also, the system comprises a payload antenna on the vehicle to transmit payload data to a host receiving antenna and/or a hosted receiving antenna. In addition, the system comprises the first communication security module to encrypt unencrypted telemetry utilizing the first COMSEC variety to generate encrypted telemetry. Additionally, the system comprises the payload antenna to transmit the encrypted telemetry to the host receiving antenna. Also, the system comprises the host receiving antenna to transmit the encrypted telemetry to the host SOC. Further, the system comprises the host SOC to transmit the encrypted telemetry to the HOC.

In at least one embodiment, a method for a virtual transponder on a vehicle comprises generating, by a configuration algorithm (CA), a configuration for a portion of a payload on the vehicle utilized by a host user by using an option for each of at least one variable for the portion of the payload on the vehicle utilized by the host user. The method further comprises generating, by the CA, a configuration for a portion of the payload on the vehicle utilized by a hosted user by using an option for each of at least one variable for the portion of the payload on the vehicle utilized by the hosted user. Also, the method comprises generating, by a host command generator, host commands for reconfiguring the portion of the payload on the vehicle utilized by the host user by using the configuration for the portion of the payload on the vehicle utilized by the host user. In addition, the method comprises generating, by a hosted command generator, hosted commands for reconfiguring the portion of the payload on the vehicle utilized by the hosted user by using the configuration for the portion of the payload on the vehicle utilized by the hosted user. Additionally, the method comprises transmitting the host commands and the hosted commands to the vehicle. Also, the method comprises reconfiguring the portion of the payload on the vehicle utilized by the host user by using the host commands. Further the method comprises reconfiguring the portion of the payload on the vehicle utilized by the hosted user by using the hosted commands.

In one or more embodiments, at least one variable is: at least one transponder power, at least one transponder spectrum, at least one transponder gain setting, at least one transponder limiter setting, at least one transponder automatic level control setting, at least one transponder phase setting, at least one internal gain generation, bandwidth for at least one beam, at least one frequency band for at least one of at least one beam, at least one transponder beamforming setting, effective isotropic radiation power (EIRP) for at least one of at least one beam, at least one transponder channel, and/or beam steering for at least one of at least one beam.

In at least one embodiment, the reconfiguring comprises reconfiguring: at least one antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, at least one antenna a parabolic reflector antenna, a shaped reflector antenna, a multifeed array antenna, and/or a phased array antenna.

In at least one embodiment, the host computing device and the hosted computing device are located at a respective station. In some embodiments, the station a ground station, a terrestrial vehicle, an airborne vehicle, or a marine vehicle.

In one or more embodiments, the vehicle is an airborne vehicle. In some embodiments, the airborne vehicle is a satellite, an aircraft, an unmanned aerial vehicle (UAV), or a space plane.

In at least one embodiment, the method further comprises selecting, with a host graphical user interface (GUI) on a host computing device, the option for each of at least one variable for the portion of the payload on the vehicle utilized by the host user.

In one or more embodiments, the method further comprises selecting, with a hosted GUI on a hosted computing device, the option for each of at least one variable for the portion of the payload on the vehicle utilized by the hosted user.

In at least one embodiment, a system for a virtual transponder on a vehicle comprises a configuration algorithm (CA) to generate a configuration for a portion of a payload on the vehicle utilized by a host user by using an option for each of at least one variable for the portion of the payload on the vehicle utilized by the host user, and to generate a configuration for a portion of the payload on the vehicle utilized by a hosted user by using an option for each of at least one variable for the portion of the payload on the vehicle utilized by the hosted user. The system further comprises a host command generator to generate host commands for reconfiguring the portion of the payload on the vehicle utilized by the host user by using the configuration for the portion of the payload on the vehicle utilized by the host user. Further, the system comprises a hosted command generator to generate hosted commands for reconfiguring the portion of the payload on the vehicle utilized by the hosted user by using the configuration for the portion of the payload on the vehicle utilized by the hosted user. In one or more embodiments, the portion of the payload on the vehicle utilized by the host user is reconfigured by using the host commands. In some embodiments, the portion of the payload on the vehicle utilized by the hosted user is reconfigured by using the hosted commands.

In one or more embodiments, the system further comprises a host graphical user interface (GUI), on a host computing device, used to select the option for each of at least one variable for the portion of the payload on the vehicle utilized by the host user.

In at least one embodiment, the system further comprises a hosted GUI, on a hosted computing device, used to select the option for each of at least one variable for the portion of the payload on the vehicle utilized by the hosted user.

In one or more embodiments, a method for inband telemetry for a virtual transponder comprises transmitting, by a payload antenna on a vehicle, a payload signal to a hosted receiving antenna. The method further comprises transmitting, by the payload antenna, a hosted telemetry signal to the hosted receiving antenna. In one or more embodiments, the hosted telemetry signal and the payload signal are transmitted on a same frequency band.

In one or more embodiments, the hosted telemetry signal comprises a script comprising telemetry data related to the hosted payload configuration, where the script has a duration of time equal to a master cycle time and the script is repeated within the hosted telemetry signal.

In at least one embodiment, the hosted telemetry signal comprises hosted telemetry data related to the hosted payload configuration comprising subchannel power (SCP), analog spectrum monitoring configuration (ASMS), analog random access memory (ANARAM), switch configuration, limiter configuration, subchannel automatic level control (SALC), and/or subchannel gain (SCG).

In one or more embodiments, each different type of the hosted telemetry data related to the hosted payload configuration has an associated refresh rate.

In at least one embodiment, each different type of the hosted telemetry data related to the hosted payload configuration has an associated number of times it is repeated during a script cycle time.

In one or more embodiments, the hosted telemetry signal comprises encrypted hosted telemetry.

In at least one embodiment, a method for inband telemetry for a virtual transponder comprises transmitting, by a payload antenna on a vehicle, a payload signal to a host receiving antenna. The method further comprises transmitting, by the payload antenna, a host telemetry signal to the host receiving antenna. In one or more embodiments, the host telemetry signal and the payload signal are transmitted on a same frequency band.

In one or more embodiments, the hosted telemetry signal comprises a script comprising telemetry data related to the host payload configuration, where the script has a duration of time equal to a master cycle time and the script is repeated within the hosted telemetry signal.

In at least one embodiment, the host telemetry signal comprises host telemetry data related to the host payload configuration comprising subchannel power (SCP), analog spectrum monitoring configuration (ASMS), analog random access memory (ANARAM), switch configuration, limiter configuration, subchannel automatic level control (SALC), and/or subchannel gain (SCG).

In one or more embodiments, each different type of the host telemetry data related to the host payload configuration has an associated refresh rate.

In at least one embodiment, each different type of the host telemetry data related to the host payload configuration has an associated number of times it is repeated during a script cycle time.

In one or more embodiments, the host telemetry signal comprises encrypted host telemetry.

In at least one embodiment, a method for inband telemetry for a virtual transponder comprises transmitting, by a payload antenna on a vehicle, a host payload signal to a host receiving antenna. The method further comprises transmitting, by the payload antenna, a hosted payload signal to a hosted receiving antenna. Also, the method comprises transmitting, by the payload antenna, a host telemetry signal to the host receiving antenna. Further the method comprises transmitting, by the payload antenna, a hosted telemetry signal to the hosted receiving antenna. In one or more embodiments, the host telemetry signal and the hosted telemetry signal are transmitted on a same frequency band.

In one or more embodiments, the host telemetry signal comprises a host script comprising host telemetry data related to the host payload configuration, where the host script has a duration of time equal to a host master cycle time and the host script is repeated within the host telemetry signal. In at least one embodiment, the hosted telemetry signal comprises a hosted script comprising hosted telemetry data related to the hosted payload configuration, where the script has a duration of time equal to a hosted master cycle time and the script is repeated within the hosted telemetry signal.

In at least one embodiment, the host telemetry signal comprises host telemetry data related to the host payload configuration comprising subchannel power (SCP), analog spectrum monitoring configuration (ASMS), analog random access memory (ANARAM), switch configuration, limiter configuration, subchannel automatic level control (SALC), and/or subchannel gain (SCG). In one or more embodiments, the hosted telemetry signal comprises hosted telemetry data related to the hosted payload configuration comprising subchannel power (SCP), analog spectrum monitoring configuration (ASMS), analog random access memory (ANARAM), switch configuration, limiter configuration, subchannel automatic level control (SALC), and/or subchannel gain (SCG).

In one or more embodiments, each different type of the host telemetry data related to the host payload configuration has an associated host refresh rate. In at least one embodiment, each different type of the hosted telemetry data related to the hosted payload configuration has an associated hosted refresh transmission rate.

In at least one embodiment, each different type of the host telemetry data related to the host payload configuration has an associated number of times it is repeated during a host script cycle time. In one or more embodiments, each different type of the hosted telemetry data related to the hosted payload configuration has an associated number of times it is repeated during a hosted script cycle time.

In one or more embodiments, the host telemetry signal comprises encrypted host telemetry, and the hosted telemetry signal comprises encrypted hosted telemetry. In at least one embodiment, the encrypted host telemetry is encrypted utilizing a first COMSEC variety, and the encrypted hosted telemetry is encrypted utilizing a second COMSEC variety.

In at least one embodiment, the host telemetry signal and the hosted telemetry signal are transmitted on the same frequency band utilizing time division multiple access (TDMA).

In one or more embodiments, a method for inband telemetry for a virtual transponder comprises transmitting, by a payload antenna on a vehicle, a host payload signal to a host receiving antenna. The method further comprises transmitting, by the payload antenna, a hosted payload signal to a hosted receiving antenna. Also, the method comprises transmitting, by the payload antenna, a host telemetry signal to the host receiving antenna. In one or more embodiments, the host telemetry signal and the host payload signal are transmitted on a host frequency band. Further, the method comprises transmitting, by the payload antenna, a hosted telemetry signal to the hosted receiving antenna. In one or more embodiments, the hosted telemetry signal and the hosted payload signal are transmitted on a hosted frequency band.

In at least one embodiment, a system for inband telemetry for a virtual transponder comprises a vehicle. The system further comprises a payload antenna on the vehicle to transmit a payload signal to a hosted receiving antenna, and to transmit a hosted telemetry signal to the hosted receiving antenna. In some embodiments, the hosted telemetry signal and the payload signal are transmitted on a same frequency band.

In one or more embodiments, a system for inband telemetry for a virtual transponder comprises a vehicle. The system further comprises a payload antenna on the vehicle to transmit a host payload signal to a host receiving antenna, to transmit a hosted payload signal to a hosted receiving antenna, to transmit a host telemetry signal to the host receiving antenna, and to transmit a hosted telemetry signal to the hosted receiving antenna. In some embodiments, the host telemetry signal and the hosted telemetry signal are transmitted on a same frequency band.

In at least one embodiment, a system for inband telemetry for a virtual transponder comprises a vehicle. The system further comprises a payload antenna on a vehicle to transmit a host payload signal to a host receiving antenna, to transmit a hosted payload signal to a hosted receiving antenna, to transmit a host telemetry signal to the host receiving antenna, and to transmit a hosted telemetry signal to the hosted receiving antenna. In at least one embodiment, the host telemetry signal and the host payload signal are transmitted on a host frequency band. In some embodiments, the hosted telemetry signal and the hosted payload signal are transmitted on a hosted frequency band.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 2A-9H show exemplary systems and methods for a virtual transponder utilizing inband telemetry, in accordance with at least one embodiment of the present disclosure.

FIG. 2A is a diagram showing the disclosed system for a virtual transponder utilizing inband telemetry for the hosted user being transmitted to a hosted receiving antenna, in accordance with at least one embodiment of the present disclosure.

FIGS. 3A, 3B, 3C, and 3D together show a flow chart for the disclosed method for a virtual transponder utilizing inband telemetry for the hosted user being transmitted to a hosted receiving antenna, in accordance with at least one embodiment of the present disclosure.

FIGS. 3E, 3F, 3G, and 3H together show a flow chart for the disclosed method for a virtual transponder utilizing inband telemetry for the hosted user being transmitted to a host receiving antenna, in accordance with at least one embodiment of the present disclosure.

Figure 4:
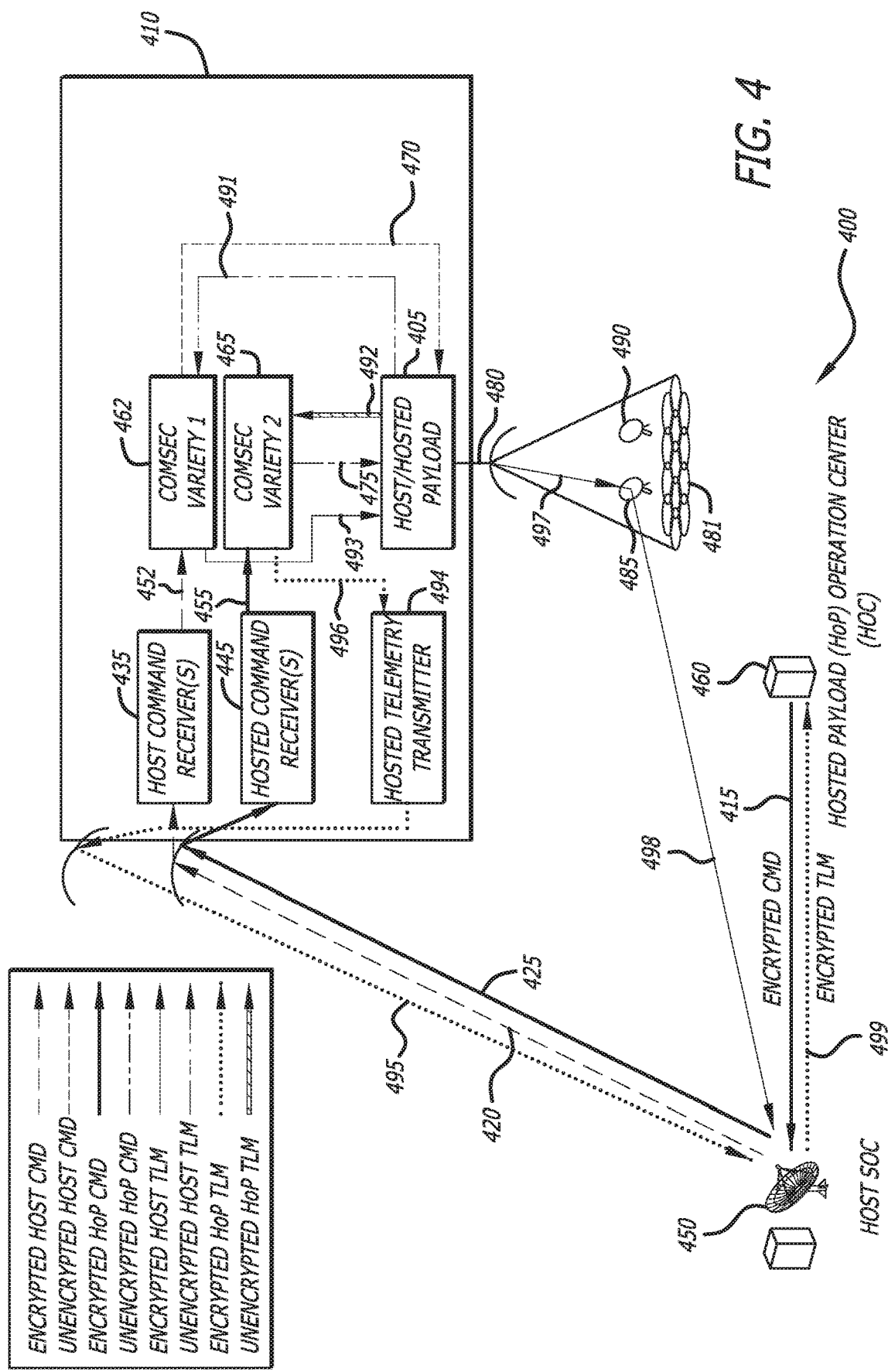
Figure 5B:
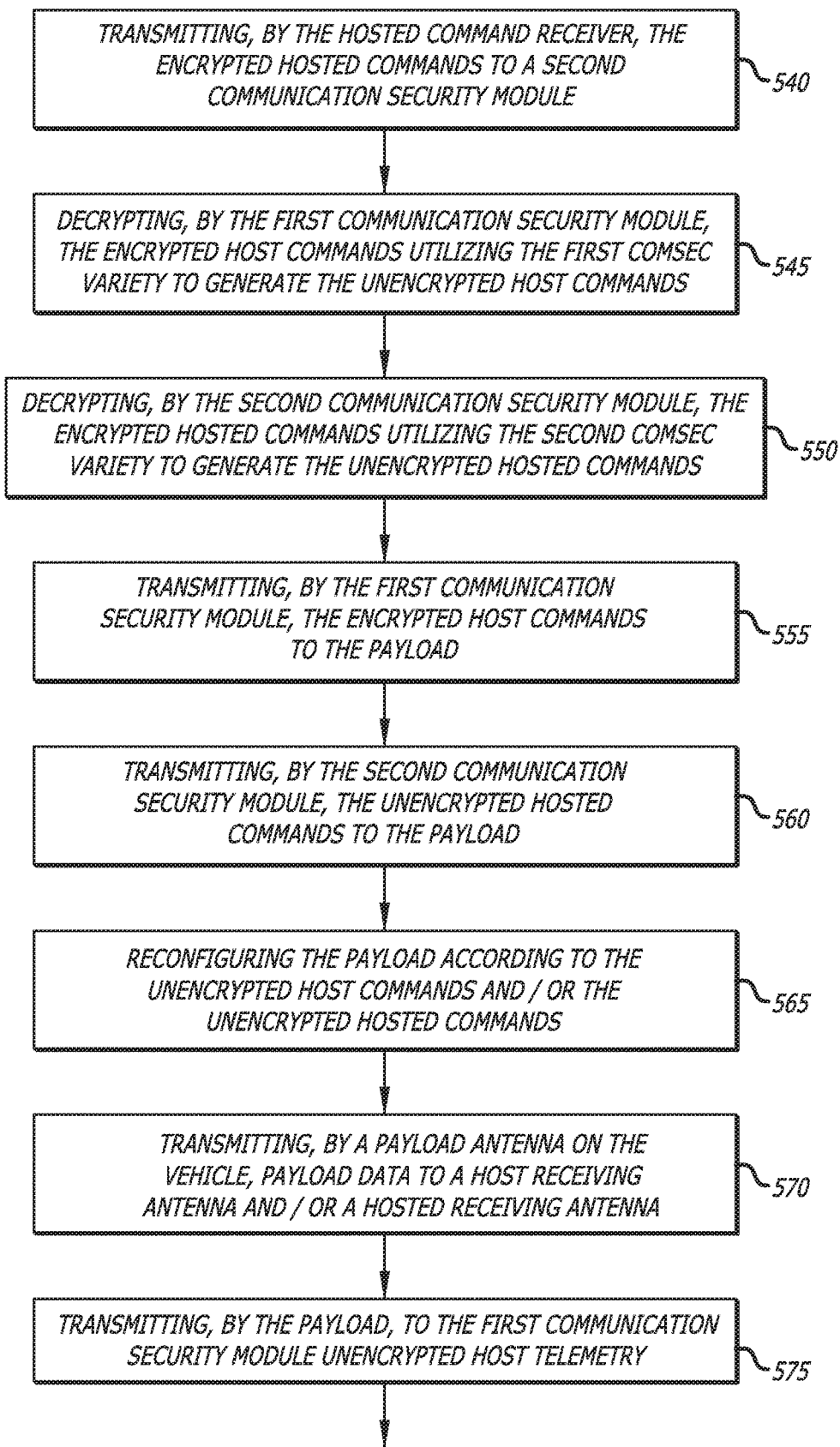
Figure 5C:
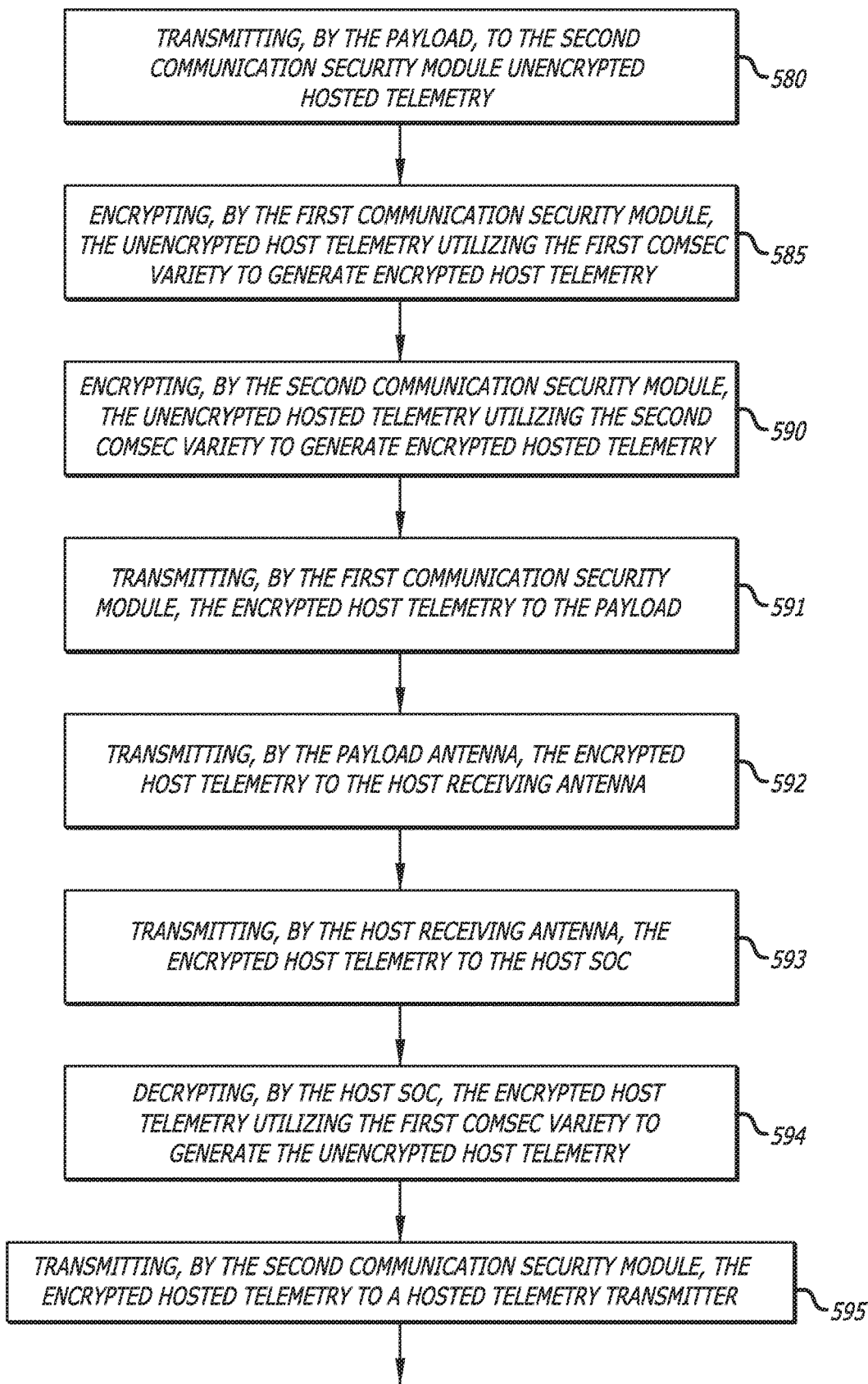

FIG. 4 is a diagram showing the disclosed system for a virtual transponder utilizing inband telemetry for the host user, in accordance with at least one embodiment of the present disclosure.

FIGS. 5A, 5B, 5C, and 5D together show a flow chart for the disclosed method for a virtual transponder utilizing inband telemetry for the host user, in accordance with at least one embodiment of the present disclosure.

Figure 6A:
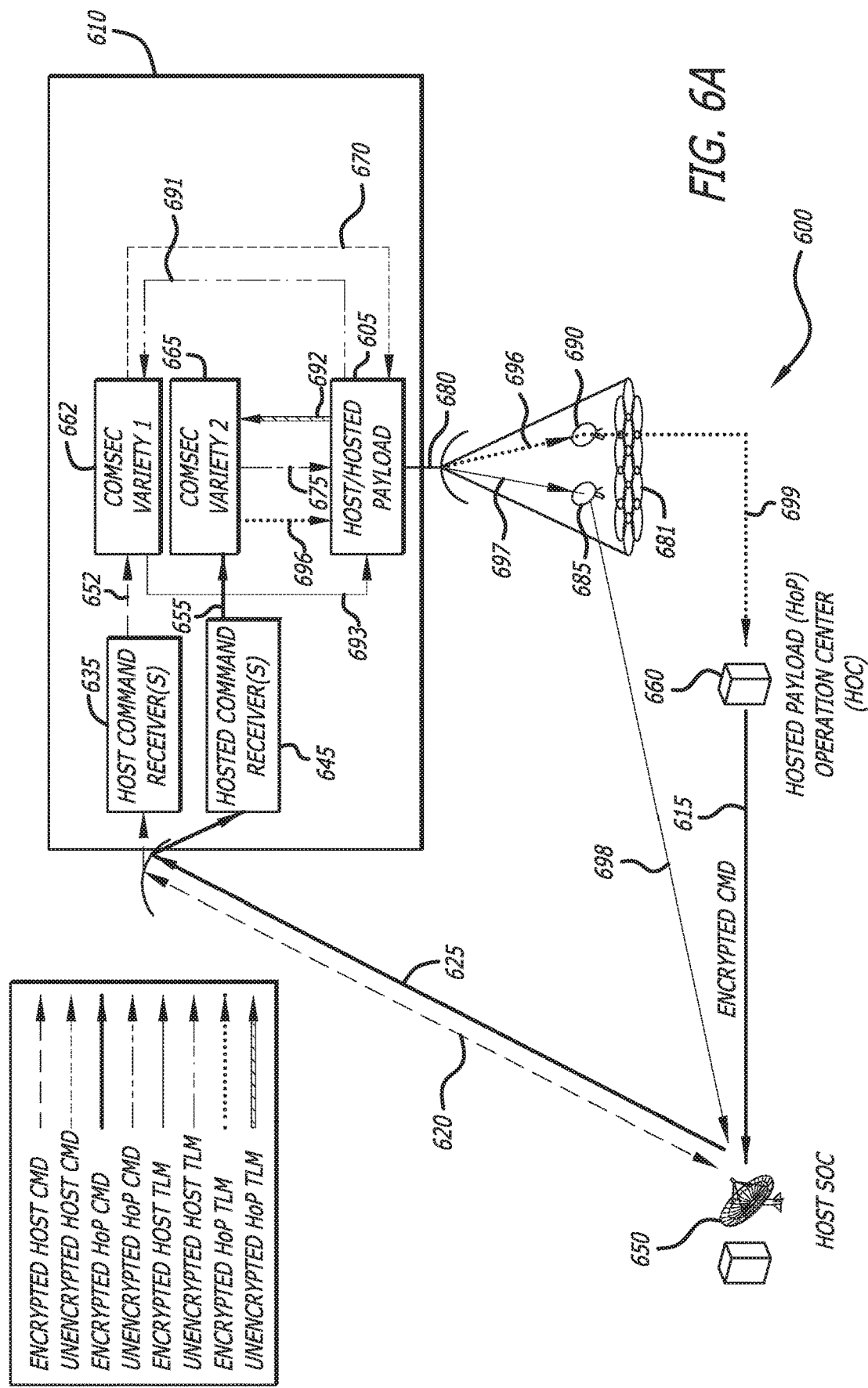

FIG. 6A is a diagram showing the disclosed system for a virtual transponder utilizing inband telemetry for the host user and the hosted user being transmitted to a host receiving antenna and a hosted receiving antenna, in accordance with at least one embodiment of the present disclosure.

Figure 6B:
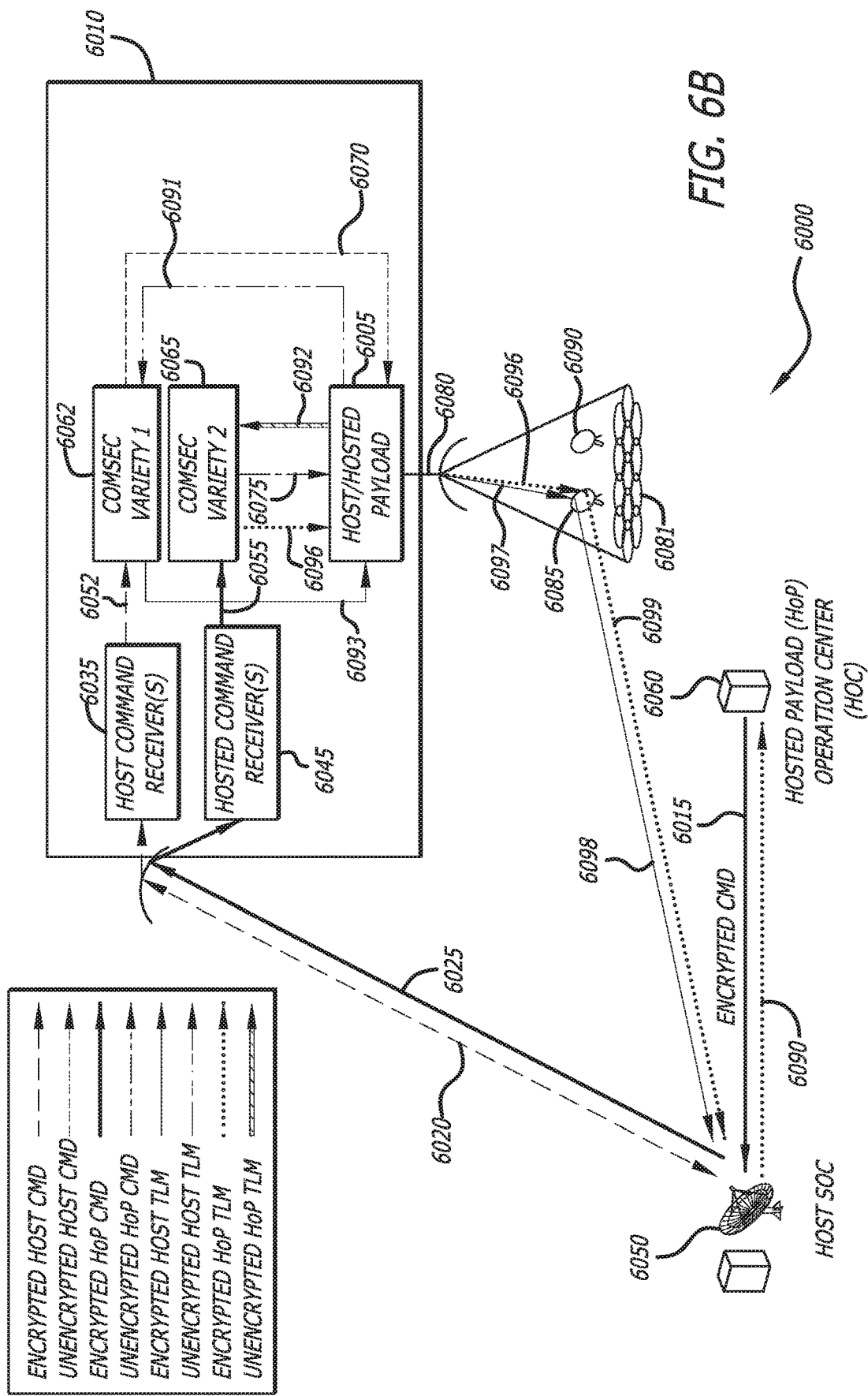
Figure 7A:
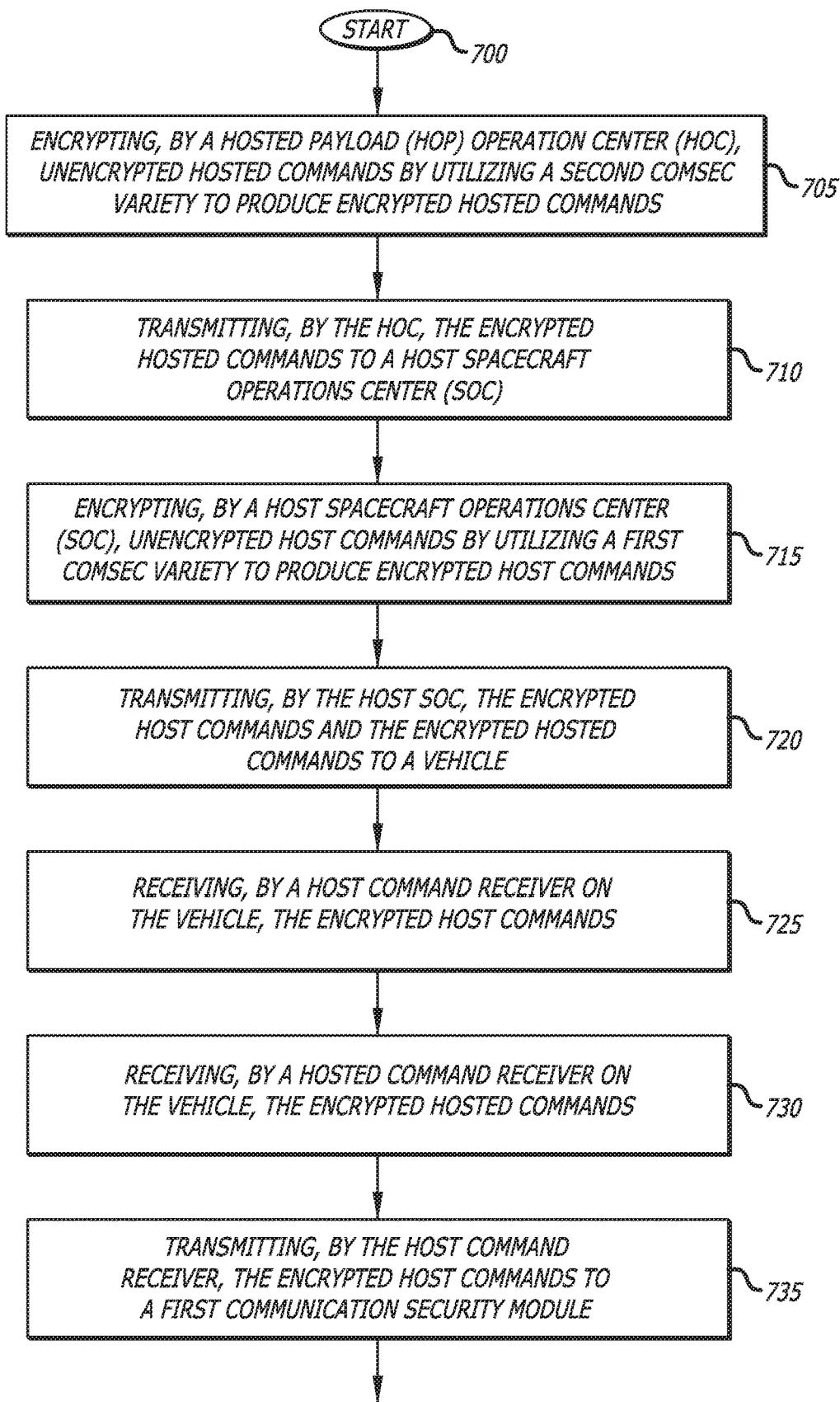
Figure 7B:
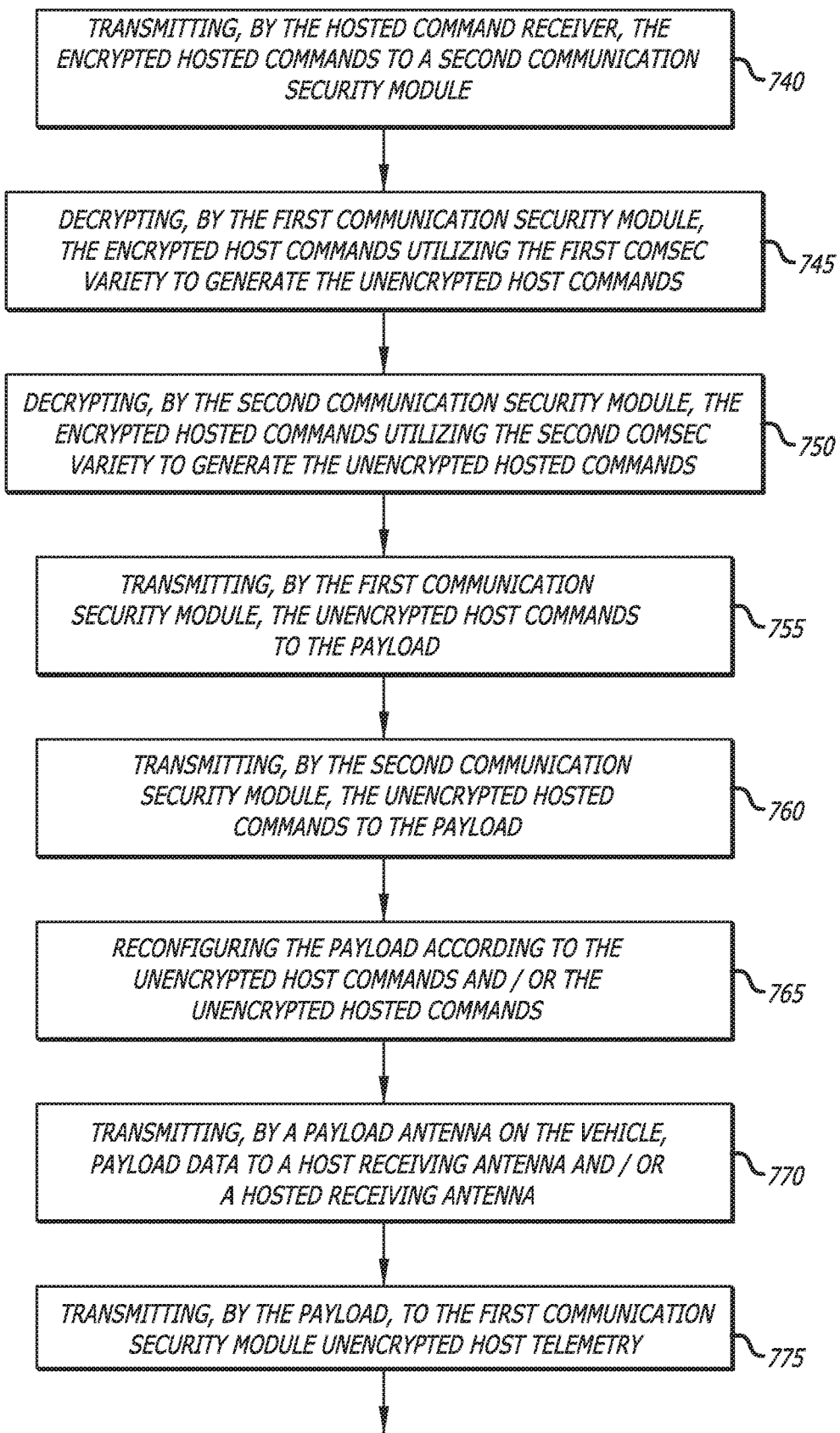
Figure 7C:
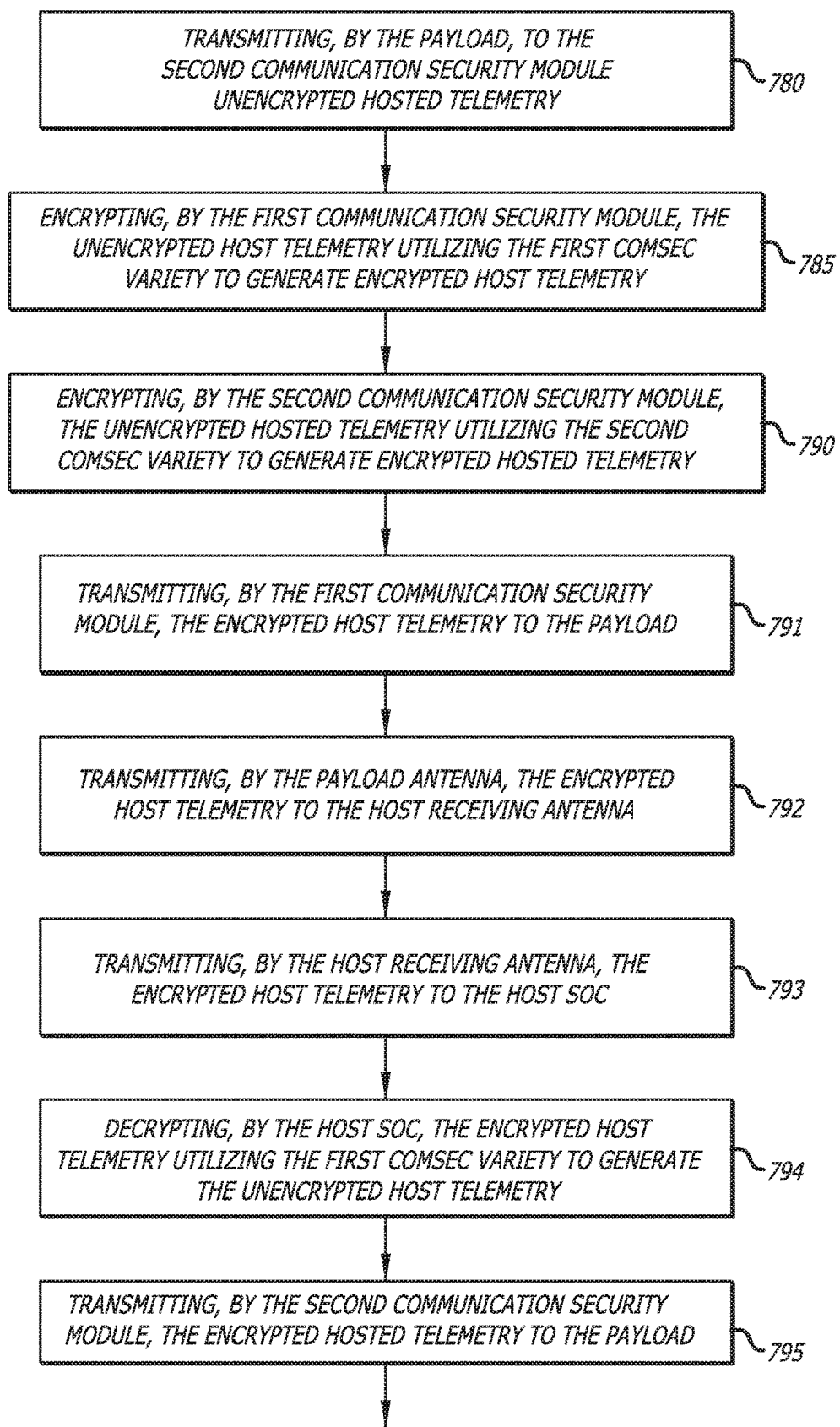
Figure 7D:
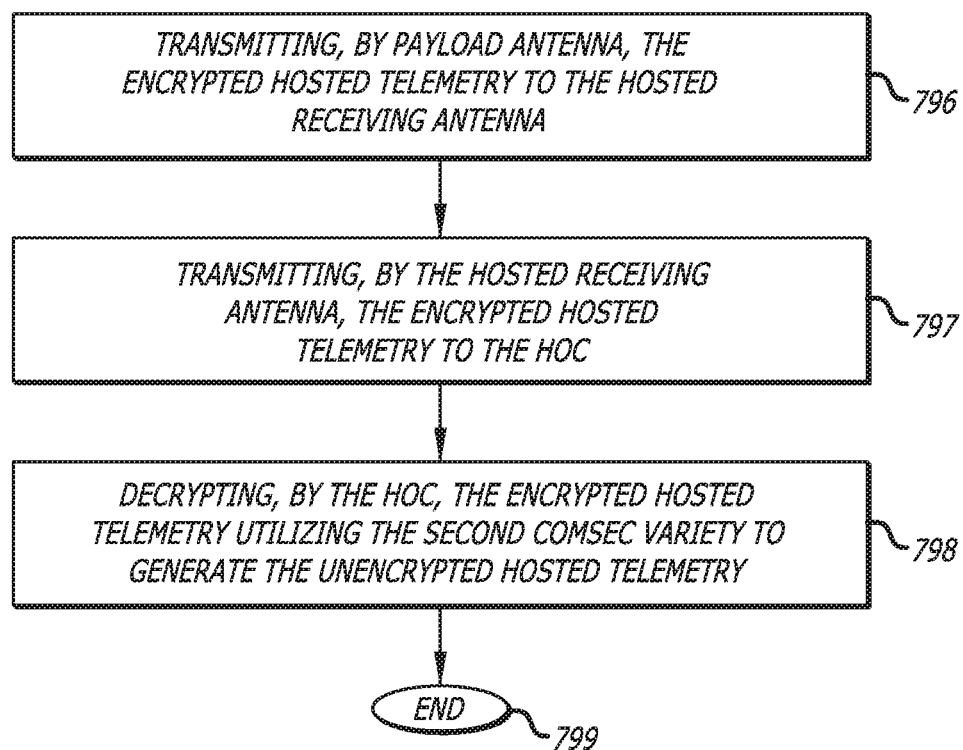
Figure 7E:
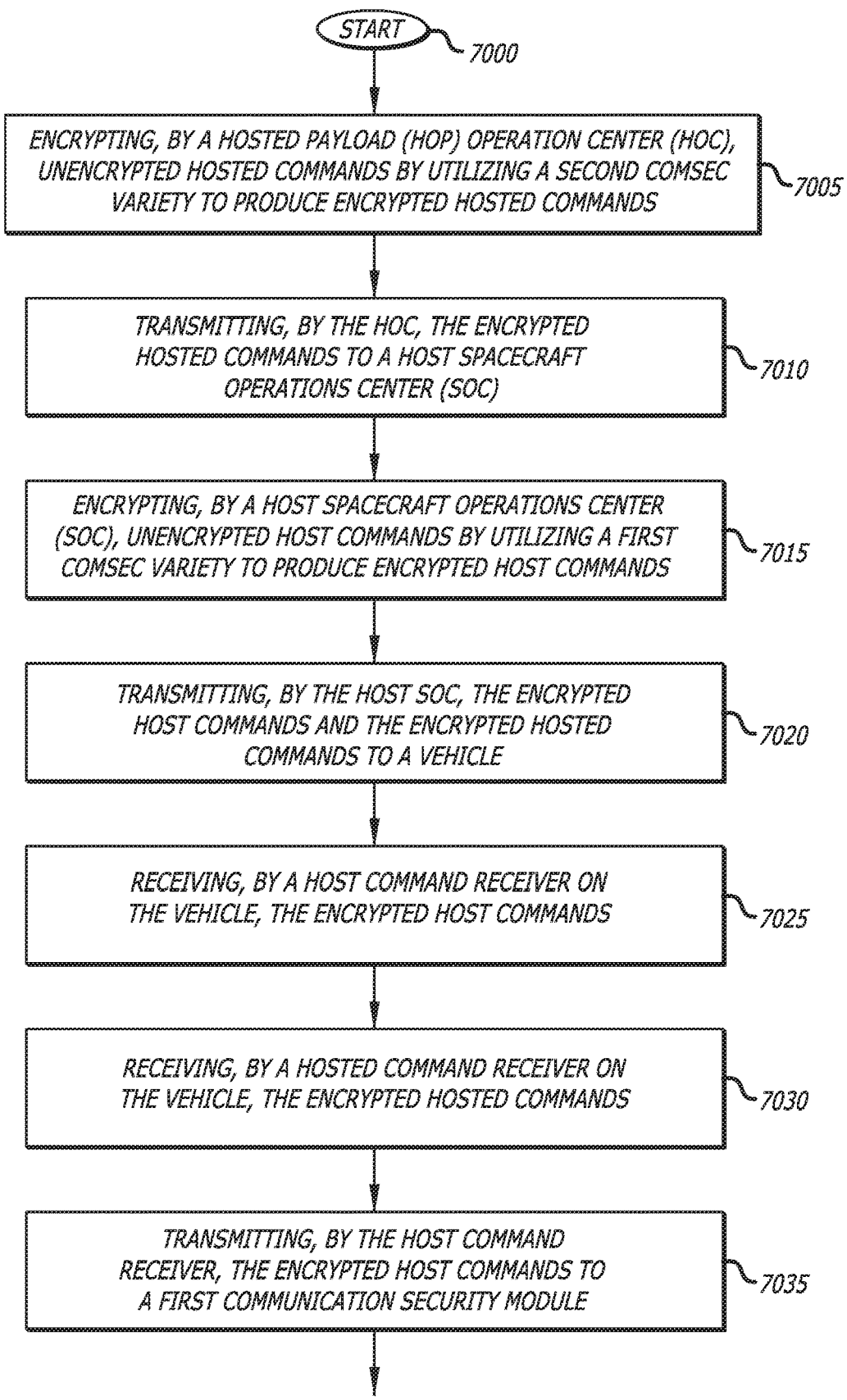
Figure 7F:
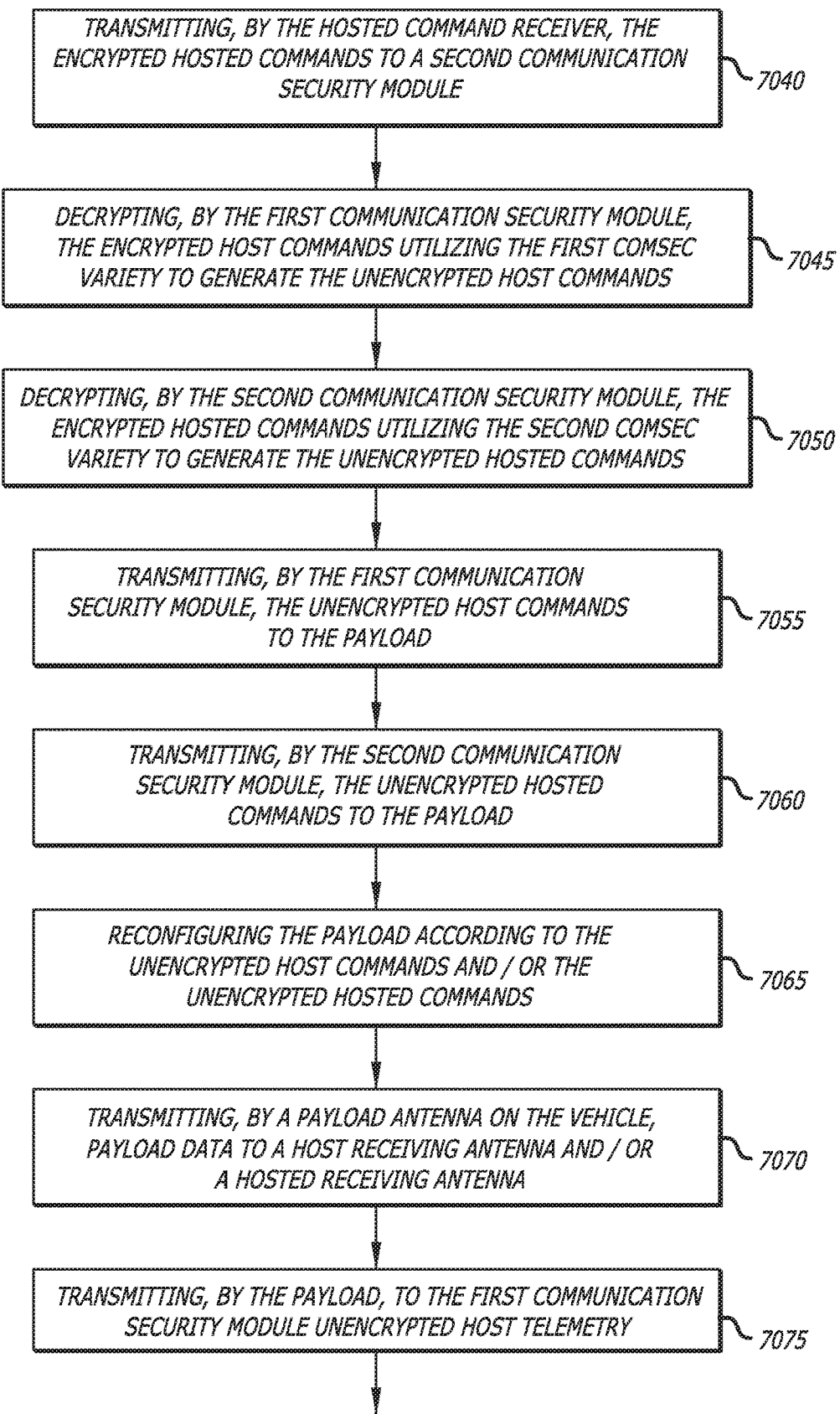
Figure 7G:
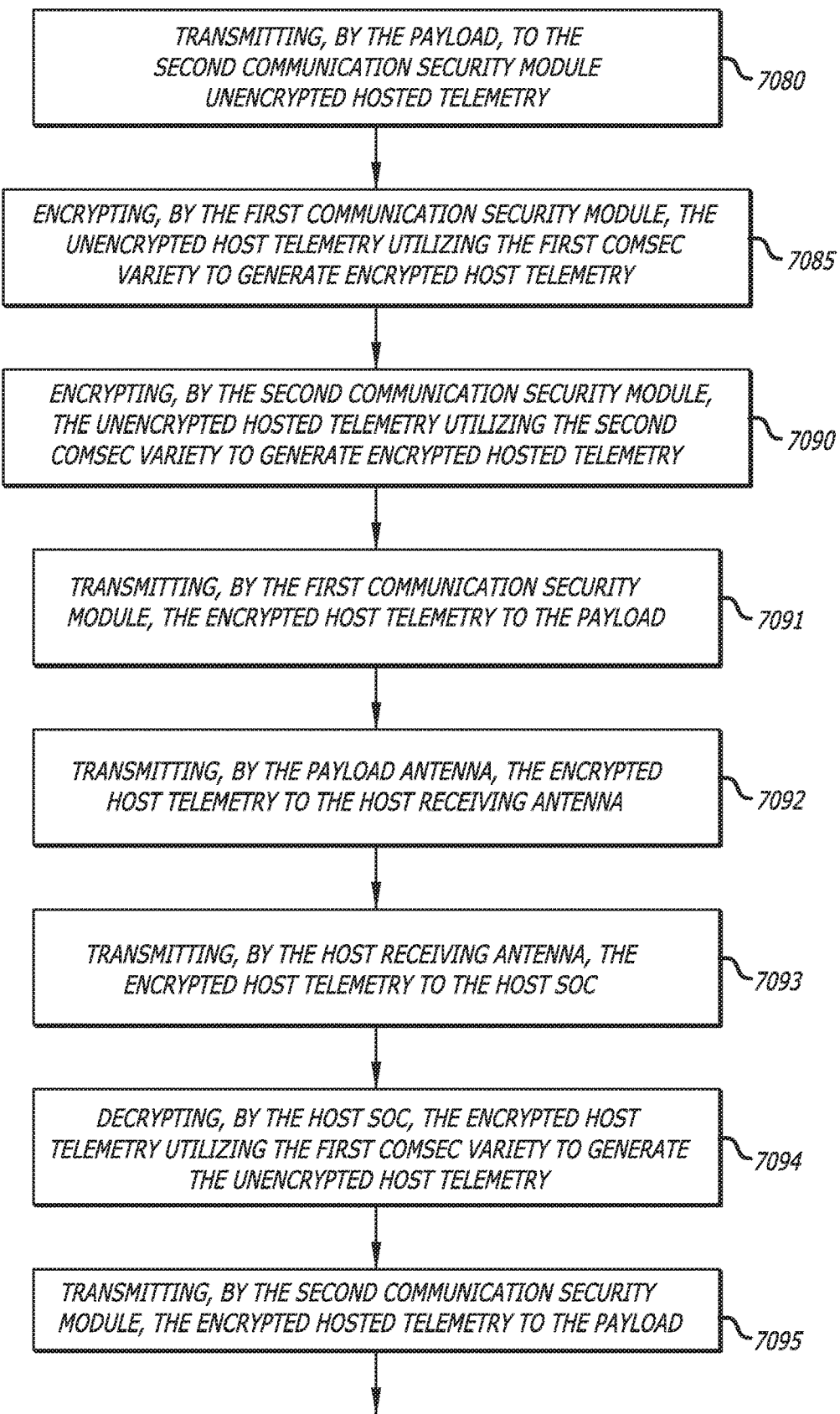

FIG. 6B is a diagram showing the disclosed system for a virtual transponder utilizing inband telemetry for the host user and the hosted user being transmitted to a host receiving antenna, in accordance with at least one embodiment of the present disclosure.

FIGS. 7A, 7B, 7C, and 7D together show a flow chart for the disclosed method for a virtual transponder utilizing inband telemetry for the host user and the hosted user being transmitted to a host receiving antenna and a hosted receiving antenna, in accordance with at least one embodiment of the present disclosure.

FIGS. 7E, 7F, 7G, and 7H together show a flow chart for the disclosed method for a virtual transponder utilizing inband telemetry for the host user and the hosted user being transmitted to a host receiving antenna, in accordance with at least one embodiment of the present disclosure.

Figure 8A:
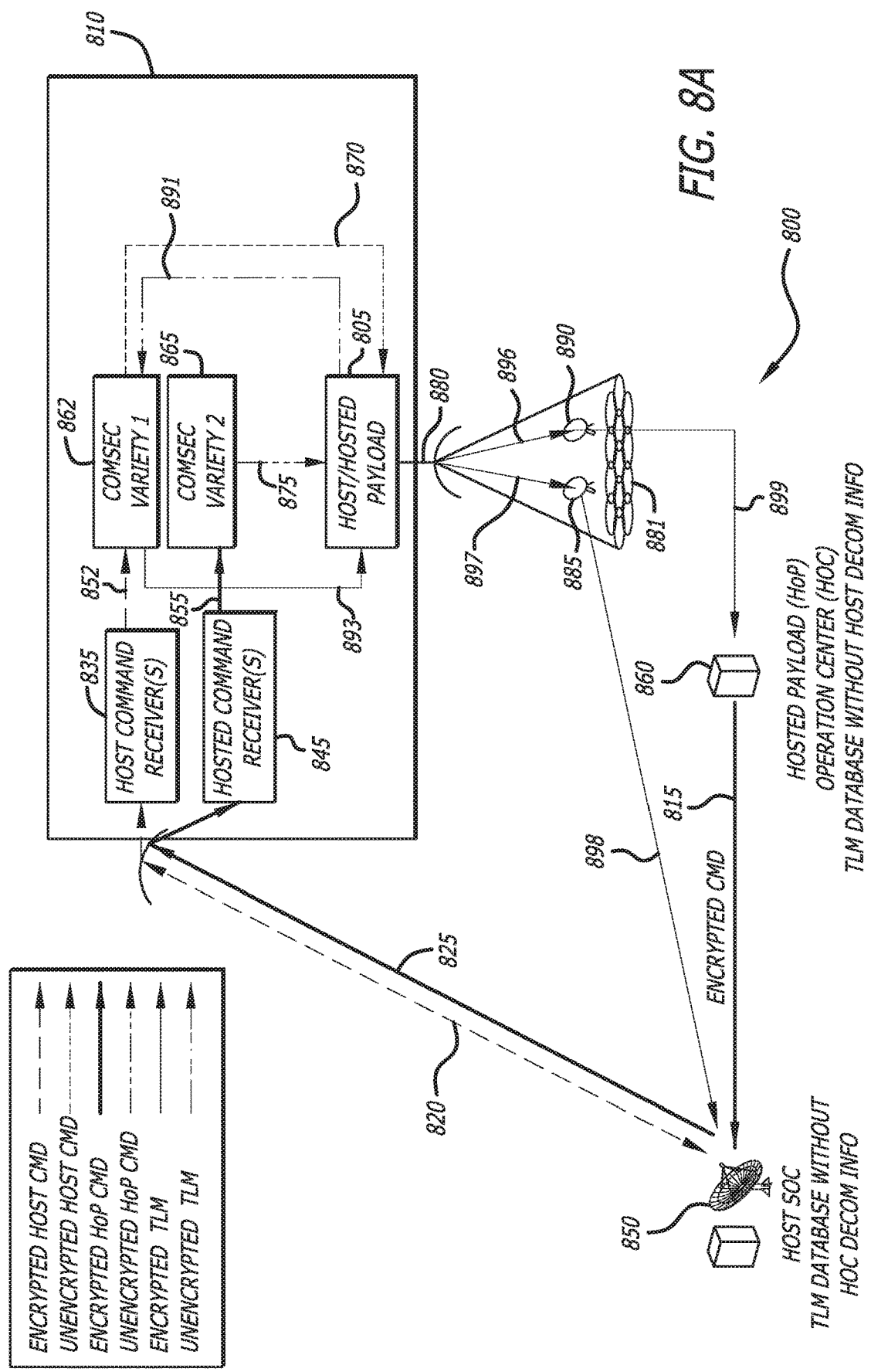

FIG. 8A is a diagram showing the disclosed system for a virtual transponder utilizing inband telemetry for the host user and the hosted user being transmitted to a host receiving antenna and a hosted receiving antenna, where the telemetry is encrypted utilizing a single communication security (COMSEC) variety, in accordance with at least one embodiment of the present disclosure.

Figure 8B:
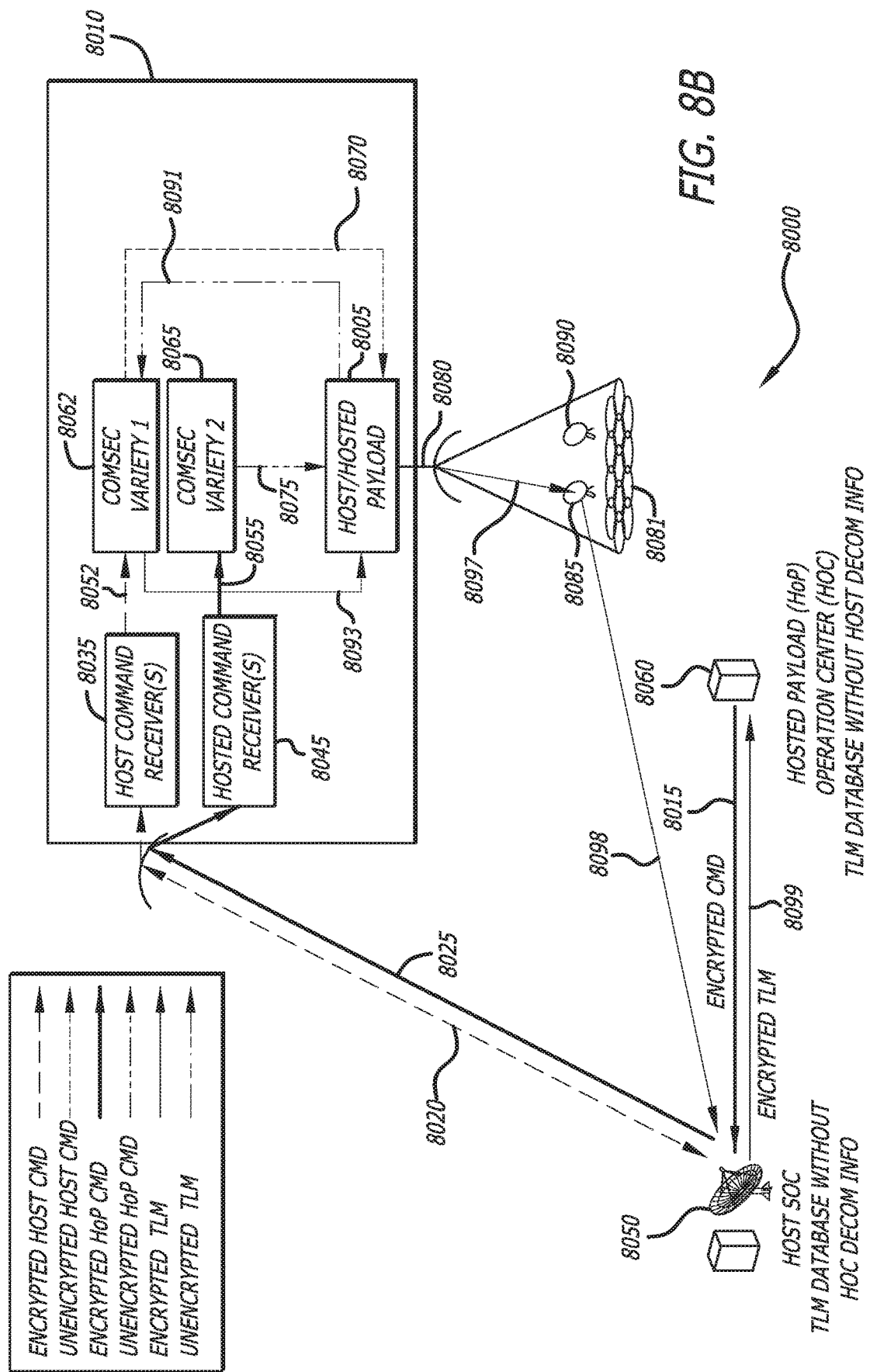
Figure 9A:
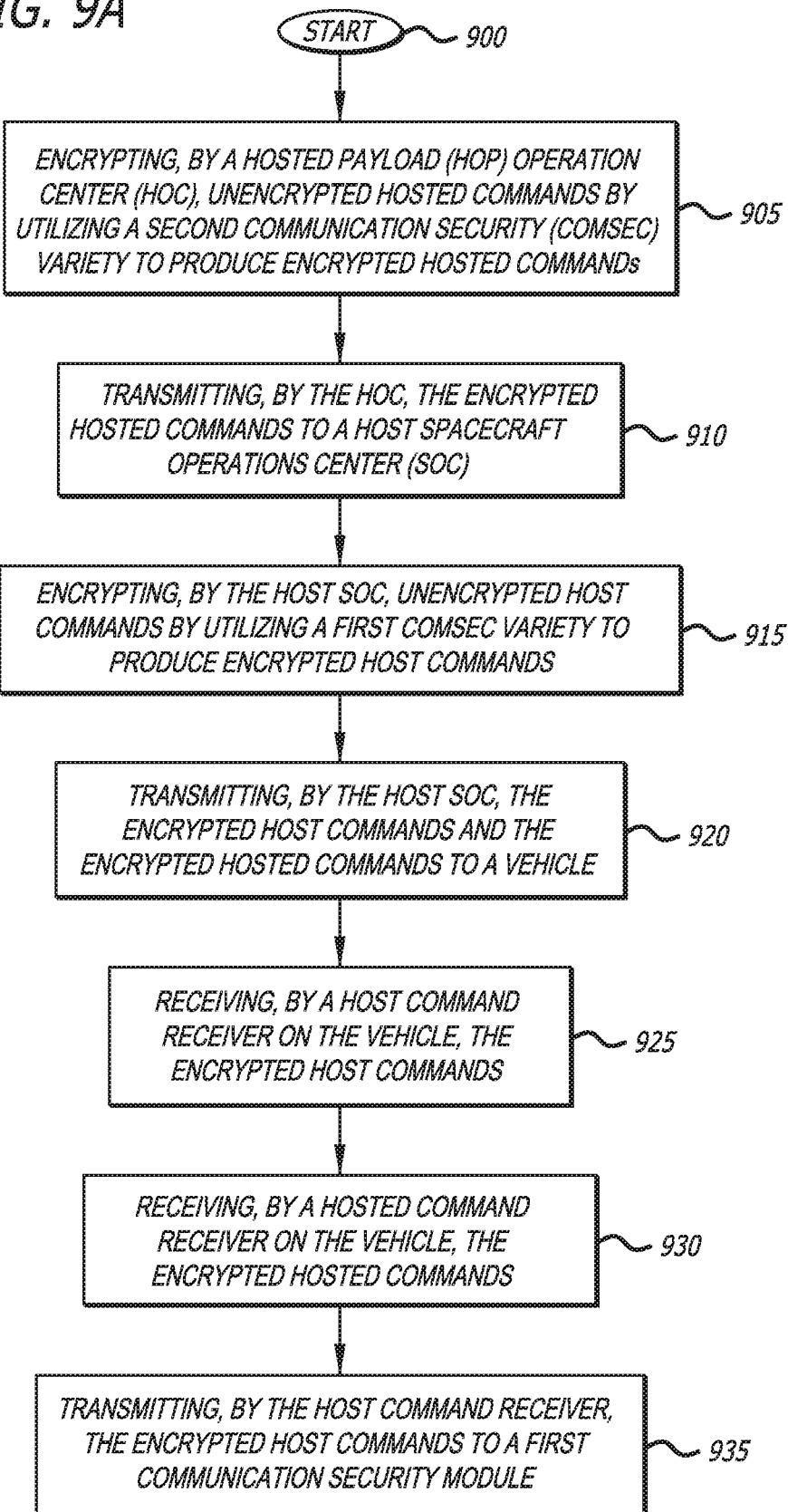
Figure 9B:
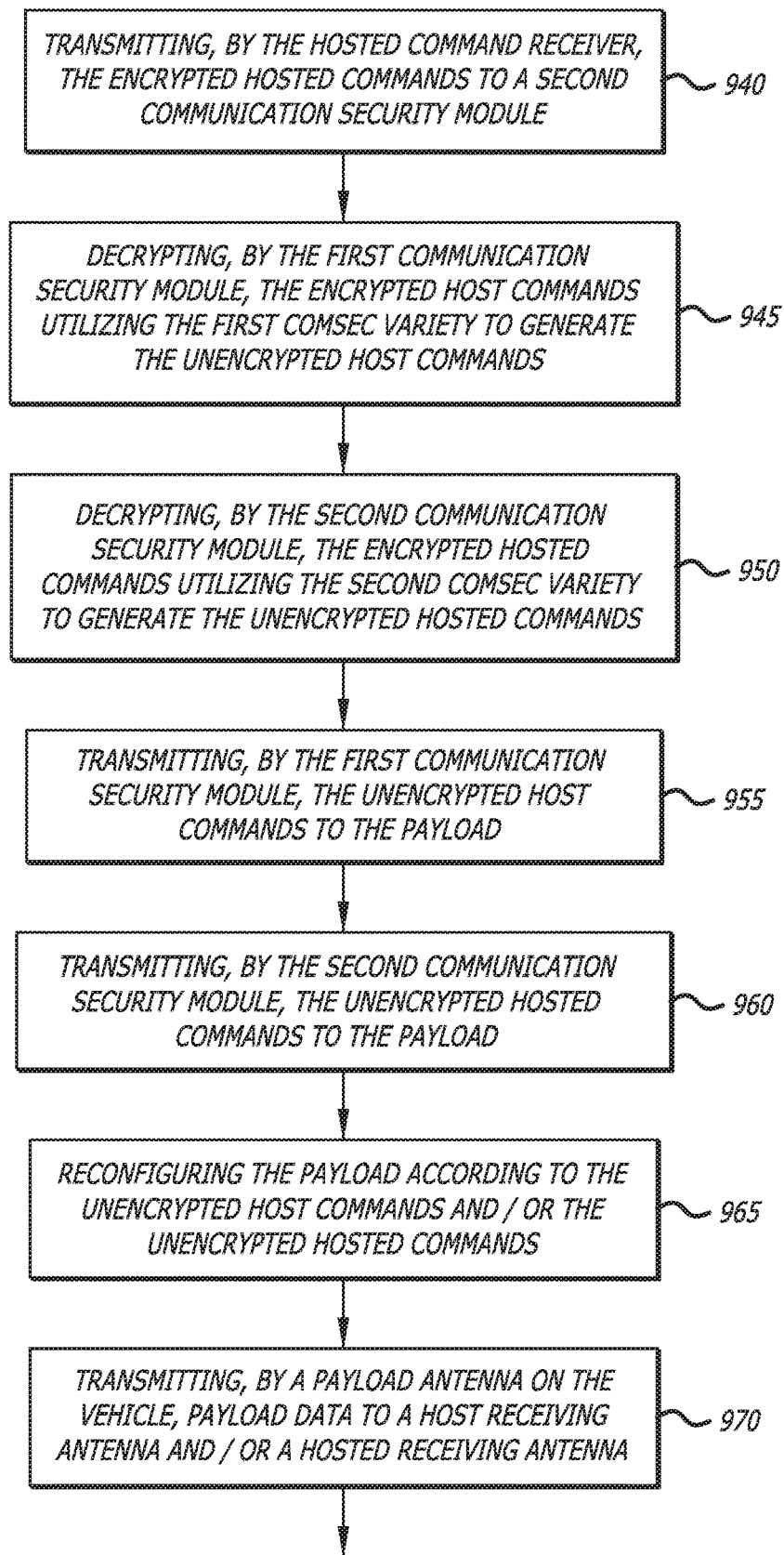
Figure 9C:
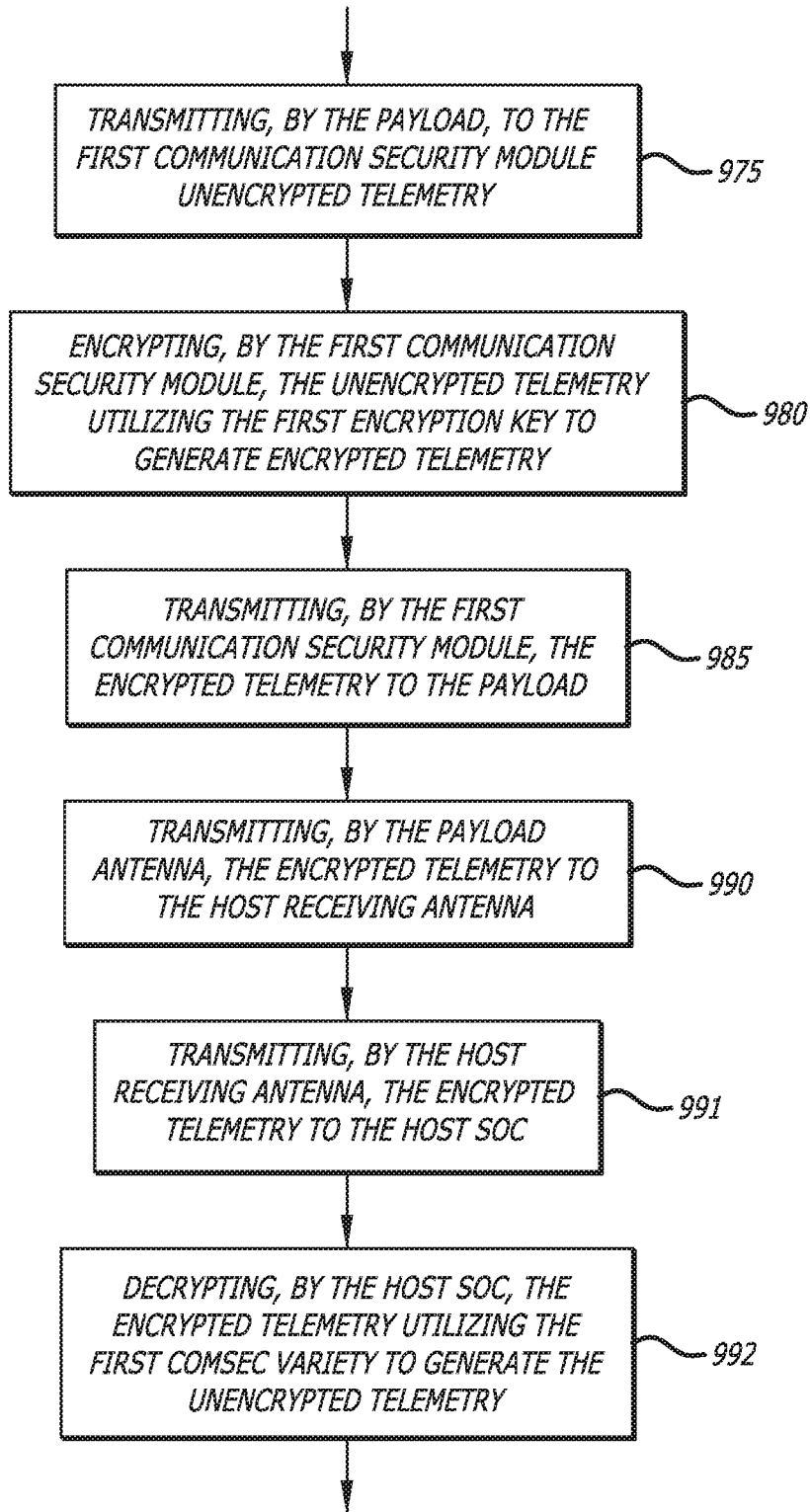
Figure 9D:
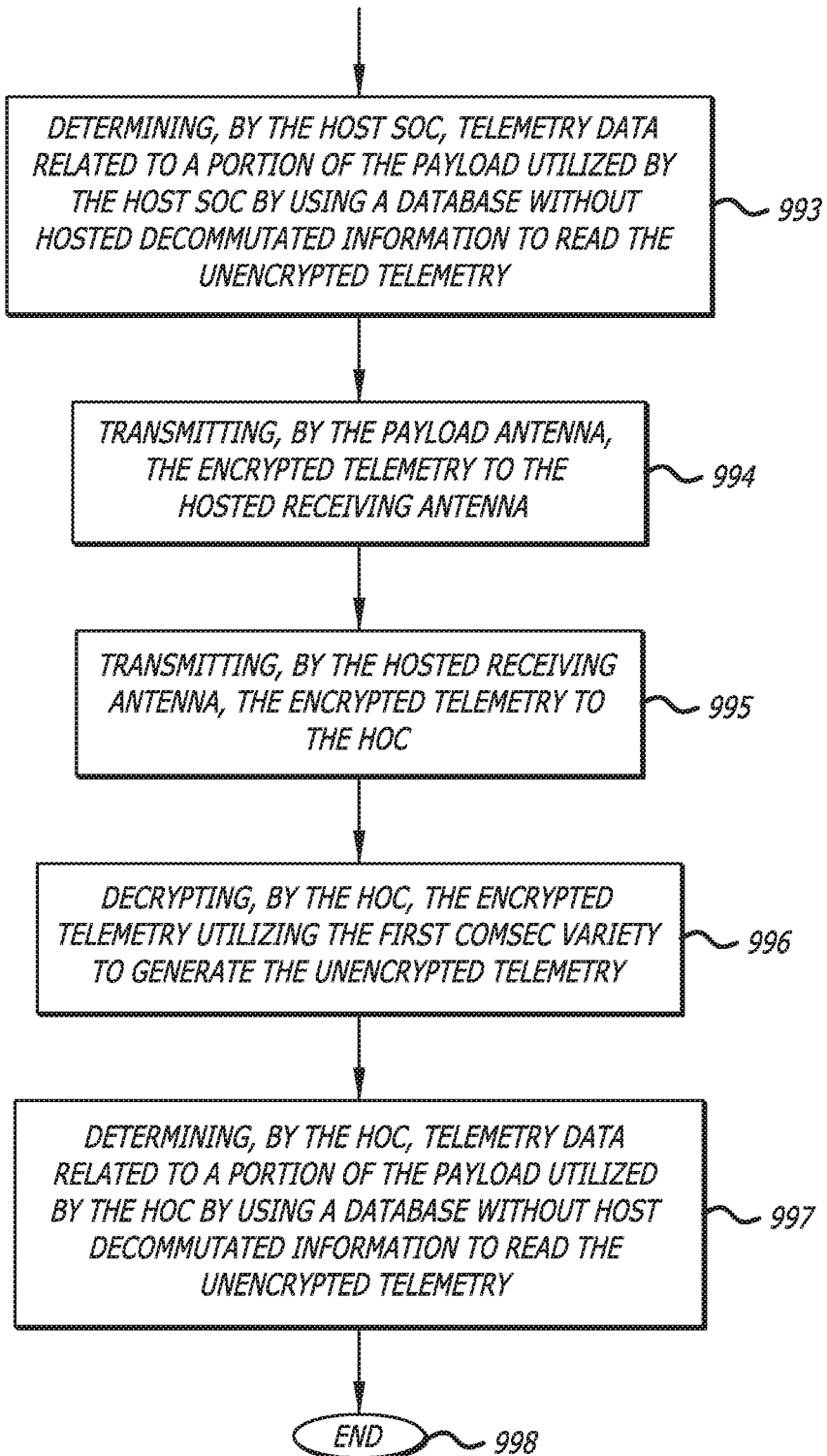
Figure 9E:
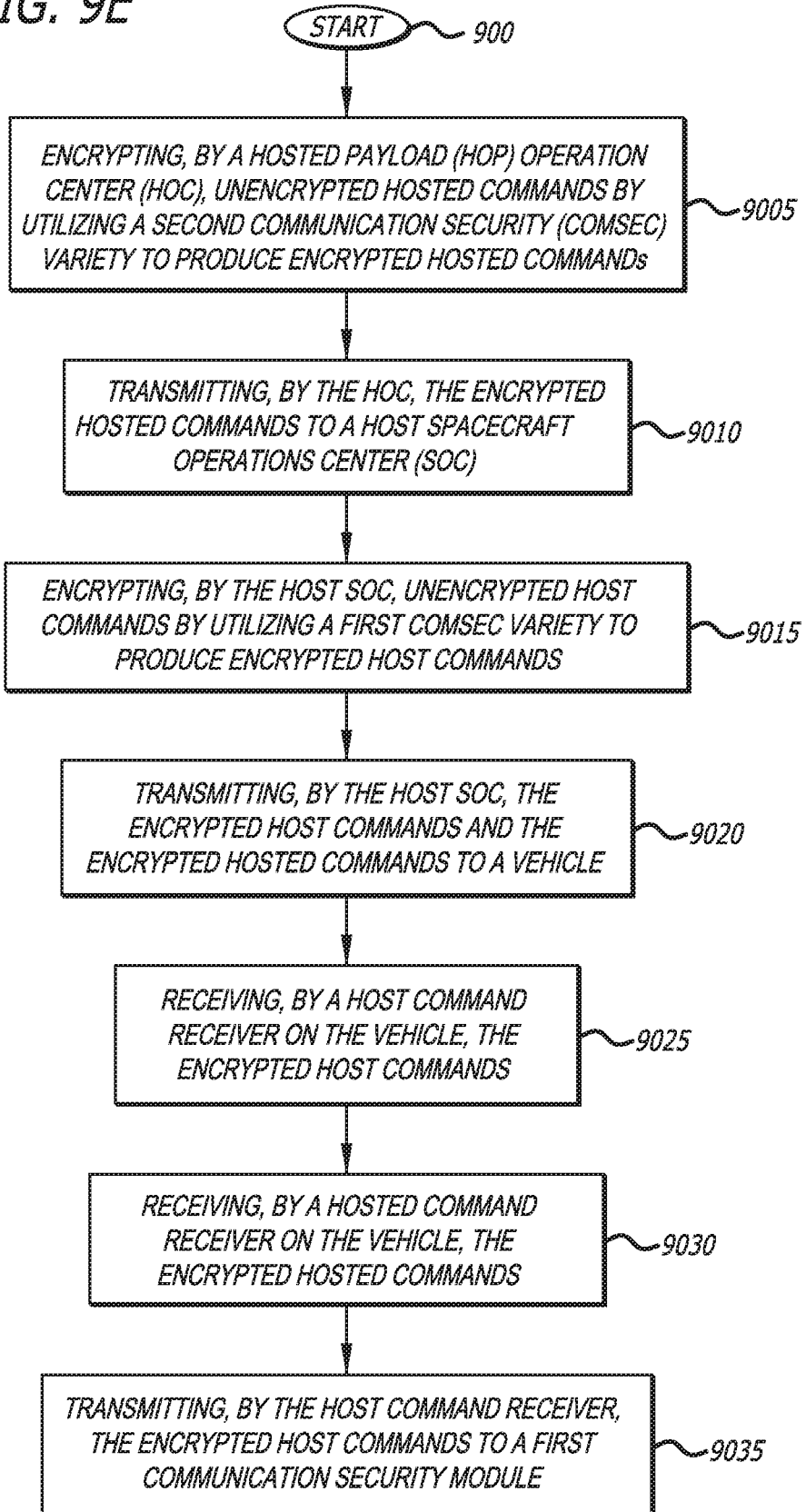
Figure 9F:
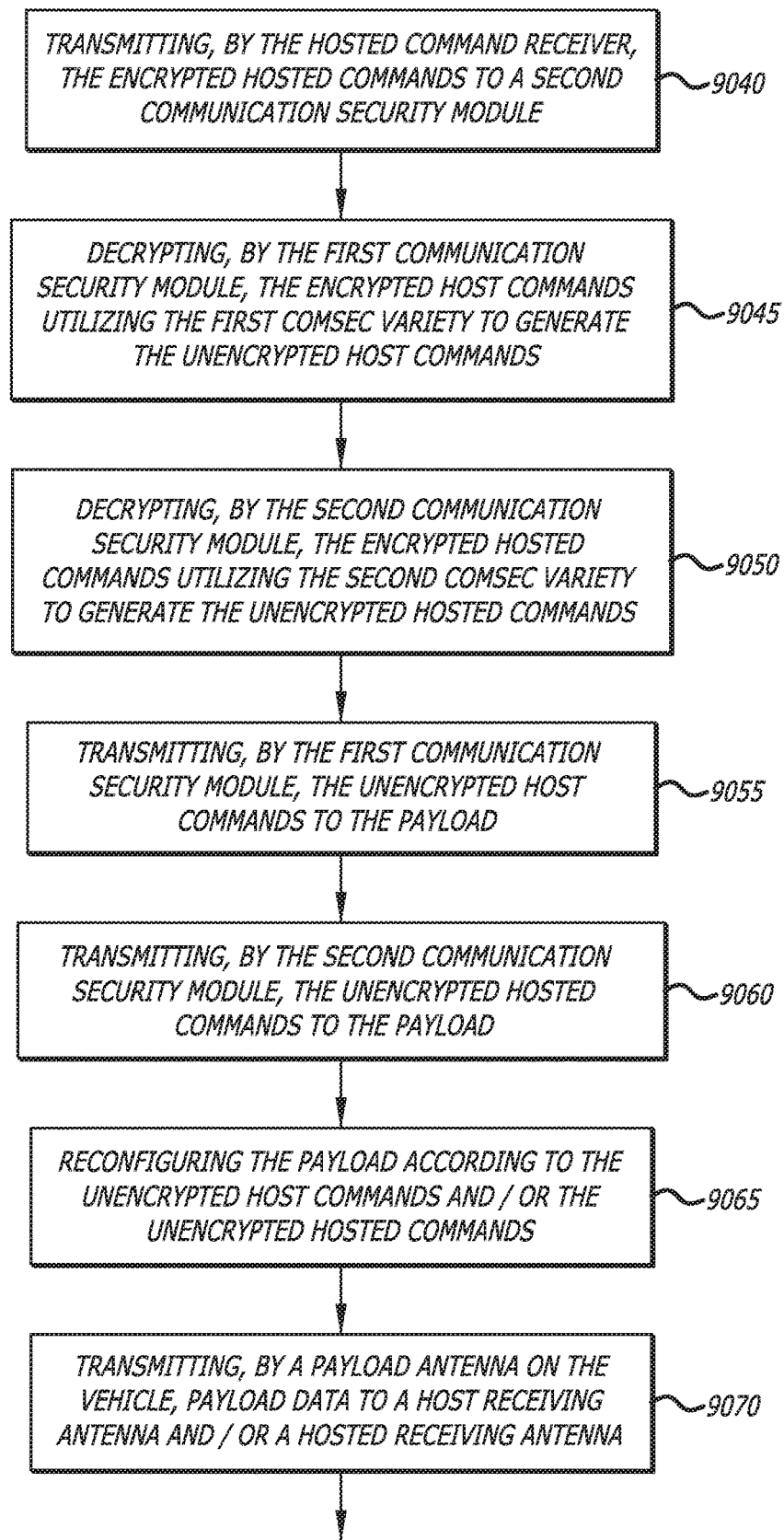
Figure 9G:
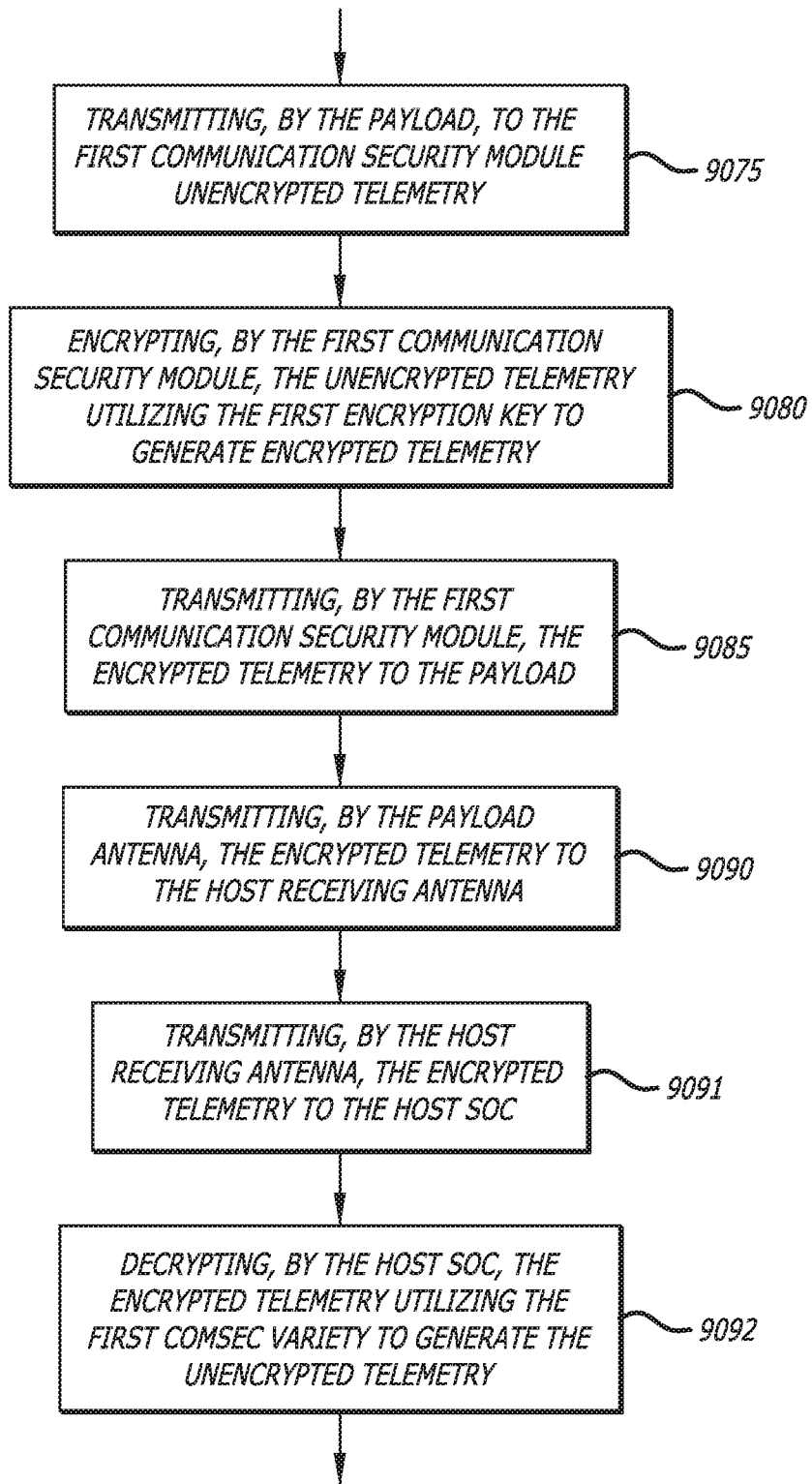
Figure 9H:
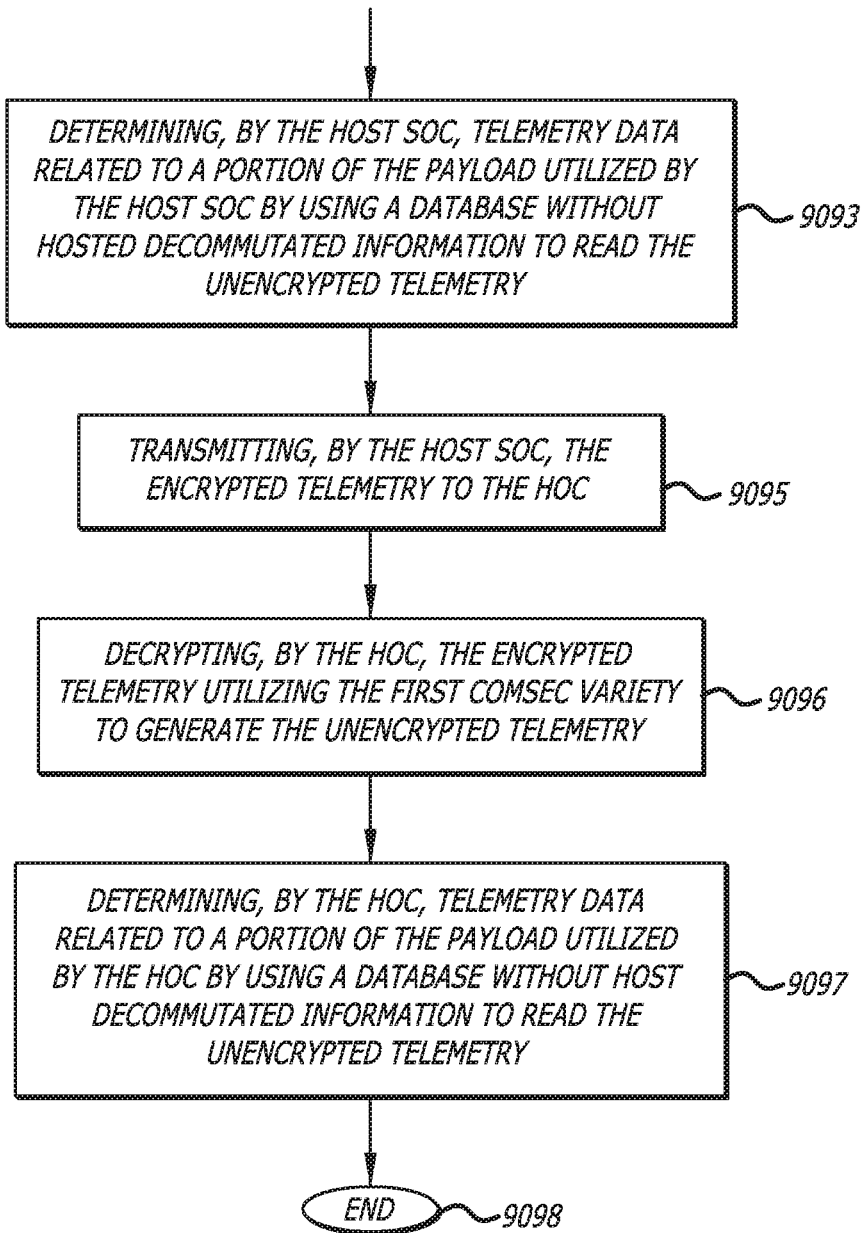

FIG. 8B is a diagram showing the disclosed system for a virtual transponder utilizing inband telemetry for the host user and the hosted user being transmitted to a host receiving antenna, where the telemetry is encrypted utilizing a single communication security (COMSEC) variety, in accordance with at least one embodiment of the present disclosure.

FIGS. 9A, 9B, 9C, and 9D together show a flow chart for the disclosed method for a virtual transponder utilizing inband telemetry for the host user and the hosted user being transmitted to a host receiving antenna and a hosted receiving antenna, where the telemetry is encrypted utilizing a single COMSEC variety, in accordance with at least one embodiment of the present disclosure.

FIGS. 9E, 9F, 9G, and 9H together show a flow chart for the disclosed method for a virtual transponder utilizing inband telemetry for the host user and the hosted user being transmitted to a host receiving antenna, where the telemetry is encrypted utilizing a single COMSEC variety, in accordance with at least one embodiment of the present disclosure.

Figure 10:
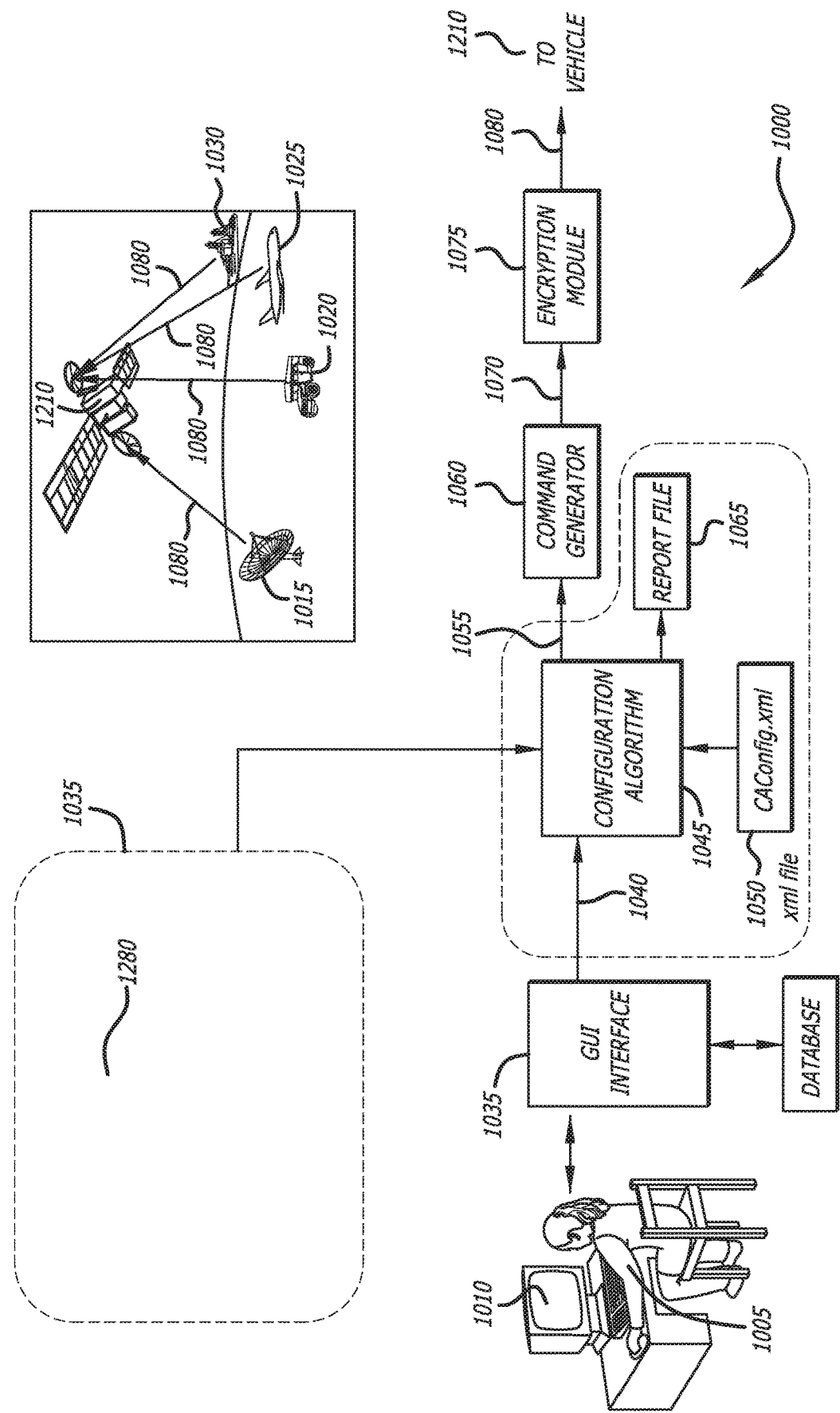

FIG. 10 is a diagram showing the disclosed system for a virtual transponder on a vehicle, in accordance with at least one embodiment of the present disclosure.

Figure 11:
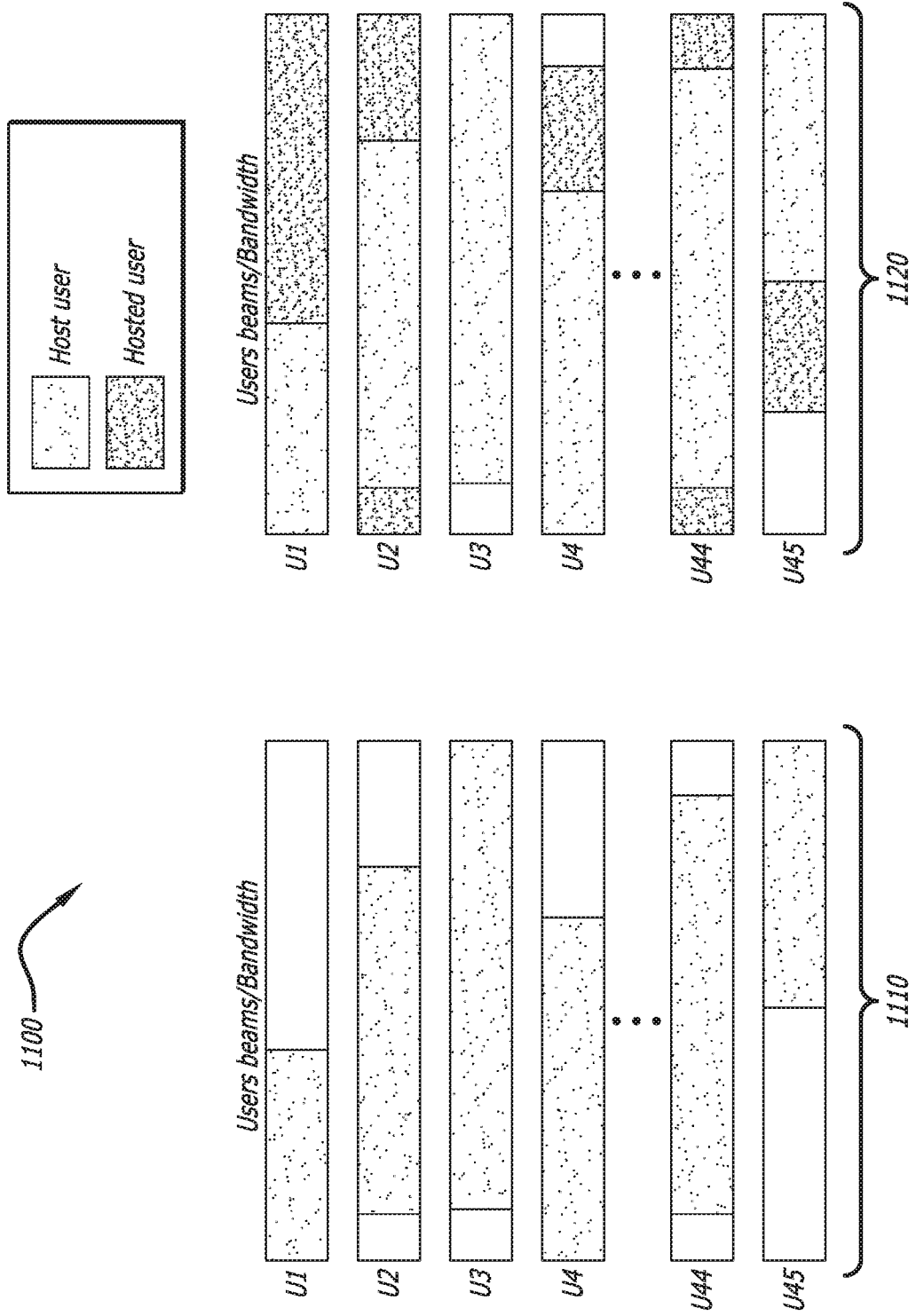

FIG. 11 is a diagram showing an exemplary allocation of bandwidth amongst a plurality of beams when utilizing the disclosed virtual transponder, in accordance with at least one embodiment of the present disclosure.

Figure 12:
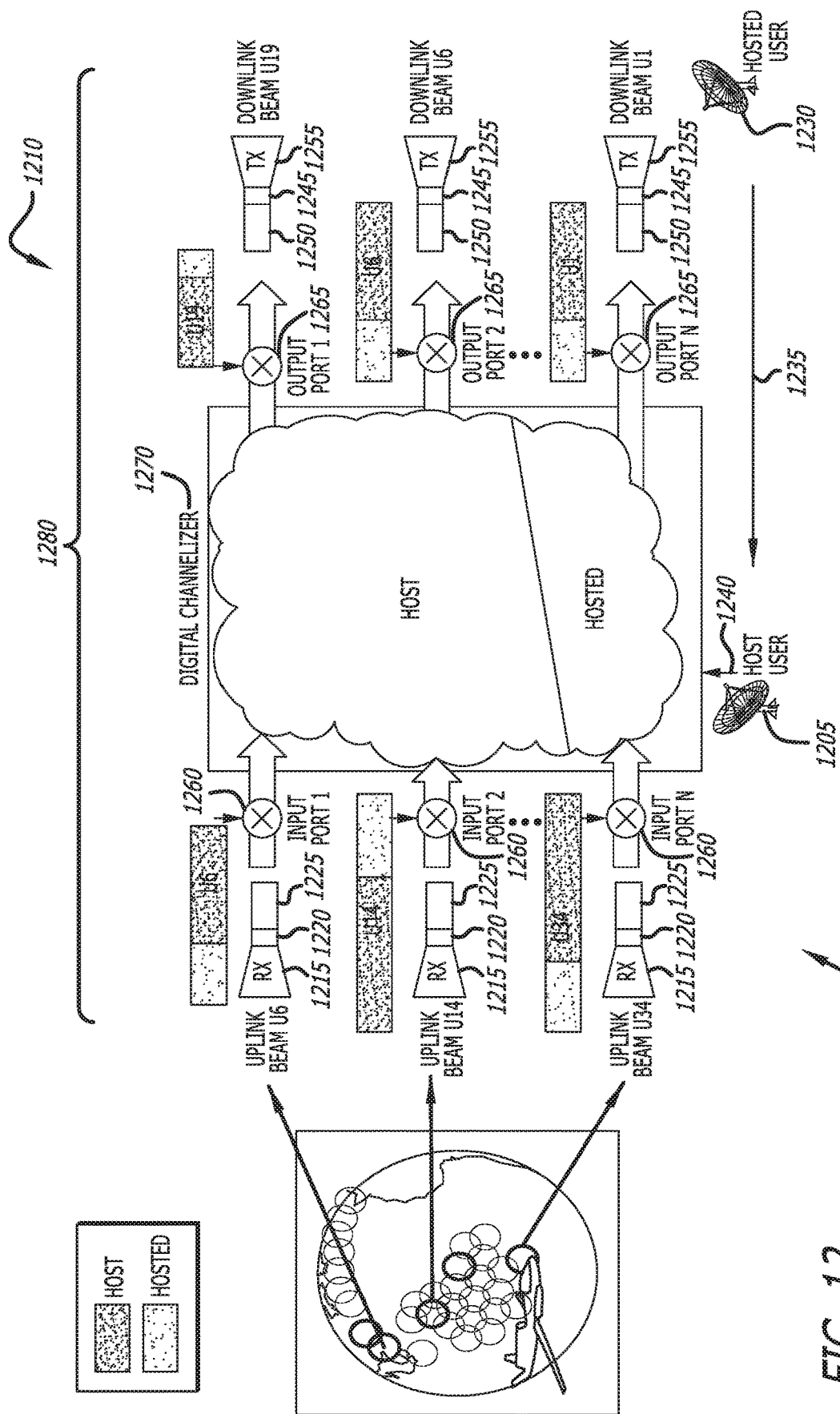

FIG. 12 is a diagram showing the switch architecture for a flexible allocation of bandwidth amongst a plurality of beams when utilizing the disclosed virtual transponder, in accordance with at least one embodiment of the present disclosure.

Figure 13:
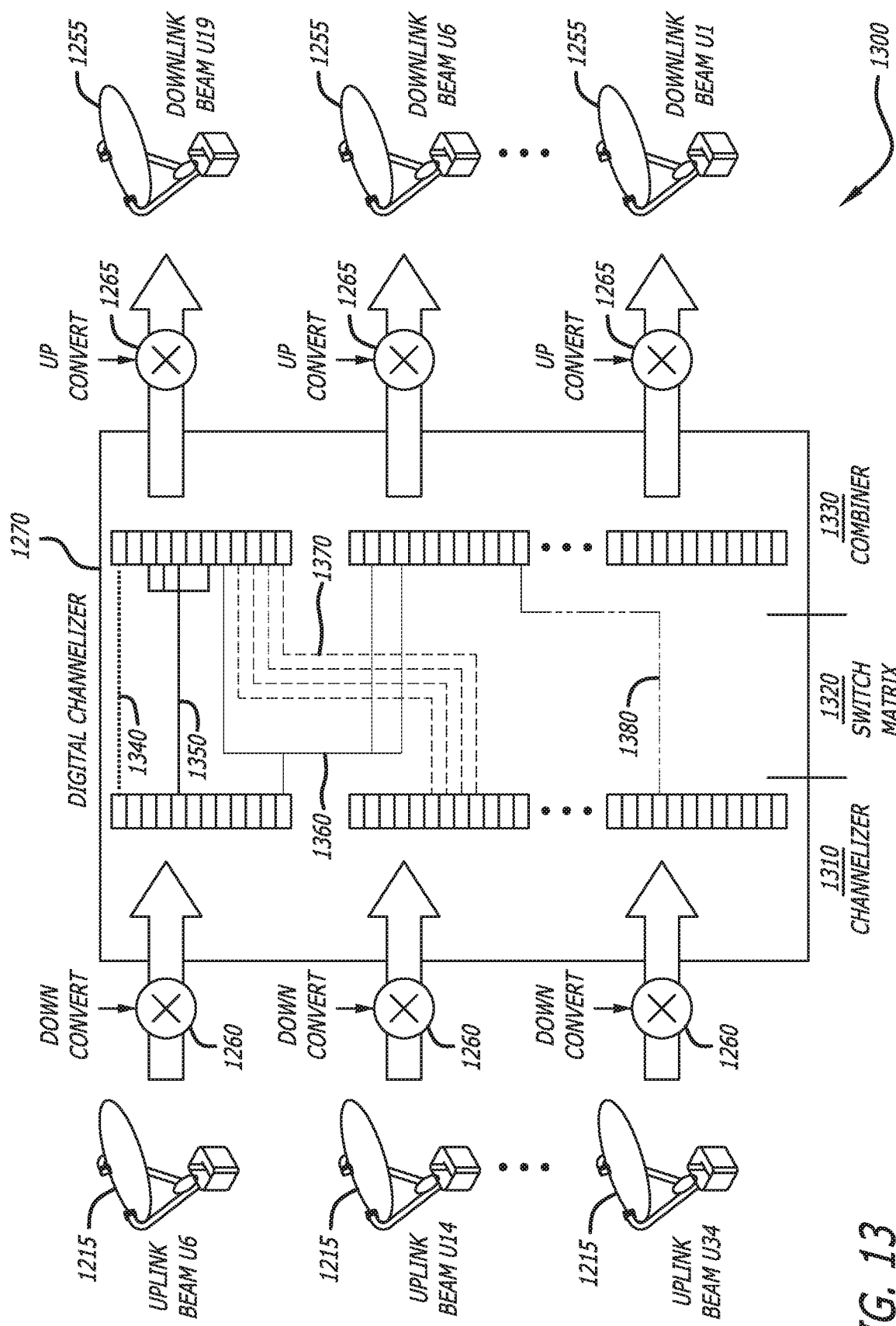

FIG. 13 is a diagram showing details of the digital channelizer of FIG. 12, in accordance with at least one embodiment of the present disclosure.

Figure 14:
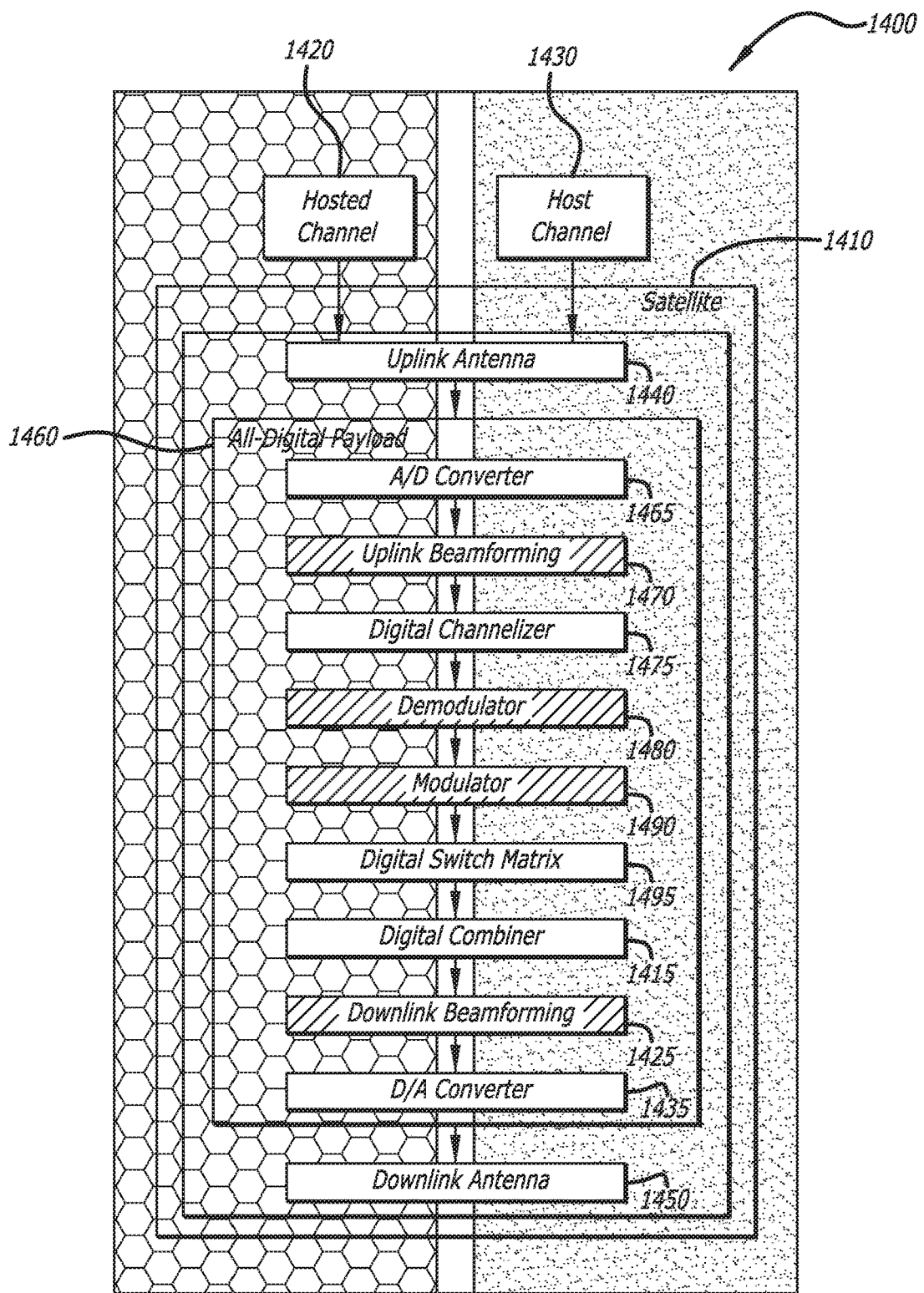
Figure 14:
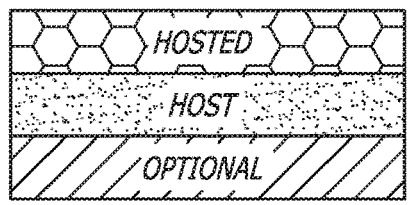

FIG. 14 is a diagram showing exemplary components on the vehicle that may be utilized by the disclosed virtual transponder, in accordance with at least one embodiment of the present disclosure.

Figure 15A:
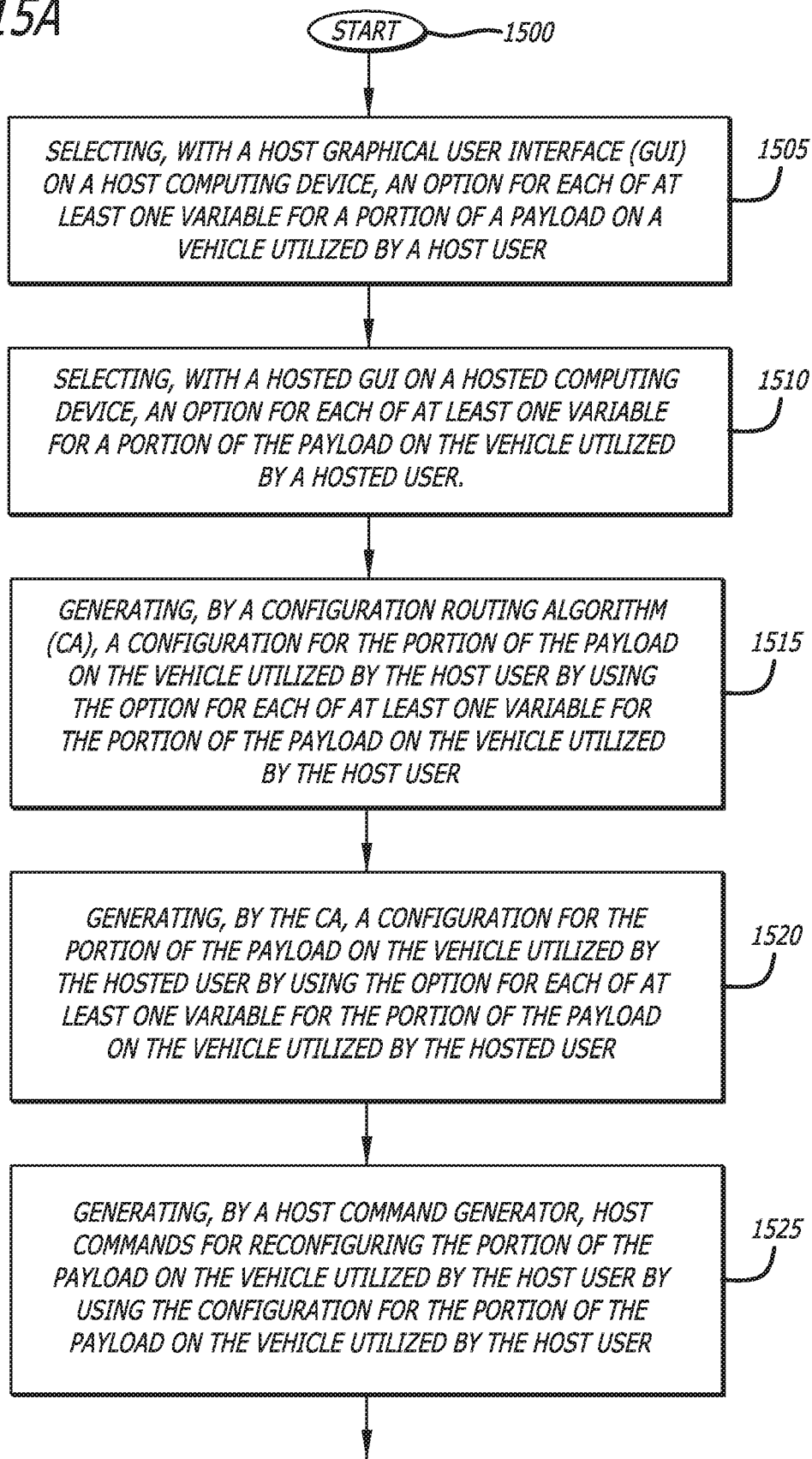
Figure 15B:
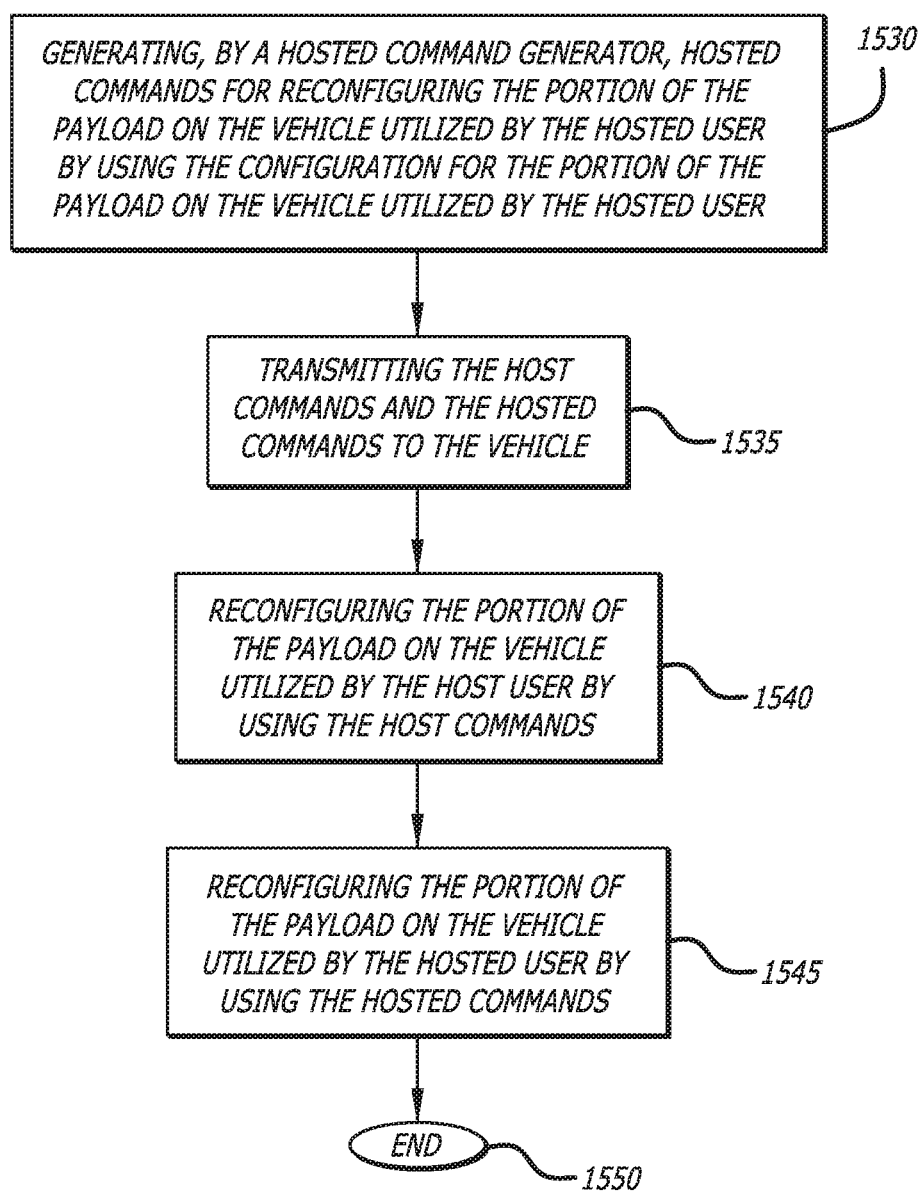

FIGS. 15A and 15B together show a flow chart for the disclosed method for a virtual transponder on a vehicle, in accordance with at least one embodiment of the present disclosure.

Figure 16:
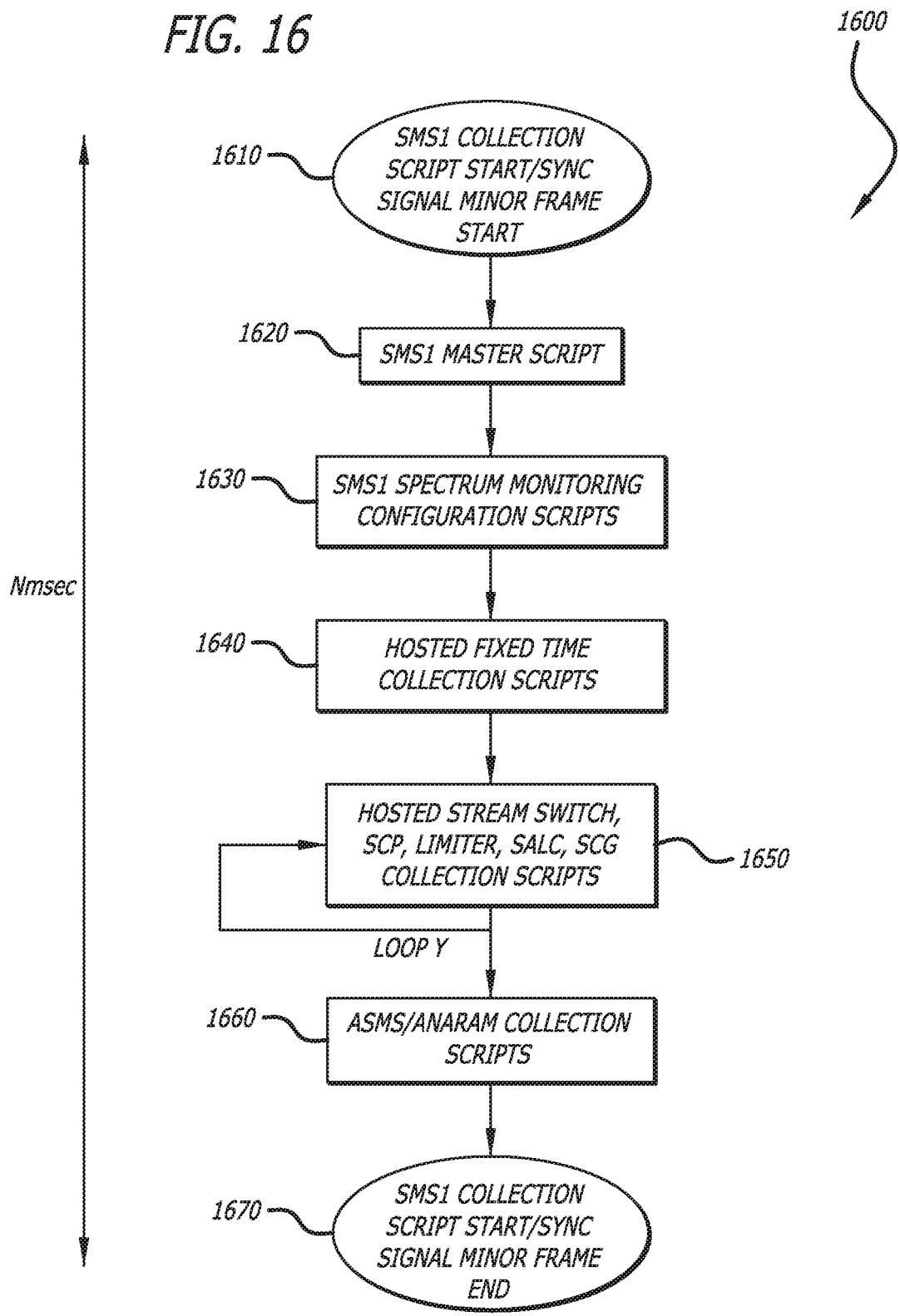

FIG. 16 is a diagram showing an exemplary script for inband telemetry for the hosted user, in accordance with at least one embodiment of the present disclosure.

Figure 17:
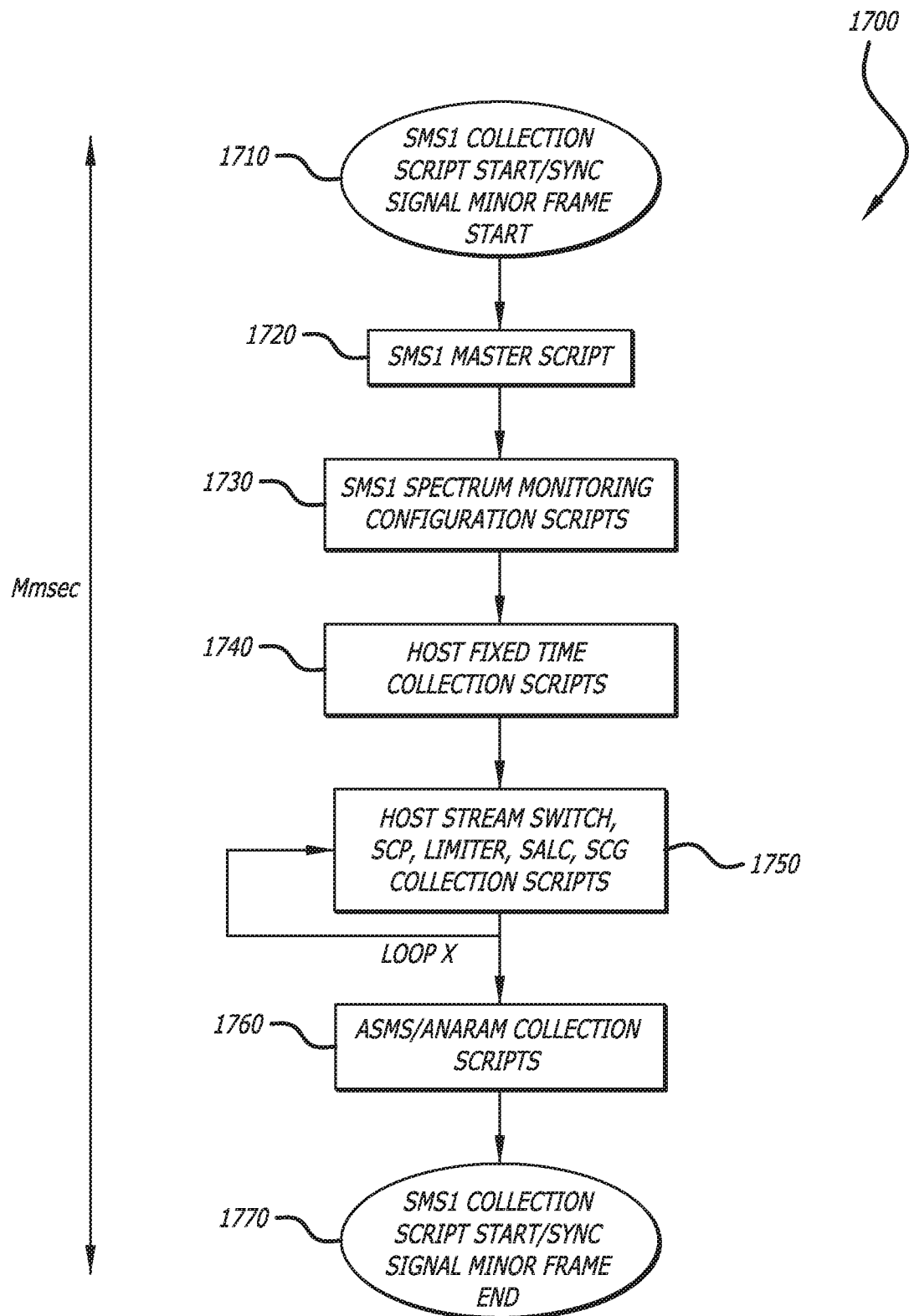

FIG. 17 is a diagram showing an exemplary script for inband telemetry for the host user, in accordance with at least one embodiment of the present disclosure.

Figure 18:
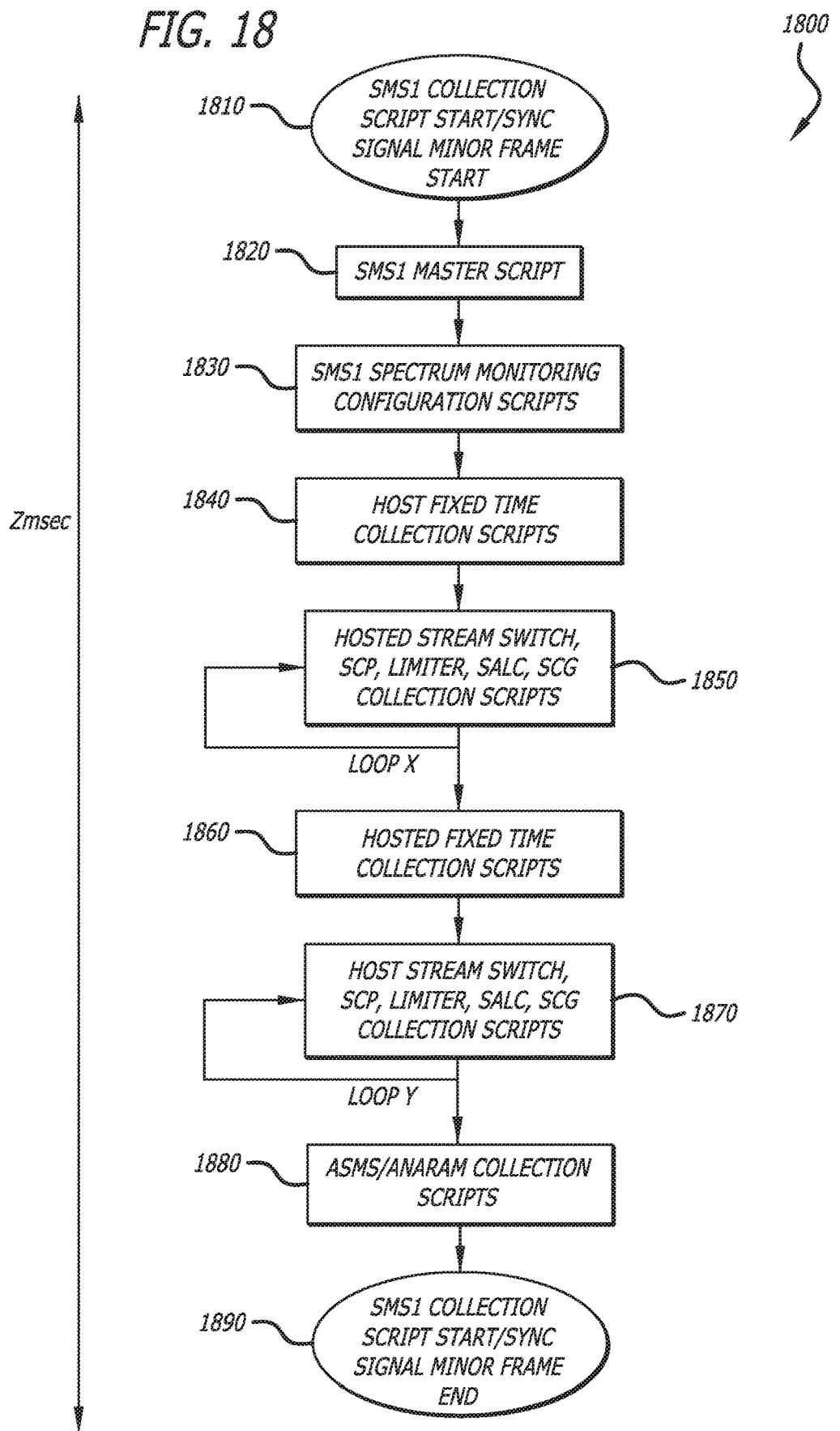

FIG. 18 is a diagram showing an exemplary script for inband telemetry for the host user and the hosted user, in accordance with at least one embodiment of the present disclosure.

Figure 19:
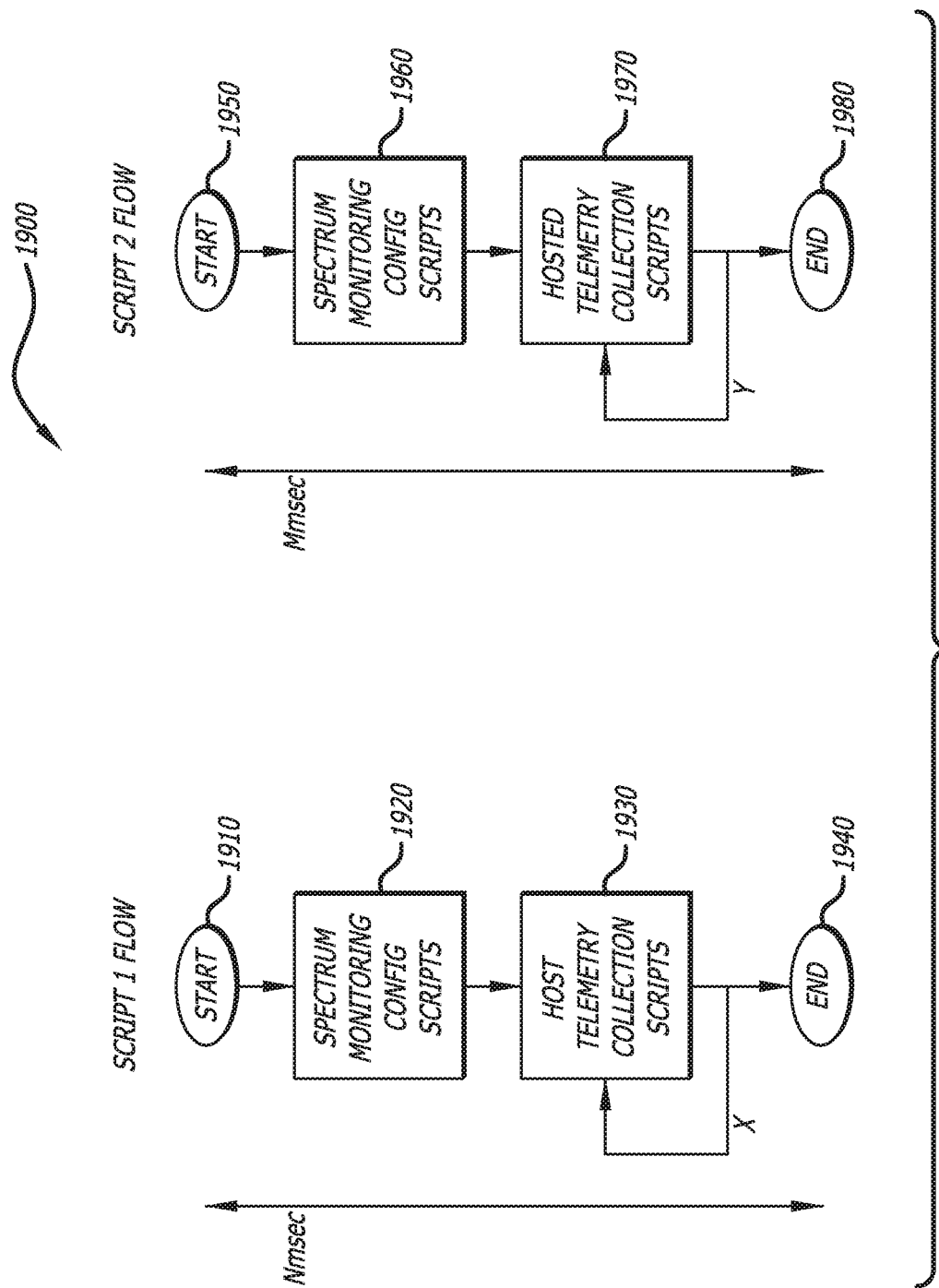

FIG. 19 is a diagram showing two exemplary scripts for inband telemetry for the host user and the hosted user, in accordance with at least one embodiment of the present disclosure.

DESCRIPTION

The methods and apparatus disclosed herein provide an operative system for virtual transponders utilizing inband telemetry. The system of the present disclosure allows for vehicle operators to privately share vehicle resources. It should be noted that in this disclosure, in-band frequency band(s) refer to a frequency band(s) that is the same frequency band(s) utilized to transmit payload data; and out-of-band frequency band(s) refer to a frequency band(s) that is not the same frequency band(s) utilized to transmit payload data.

As previously mentioned above, currently, typical transponders on a vehicle (e.g., a satellite) have the ability to perform switching of inputs to outputs of the payload. All of this switching on the payload is commanded and controlled by a single satellite controller with no resource allocation privacy. For example, in a digital transponder, when a user request for a channel with specific bandwidth and antenna characteristics is made, the channel is then set up, used, and then disconnected.

The disclosed system allows for private vehicle resource allocation and control that provides vehicle users the ability to privately, dynamically, allocate resources on demand. In particular, the disclosed system employs a virtual transponder, which is a transponder partitioned into multiple transponders with independent command and control. In one or more embodiments, an exemplary virtual transponder includes a digital transponder with a digital channelizer, a digital switch matrix, and a digital combiner that is configured to partition a digital transponder into multiple transponders with independent command and control. Command and control of the virtual transponder is achieved via ground software that provides dynamic allocation and privatization of the digital switch matrix for bandwidth on demand.

It should be noted that the disclosed system for private vehicle resource allocation and control may employ various different types of transponders for the virtual transponder other than the specific disclosed embodiments (e.g., depicted FIGS. 12-14) for the virtual transponder. For example, various different types of transponders may be employed for the virtual transponder including, but not limited to, various different types of digital transponders, various different types of analog transponders (e.g., conventional repeater-type transponders), and various different types of combination analog/digital transponders.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
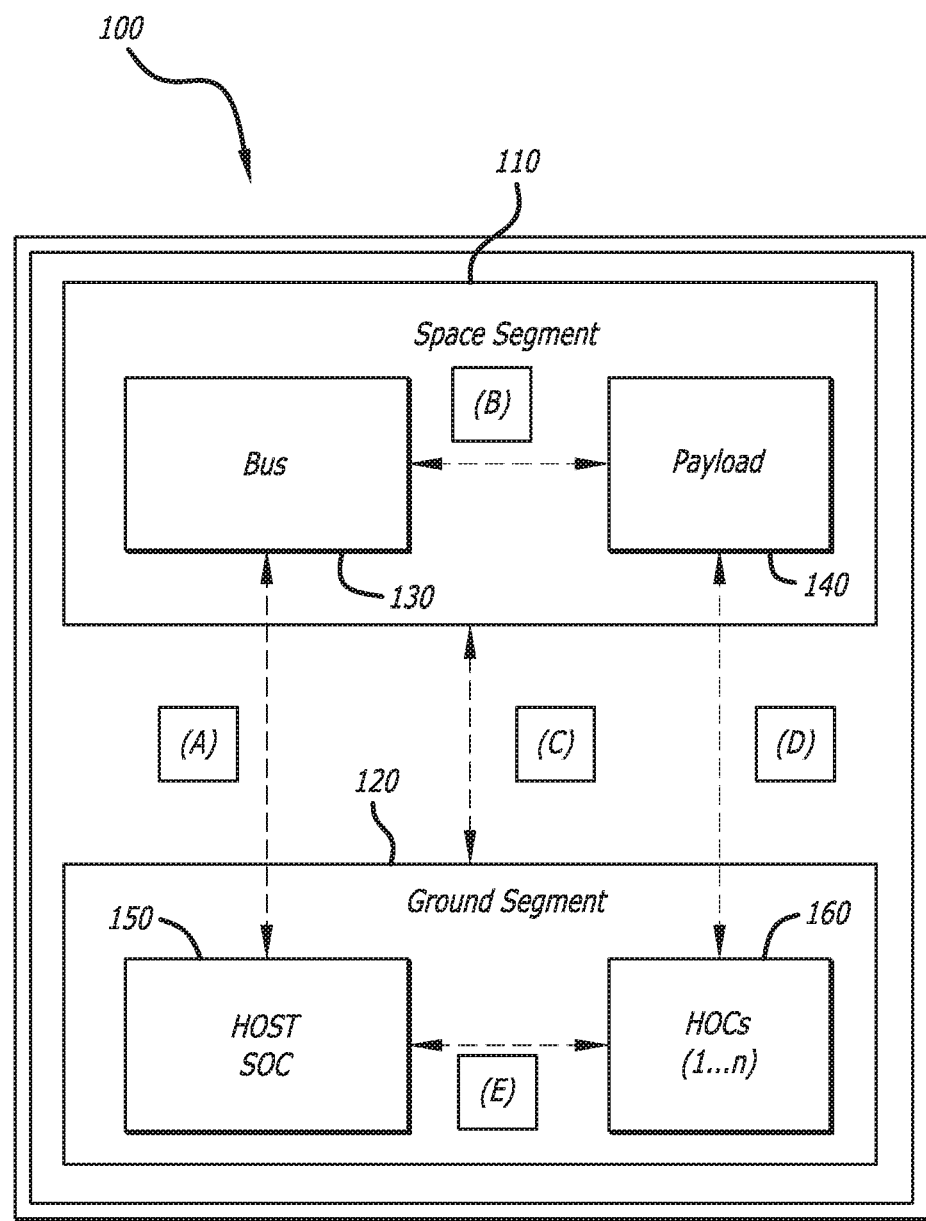
FIG. 1 is a diagram showing simplified architecture for the disclosed system for a virtual transponder, in accordance with at least one embodiment of the present disclosure.

FIG. 1 is a diagram 100 showing simplified architecture for the disclosed system for a virtual transponder, in accordance with at least one embodiment of the present disclosure. In this figure, a simplified view of multiple possible hosted payload configurations is illustrated. In particular, this figure shows a space segment 110 and a ground segment 120. The space segment 110 represents a vehicle. Various different types of vehicles may be employed for the vehicle including, but not limited to, an airborne vehicle. And, various different types of airborne vehicles may be employed for the vehicle including, but not limited to, a satellite, an aircraft, an unmanned aerial vehicle (UAV), and a space plane.

In the case of a satellite being employed for the vehicle, it should be noted that satellites typically include computer-controlled systems. A satellite generally includes a bus 130 and a payload 140. The bus 130 may include systems (which include components) that control the satellite. These systems perform tasks, such as power generation and control, thermal control, telemetry, attitude control, orbit control, and other suitable operations.

The payload 140 of the satellite provides functions to users of the satellite. The payload 140 may include antennas, transponders, and other suitable devices. For example, with respect to communications, the payload 140 in a satellite may be used to provide Internet access, telephone communications, radio, television, and other types of communications.

The payload 140 of the satellite may be used by different entities. For example, the payload 140 may be used by the owner of the satellite (i.e. the host user), one or more customers (i.e. the hosted user(s)), or some combination thereof.

For example, the owner of a satellite may lease different portions of the payload 140 to different customers. In one example, one group of antenna beams generated by the payload 140 of the satellite may be leased to one customer, while a second group of antenna beams may be leased to a second customer. In another example, one group of antenna beams generated by the payload 140 of the satellite may be utilized by the owner of the satellite, while a second group of antenna beams may be leased to a customer. In yet another example, some or all of the antenna beams generated by the payload 140 of the satellite may be shared by one customer and a second customer. In another example, some or all of the antenna beams generated by the payload 140 of the satellite may be shared by the owner of the satellite and a customer. When satellites are shared by different users, users may have a shared communications link (e.g., Interface A) to the satellite, or each user may have a separate communications link (e.g., Interfaces A and D) to the satellite.

Leasing a satellite to multiple customers may increase the revenues that an owner of a satellite can obtain. Further, a customer may use a subset of the total resources in a satellite for a cost that is less than the cost for the customer to purchase and operate a satellite, to build and operate a satellite, or to lease an entire satellite.

Referring back to FIG. 1, the ground segment 120 comprises a host spacecraft operations center (SOC) (e.g., a ground station associated with the owner of the satellite) 150, and a hosted payload (HoP) operation center(s) (HOC(s)) (e.g., a ground station(s) associated with a customer(s) that is leasing at least a portion of the payload of the satellite from the owner) 160.

FIG. 1 shows a number of different possible communication links (i.e. Interfaces A-E). It should be noted that the disclosed system may employ some or all of these illustrated communication links. Interface A, which may comprise multiple links, is an out-of-band command and telemetry link from the host SOC 150 to command the satellite. Interface B, which may comprise multiple links, is a communication link, between the bus 130 and the payload 140. Interface B may be used to control essential items, such as power. Information that may be communicated from the bus 130 to the payload 140 via Interface B may include, but is not limited to, time, ephemeris, and payload commands. Information that may be communicated from the payload 140 to the bus 130 via Interface B may include, but is not limited to, payload telemetry.

Interface C, which may comprise multiple links, is an inband command and telemetry link for bus and/or payload. Interface D, which may comprise multiple links, is a command and telemetry link from the HOC(s) 160 to command the satellite. Interface E, which may comprise multiple links, between the host SOC 150 and the HOCs 160 allows for requests from the HOCs for resource sharing of the payload 140.

FIGS. 2A-9H show exemplary systems and methods for a virtual transponder utilizing inband telemetry, in accordance with at least one embodiment of the present disclosure.

Figure 2A:
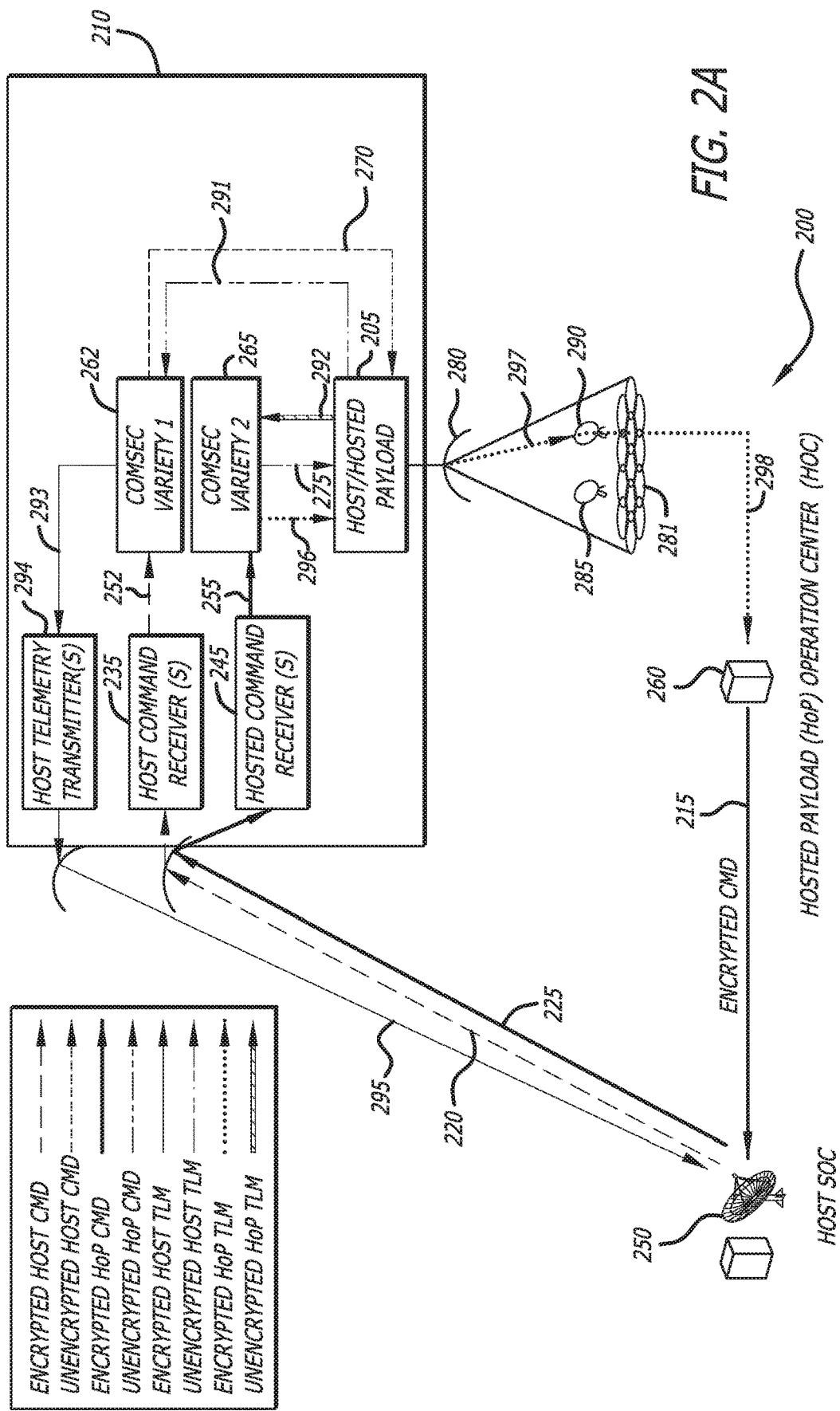

FIG. 2A is a diagram 200 showing the disclosed system for a virtual transponder utilizing inband telemetry for the hosted user (i.e. the HOC) 260 being transmitted to a hosted receiving antenna 290, in accordance with at least one embodiment of the present disclosure. In this figure, a vehicle 210, a host SOC 250, and a HOC 260 are shown. The HOC 260 has leased at least a portion (e.g., a virtual transponder(s)) of the payload 205 of the vehicle 210 from the owner of a satellite (i.e. the host SOC) 250. It should be noted that in some embodiments, the HOC 260 may lease all of the payload 205 of the vehicle 210 from the owner of a satellite (i.e. the host SOC) 250. Also, it should be noted that in some embodiments, the HOC 260 may own the payload 205 (e.g., a steerable antenna) of the vehicle 210, and contract the host SOC 250 to transmit encrypted hosted commands to the vehicle 210.

During operation, the HOC 260 encrypts unencrypted hosted commands (i.e. unencrypted HoP CMD), by utilizing a second communication security (COMSEC) variety, to produce encrypted hosted commands (i.e. encrypted HoP CMD). The hosted commands are commands that are used to configure the portion (i.e. a virtual transponder(s)) of the payload 205 that the HOC 260 is leasing from the host SOC 250. The host SOC 250 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 205 that host SOC 250 is utilizing for itself.

It should be noted that, although in FIG. 2A the host SOC 250 is depicted to have its ground antenna located right next to its operations building; in other embodiments, the host SOC 250 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 260 then transmits 215 the encrypted hosted commands to the host SOC 250. After the host SOC 250 receives the encrypted hosted commands, the host SOC 250 transmits 220 the encrypted host commands and transmits 225 the encrypted hosted commands to the vehicle 210. The host SOC 250 transmits 220, 225 the encrypted host commands and the encrypted hosted commands utilizing an out-of-band frequency band(s) (i.e. a frequency band(s) that is not the same frequency band(s) utilized to transmit payload data). The host command receiver 235 on the vehicle 210 receives the encrypted host commands. In addition, the hosted command receiver 245 on the vehicle 210 receives the encrypted hosted commands.

It should be noted that in other embodiments, the disclosed system for a virtual transponder utilizing inband telemetry may employ more or less receivers 235, 245 than as is shown in FIG. 2A.

The host command receiver 235 then transmits 252 the encrypted host commands to a first communication security module 262. The first communication security module 262 decrypts the encrypted host commands utilizing the first COMSEC variety (i.e. COMSEC Variety 1) to generate unencrypted host commands.

It should be noted that the first communication security module 262 may comprise one or more modules. In addition, the first communication security module 262 may comprise one or more processors.

The hosted command receiver 245 then transmits 255 the encrypted hosted commands to a second communication security module 265. The second communication security module 265 decrypts the encrypted hosted commands utilizing the second COMSEC variety (i.e. COMSEC Variety 2) to generate unencrypted hosted commands.

It should be noted that the second communication security module 265 may comprise one or more modules. In addition, the second communication security module 265 may comprise one or more processors.

The first communication security module 262 then transmits 270 the unencrypted host commands to the payload (i.e. the shared host/hosted payload) 205. The second communication security module 265 transmits 275 the unencrypted hosted commands to the payload (i.e. the shared host/hosted payload) 205. The payload 205 is reconfigured according to the unencrypted host commands and/or the unencrypted hosted commands. A payload antenna 280 then transmits (e.g., in one or more antenna beams 281) payload data to a host receiving antenna 285 and/or a hosted receiving antenna 290 on the ground. It should be noted that in some embodiments, the hosted receiving antenna 290 may be air based, sea based, or ground based, as is shown in FIG. 2A.

Also, it should be noted that, although in FIG. 2A, antenna beams 281 is shown to include a plurality of circular spot beams; in other embodiments, antenna beams 281 may include more or less number of beams than is shown in FIG. 2A (e.g., antenna beams 281 may only include a single beam), and antenna beams 281 may include beams of different shapes than circular spot beams as is shown in FIG. 2A (e.g., antenna beams 281 may include elliptical beams and/or shaped beams of various different shapes).

It should be noted that in one or more embodiments, the payload antenna 280 may comprise one or more reflector dishes including, but not limited to, parabolic reflectors and/or shaped reflectors. In some embodiments, the payload antenna 280 may comprise one or more multifeed antenna arrays.

The payload 205 transmits 291 unencrypted host telemetry (i.e. unencrypted host TLM, which is telemetry data related to the portion of the payload 205 that is utilized by the host SOC 250) to the first communication security module 262. The first communication security module 262 then encrypts the unencrypted host telemetry utilizing the first COMSEC variety to generate encrypted host telemetry (i.e. encrypted host TLM).

The payload 205 transmits 292 unencrypted hosted telemetry (i.e. unencrypted HoP TLM, which is telemetry data related to the portion of the payload 205 that is leased by the HOC 260) to the second communication security module 265. The second communication security module 265 then encrypts the unencrypted hosted telemetry utilizing the second COMSEC variety to generate encrypted hosted telemetry (i.e. encrypted HoP TLM).

The first communication security module 262 then transmits 293 the encrypted host telemetry to a host telemetry transmitter 294. The host telemetry transmitter 294 then transmits 295 the encrypted host telemetry to the host SOC 250. The host SOC 250 then decrypts the encrypted host telemetry utilizing the first COMSEC variety to generate the unencrypted host telemetry.

The second communication security module 265 then transmits 296 the encrypted hosted telemetry to the payload 205. The payload antenna 280 then transmits 297 the encrypted hosted telemetry to the hosted receiving antenna 290. The payload antenna 280 transmits 297 the encrypted hosted telemetry utilizing an inband frequency band(s) (i.e. at least one frequency band that is the same as at least one frequency band utilized to transmit payload data). The hosted receiving antenna 290 then transmits 298 the encrypted hosted telemetry to the HOC 260. The HOC 260 then decrypts the encrypted hosted telemetry utilizing the second COMSEC variety to generate the unencrypted hosted telemetry.

Figure 2B:
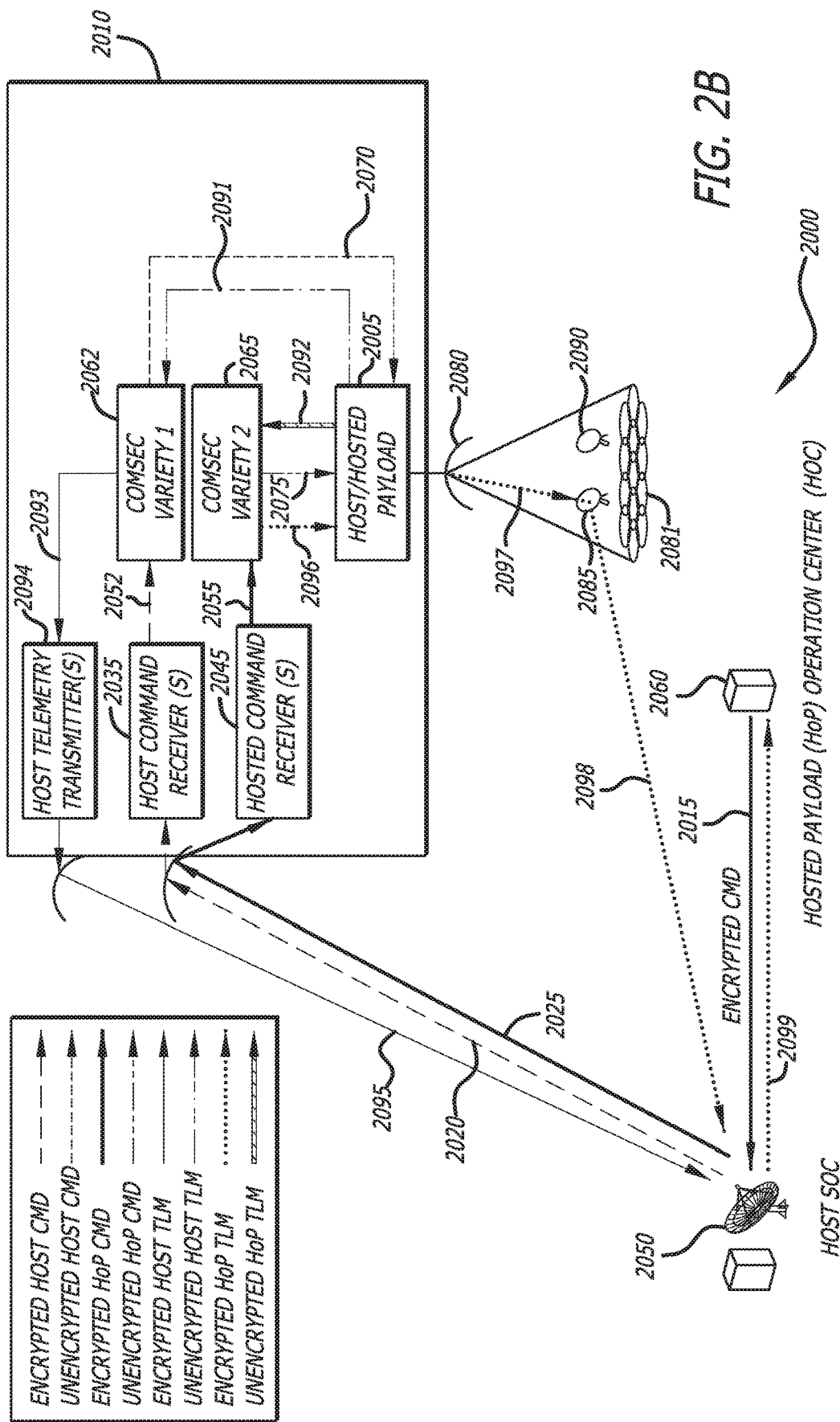
FIG. 2B is a diagram showing the disclosed system for a virtual transponder utilizing inband telemetry for the hosted user being transmitted to a host receiving antenna, in accordance with at least one embodiment of the present disclosure.
Figure 3A:
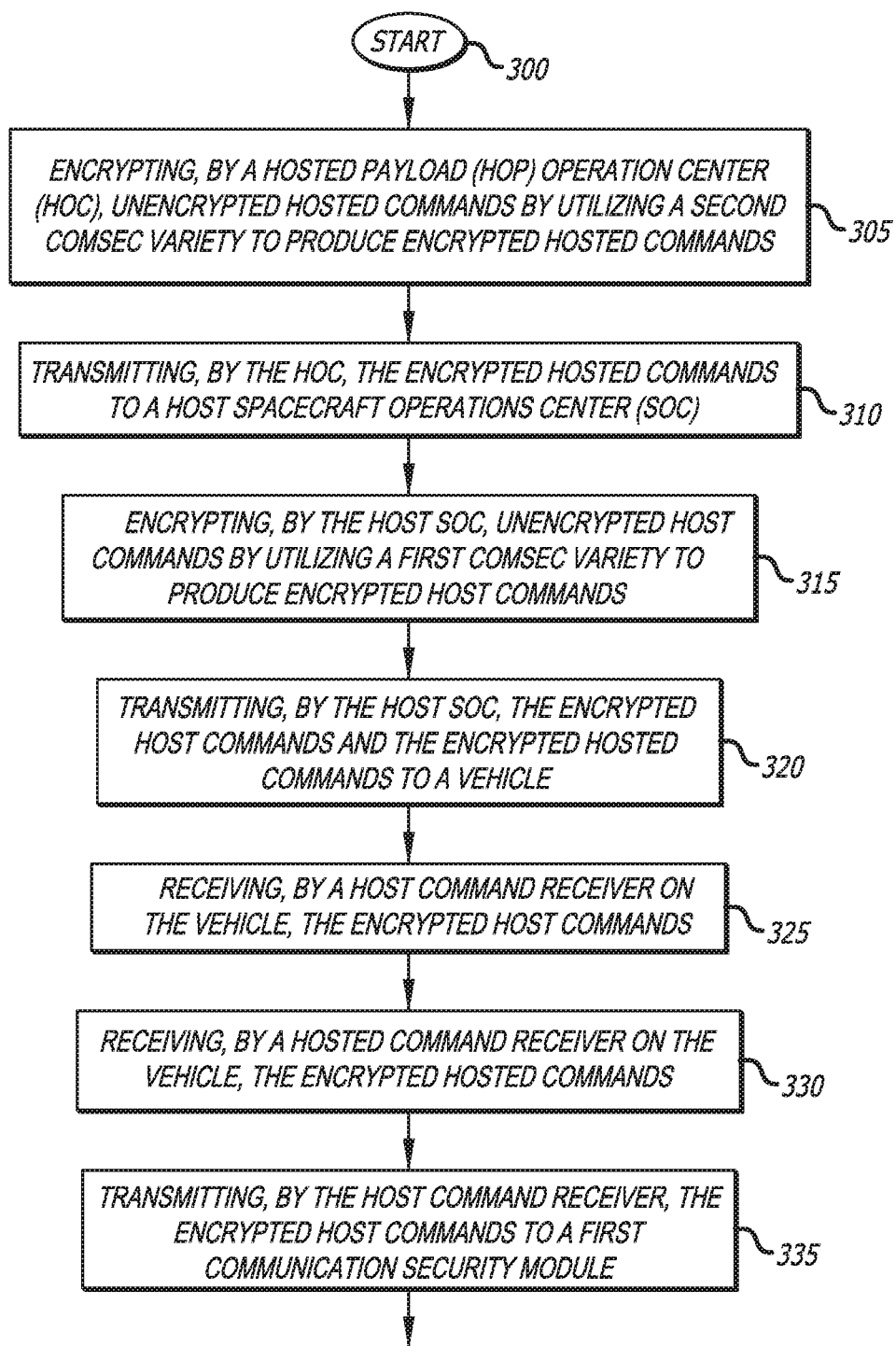
Figure 3C:
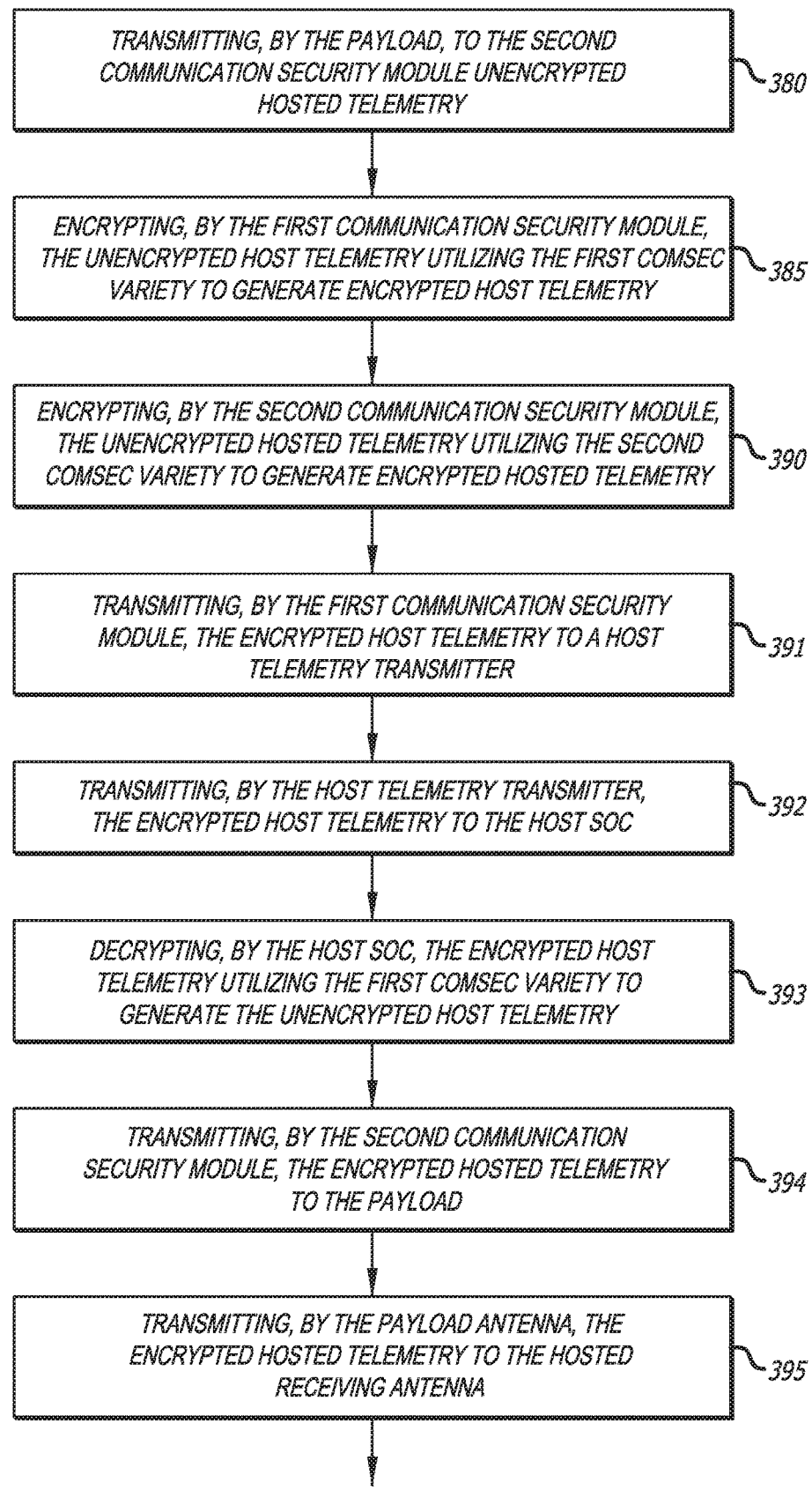
Figure 3D:
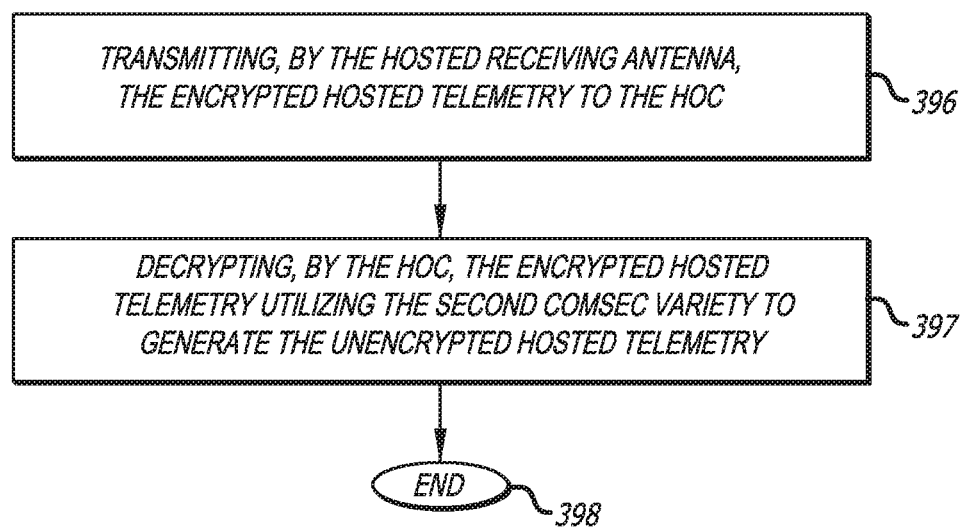
Figure 3E:
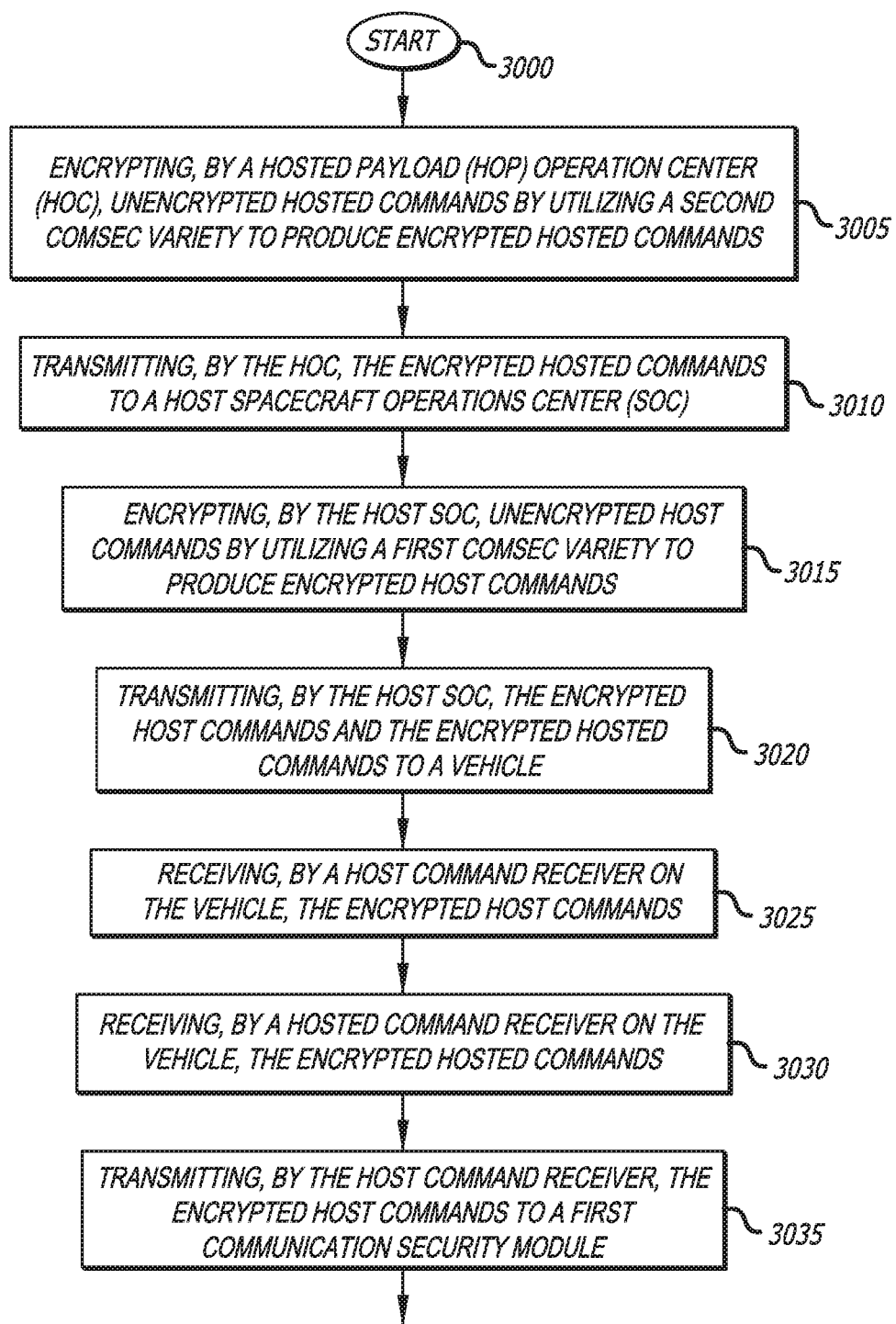
Figure 3F:
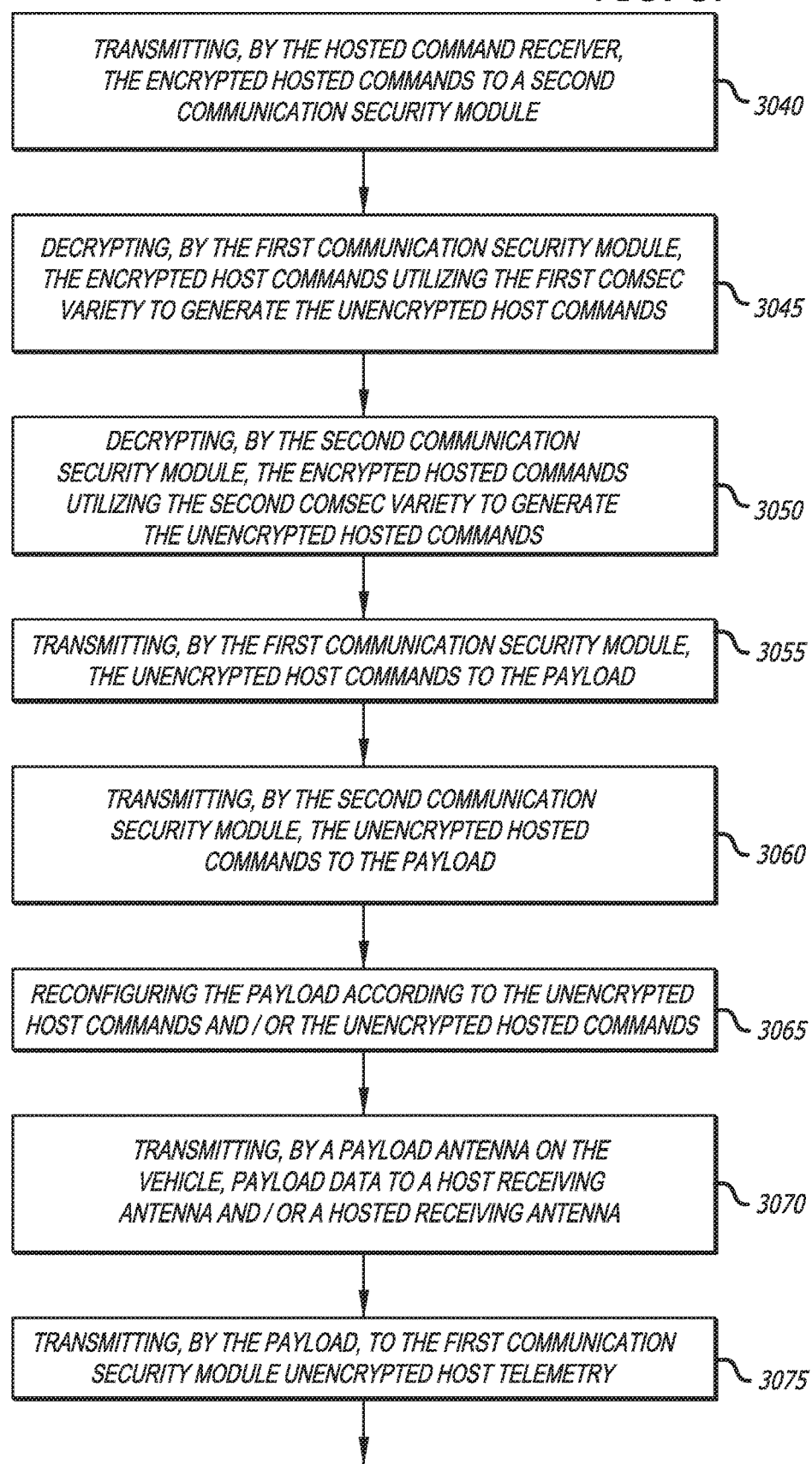

FIG. 2B is a diagram 2000 showing the disclosed system for a virtual transponder utilizing inband telemetry for the hosted user (i.e. the HOC) 2060 being transmitted to a host receiving antenna 2085, in accordance with at least one embodiment of the present disclosure. In this figure, a vehicle 2010, a host SOC 2050, and a HOC 2060 are shown. The HOC 2060 has leased at least a portion (e.g., a virtual transponder(s)) of the payload 2005 of the vehicle 2010 from the owner of a satellite (i.e. the host SOC) 2050. It should be noted that in some embodiments, the HOC 2060 may lease all of the payload 2005 of the vehicle 2010 from the owner of a satellite (i.e. the host SOC) 2050. Also, it should be noted that is some embodiments, the HOC 2060 may own the payload 2005 (e.g., a steerable antenna) of the vehicle 2010, and contract the host SOC 2050 to transmit encrypted hosted commands to the vehicle 2010.

During operation, the HOC 2060 encrypts unencrypted hosted commands (i.e. unencrypted HoP CMD), by utilizing a second communication security (COMSEC) variety, to produce encrypted hosted commands (i.e. encrypted HoP CMD). The hosted commands are commands that are used to configure the portion (i.e. a virtual transponder(s)) of the payload 2005 that the HOC 2060 is leasing from the host SOC 2050. The host SOC 2050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 2005 that host SOC 2050 is utilizing for itself.

It should be noted that, although in FIG. 2B the host SOC 2050 is depicted to have its ground antenna located right next to its operations building; in other embodiments, the host SOC 2050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 2060 then transmits 2015 the encrypted hosted commands to the host SOC 2050. After the host SOC 2050 receives the encrypted hosted commands, the host SOC 2050 transmits 2020 the encrypted host commands and transmits 2025 the encrypted hosted commands to the vehicle 2010. The host SOC 2050 transmits 2020, 2025 the encrypted host commands and the encrypted hosted commands utilizing an out-of-band frequency band(s) (i.e. a frequency band(s) that is not the same frequency band(s) utilized to transmit payload data). The host command receiver 2035 on the vehicle 2010 receives the encrypted host commands. In addition, the hosted command receiver 2045 on the vehicle 2010 receives the encrypted hosted commands.

It should be noted that in other embodiments, the disclosed system for a virtual transponder utilizing inband telemetry may employ more or less receivers 2035, 2045 than as is shown in FIG. 2B.

The host command receiver 2035 then transmits 2052 the encrypted host commands to a first communication security module 2062. The first communication security module 2062 decrypts the encrypted host commands utilizing the first COMSEC variety (i.e. COMSEC Variety 1) to generate unencrypted host commands.

It should be noted that the first communication security module 2062 may comprise one or more modules. In addition, the first communication security module 2062 may comprise one or more processors.

The hosted command receiver 2045 then transmits 2055 the encrypted hosted commands to a second communication security module 2065. The second communication security module 2065 decrypts the encrypted hosted commands utilizing the second COMSEC variety (i.e. COMSEC Variety 2) to generate unencrypted hosted commands.

It should be noted that the second communication security module 2065 may comprise one or more modules. In addition, the second communication security module 2065 may comprise one or more processors.

The first communication security module 2062 then transmits 2070 the unencrypted host commands to the payload (i.e. the shared host/hosted payload) 2005. The second communication security module 2065 transmits 2075 the unencrypted hosted commands to the payload (i.e. the shared host/hosted payload) 2005. The payload 2005 is reconfigured according to the unencrypted host commands and/or the unencrypted hosted commands. A payload antenna 2080 then transmits (e.g., in one or more antenna beams 2081) payload data to a host receiving antenna 2085 and/or a hosted receiving antenna 2090 on the ground. It should be noted that in some embodiments, the hosted receiving antenna 2090 may be air based, sea based, or ground based, as is shown in FIG. 2B.

Also, it should be noted that, although in FIG. 2B, antenna beams 2081 is shown to include a plurality of circular spot beams; in other embodiments, antenna beams 2081 may include more or less number of beams than is shown in FIG. 2B (e.g., antenna beams 2081 may only include a single beam), and antenna beams 2081 may include beams of different shapes than circular spot beams as is shown in FIG. 2B (e.g., antenna beams 2081 may include elliptical beams and/or shaped beams of various different shapes).

It should be noted that in one or more embodiments, the payload antenna 2080 may comprise one or more reflector dishes including, but not limited to, parabolic reflectors and/or shaped reflectors. In some embodiments, the payload antenna 2080 may comprise one or more multifeed antenna arrays.

The payload 2005 transmits 2091 unencrypted host telemetry (i.e. unencrypted host TLM, which is telemetry data related to the portion of the payload 2005 that is utilized by the host SOC 2050) to the first communication security module 2062. The first communication security module 2062 then encrypts the unencrypted host telemetry utilizing the first COMSEC variety to generate encrypted host telemetry (i.e. encrypted host TLM).

The payload 2005 transmits 2092 unencrypted hosted telemetry (i.e. unencrypted HoP TLM, which is telemetry data related to the portion of the payload 2005 that is leased by the HOC 2060) to the second communication security module 2065. The second communication security module 2065 then encrypts the unencrypted hosted telemetry utilizing the second COMSEC variety to generate encrypted hosted telemetry (i.e. encrypted HoP TLM).

The first communication security module 2062 then transmits 2093 the encrypted host telemetry to a host telemetry transmitter 2094. The host telemetry transmitter 2094 then transmits 2095 the encrypted host telemetry to the host SOC 2050. The host SOC 2050 then decrypts the encrypted host telemetry utilizing the first COMSEC variety to generate the unencrypted host telemetry.

The second communication security module 2065 then transmits 2096 the encrypted hosted telemetry to the payload 2005. The payload antenna 2080 then transmits 2097 the encrypted hosted telemetry to the host receiving antenna 2085. The payload antenna 2080 transmits 2097 the encrypted hosted telemetry utilizing an inband frequency band(s) (i.e. at least one frequency band that is the same as at least one frequency band utilized to transmit payload data). The host receiving antenna 2085 then transmits 2098 the encrypted hosted telemetry to the host SOC 2050. The host SOC 2050 transmits 2099 the encrypted hosted telemetry to the HOC 2060. The HOC 2060 then decrypts the encrypted hosted telemetry utilizing the second COMSEC variety to generate the unencrypted hosted telemetry.

FIGS. 3A, 3B, 3C, and 3D together show a flow chart for the disclosed method for a virtual transponder utilizing inband telemetry for the hosted user being transmitted to a hosted receiving antenna, in accordance with at least one embodiment of the present disclosure. At the start 300 of the method, a hosted payload (HoP) operation center (HOC)

encrypts unencrypted hosted commands by utilizing a second COMSEC variety to produce encrypted hosted commands 305. Then, the HOC transmits the encrypted hosted commands to a host spacecraft operations center (SOC) 310. The host SOC encrypts unencrypted host commands by utilizing a first COMSEC variety to produce encrypted host commands 315. Then, the host SOC transmits (out-of-band) the encrypted host commands and the encrypted hosted commands to a vehicle 320.

Then, a host command receiver on the vehicle receives the encrypted host commands 325. And, a hosted command receiver on the vehicle receives the encrypted hosted commands 330. The host command receiver transmits the encrypted host commands to a first communication security module 335. The hosted command receiver transmits the encrypted hosted commands to a second communication security module 340. The first communication security module then decrypts the encrypted host commands utilizing the first COMSEC variety to generate the unencrypted host commands 345. The second communication security module then decrypts the encrypted hosted commands utilizing the second COMSEC variety to generate the unencrypted hosted commands 350.

The first communication security module then transmits the unencrypted host commands to the payload 355. The second communication security module then transmits the unencrypted hosted commands to the payload 360. Then, the payload is reconfigured according to the unencrypted host commands and/or the unencrypted hosted commands 365. A payload antenna on the vehicle then transmits payload data to a host receiving antenna and/or a hosted receiving antenna 370.

Then, the payload transmits to the first communication security module unencrypted host telemetry 375. And, the payload transmits to the second communication security module unencrypted hosted telemetry 380. The first communication security module encrypts the unencrypted host telemetry utilizing the first COMSEC variety to generate encrypted host telemetry 385. And, the second communication security module encrypts the unencrypted hosted telemetry utilizing the second COMSEC variety to generate encrypted hosted telemetry 390.

The first communication security module then transmits the encrypted host telemetry to a host telemetry transmitter 391. Then, the host telemetry transmitter transmits the encrypted host telemetry to the host SOC 392. The host SOC then decrypts the encrypted host telemetry utilizing the first COMSEC variety to generate the unencrypted host telemetry 393.

The second communication security module transmits the encrypted hosted telemetry to the payload 394. Then, the payload antenna transmits the encrypted hosted telemetry to the hosted receiving antenna 395. The hosted receiving antenna then transmits the encrypted hosted telemetry to the HOC 396. Then, the HOC decrypts the encrypted hosted telemetry utilizing the second COMSEC variety to generate the unencrypted hosted telemetry 397. Then, the method ends 398.

FIGS. 3E, 3F, 3G, and 3H together show a flow chart for the disclosed method for a virtual transponder utilizing inband telemetry for the hosted user being transmitted to a host receiving antenna, in accordance with at least one embodiment of the present disclosure. At the start 3000 of the method, a hosted payload (HoP) operation center (HOC) encrypts unencrypted hosted commands by utilizing a second COMSEC variety to produce encrypted hosted commands 3005. Then, the HOC transmits the encrypted hosted commands to a host spacecraft operations center (SOC) 3010. The host SOC encrypts unencrypted host commands by utilizing a first COMSEC variety to produce encrypted host commands 3015. Then, the host SOC transmits (out-of-band) the encrypted host commands and the encrypted hosted commands to a vehicle 3020.

Then, a host command receiver on the vehicle receives the encrypted host commands 3025. And, a hosted command receiver on the vehicle receives the encrypted hosted commands 3030. The host command receiver transmits the encrypted host commands to a first communication security module 3035. The hosted command receiver transmits the encrypted hosted commands to a second communication security module 3040. The first communication security module then decrypts the encrypted host commands utilizing the first COMSEC variety to generate the unencrypted host commands 3045. The second communication security module then decrypts the encrypted hosted commands utilizing the second COMSEC variety to generate the unencrypted hosted commands 3050.

The first communication security module then transmits the unencrypted host commands to the payload 3055. The second communication security module then transmits the unencrypted hosted commands to the payload 3060. Then, the payload is reconfigured according to the unencrypted host commands and/or the unencrypted hosted commands 3065. A payload antenna on the vehicle then transmits payload data to a host receiving antenna and/or a hosted receiving antenna 3070.

Then, the payload transmits to the first communication security module unencrypted host telemetry 3075. And, the payload transmits to the second communication security module unencrypted hosted telemetry 3080. The first communication security module encrypts the unencrypted host telemetry utilizing the first COMSEC variety to generate encrypted host telemetry 3085. And, the second communication security module encrypts the unencrypted hosted telemetry utilizing the second COMSEC variety to generate encrypted hosted telemetry 3090.

The first communication security module then transmits the encrypted host telemetry to a host telemetry transmitter 3091. Then, the host telemetry transmitter transmits the encrypted host telemetry to the host SOC 3092. The host SOC then decrypts the encrypted host telemetry utilizing the first COMSEC variety to generate the unencrypted host telemetry 3093.

The second communication security module transmits the encrypted hosted telemetry to the payload 3094. Then, the payload antenna transmits the encrypted hosted telemetry to the host receiving antenna 3095. The host receiving antenna then transmits the encrypted hosted telemetry to the host SOC 3096. The host SOC transmits the encrypted hosted telemetry to the HOC 3097. Then, the HOC decrypts the encrypted hosted telemetry utilizing the second COMSEC variety to generate the unencrypted hosted telemetry 3098. Then, the method ends 3099.

FIG. 4 is a diagram 400 showing the disclosed system for a virtual transponder utilizing inband telemetry for the host user (i.e. the host SOC) 450, in accordance with at least one embodiment of the present disclosure. In this figure, a vehicle 410, a host SOC 450, and a HOC 460 are shown. The HOC 460 has leased at least a portion (i.e. a virtual transponder(s)) of the payload 405 of the vehicle 410 from the owner of a satellite (i.e. the host SOC) 450. It should be noted that in some embodiments, the HOC 460 may lease all of the payload 405 of the vehicle 410 from the owner of a satellite (i.e. the host SOC) 450. Also, it should be noted that is some embodiments, the HOC 460 may own the payload 405 (e.g., a steerable antenna) of the vehicle 410, and contract the host SOC 450 to transmit encrypted hosted commands to the vehicle 410.

During operation, the HOC 460 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (i.e. a virtual transponder(s)) of the payload 405 that the HOC 460 is leasing from the host SOC 450. The host SOC 450 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 405 that host SOC 450 is utilizing for itself.

It should be noted that, although in FIG. 4 the host SOC 450 is depicted to have its ground antenna located right next to its operations building; in other embodiments, the host SOC 450 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 460 then transmits 415 the encrypted hosted commands to the host SOC 450. After the host SOC 450 receives the encrypted hosted commands, the host SOC 450 transmits 420 the encrypted host commands and transmits 425 the encrypted hosted commands to the vehicle 410. The host SOC 450 transmits 420, 425 the encrypted host commands and the encrypted hosted commands utilizing an out-of-band frequency band(s) (i.e. a frequency band(s) that is not the same frequency band(s) utilized to transmit payload data). The host command receiver 435 on the vehicle 410 receives the encrypted host commands. In addition, the hosted command receiver 445 on the vehicle 410 receives the encrypted hosted commands.

It should be noted that in other embodiments, the disclosed system for a virtual transponder utilizing inband telemetry may employ more or less receivers 435, 445 than as is shown in FIG. 4.

The host command receiver 435 then transmits 452 the encrypted host commands to a first communication security module 462. The first communication security module 462 decrypts the encrypted host commands utilizing the first COMSEC variety (i.e. COMSEC Variety 1) to generate unencrypted host commands.

It should be noted that the first communication security module 462 may comprise one or more modules. In addition, the first communication security module 462 may comprise one or more processors.

The hosted command receiver 445 then transmits 455 the encrypted hosted commands to a second communication security module 465. The second communication security module 465 decrypts the encrypted hosted commands utilizing the second COMSEC variety (i.e. COMSEC Variety 2) to generate unencrypted hosted commands.

It should be noted that the second communication security module 465 may comprise one or more modules. In addition, the second communication security module 465 may comprise one or more processors.

The first communication security module 462 then transmits 470 the unencrypted host commands to the payload (i.e. the shared host/hosted payload) 405. The second communication security module 465 transmits 475 the unencrypted hosted commands to the payload (i.e. the shared host/hosted payload) 405. The payload 405 is reconfigured according to the unencrypted host commands and/or the unencrypted hosted commands. A payload antenna 480 then transmits (e.g., in one or more antenna beams 481) payload data to a host receiving antenna 485 and/or a hosted receiving antenna 490 on the ground. It should be noted that in some embodiments, the hosted receiving antenna 490 may be air based, sea based, or ground based, as is shown in FIG. 4.

Also, it should be noted that, although in FIG. 4, antenna beams 481 is shown to include a plurality of circular spot beams; in other embodiments, antenna beams 481 may include more or less number of beams than is shown in FIG. 4 (e.g., antenna beams 481 may only include a single beam), and antenna beams 481 may include beams of different shapes than circular spot beams as is shown in FIG. 4 (e.g., antenna beams 481 may include elliptical beams and/or shaped beams of various different shapes).

It should be noted that in one or more embodiments, the payload antenna 480 may comprise one or more reflector dishes including, but not limited to, parabolic reflectors and/or shaped reflectors. In some embodiments, the payload antenna 480 may comprise one or more multifeed antenna arrays.

The payload 405 transmits 491 unencrypted host telemetry (i.e. unencrypted host TLM, which is telemetry data related to the portion of the payload 405 that is utilized by the host SOC 450) to the first communication security module 462. The first communication security module 462 then encrypts the unencrypted host telemetry utilizing the first COMSEC variety to generate encrypted host telemetry (i.e. encrypted host TLM).

The payload 405 transmits 492 unencrypted hosted telemetry (i.e. unencrypted HoP TLM, which is telemetry data related to the portion of the payload 405 that is leased by the HOC 460) to the second communication security module 465. The second communication security module 465 then encrypts the unencrypted hosted telemetry utilizing the second COMSEC variety to generate encrypted hosted telemetry (i.e. encrypted HoP TLM).

The first communication security module 462 then transmits 493 the encrypted host telemetry to the payload 405. The payload antenna 480 then transmits 497 the encrypted host telemetry to the host receiving antenna 485. The payload antenna 480 transmits 497 the encrypted host telemetry utilizing an inband frequency band(s) (i.e. at least one frequency band that is the same as at least one frequency band utilized to transmit payload data). The host receiving antenna 485 then transmits 498 the encrypted host telemetry to the host SOC 450. The host SOC 450 then decrypts the encrypted host telemetry utilizing the first COMSEC variety to generate the unencrypted host telemetry.

The second communication security module 465 then transmits 496 the encrypted hosted telemetry to a hosted telemetry transmitter 494. The hosted telemetry transmitter 494 then transmits 495 the encrypted hosted telemetry to the host SOC 450. The host SOC 450 then transmits 499 the encrypted hosted telemetry to the HOC 460. The HOC 460 then decrypts the encrypted hosted telemetry utilizing the second COMSEC variety to generate the unencrypted hosted telemetry.

FIGS. 5A, 5B, 5C, and 5D together show a flow chart for the disclosed method for a virtual transponder utilizing inband telemetry for the host user, in accordance with at least one embodiment of the present disclosure. At the start 500 of the method, a hosted payload (HoP) operation center (HOC) encrypts unencrypted hosted commands by utilizing a second COMSEC variety to produce encrypted hosted commands 505. Then, the HOC transmits the encrypted hosted commands to a host spacecraft operations center (SOC) 510. The host SOC encrypts unencrypted host commands by utilizing a first COMSEC variety to produce encrypted host commands 515. Then, the host SOC transmits (out-of-band) the encrypted host commands and the encrypted hosted commands to a vehicle 520.

Then, a host command receiver on the vehicle receives the encrypted host commands 525. And, a hosted command receiver on the vehicle receives the encrypted hosted commands 530. The host command receiver transmits the encrypted host commands to a first communication security module 535. The hosted command receiver transmits the encrypted hosted commands to a second communication security module 540. The first communication security module then decrypts the encrypted host commands utilizing the first COMSEC variety to generate the unencrypted host commands 545. The second communication security module then decrypts the encrypted hosted commands utilizing the second COMSEC variety to generate the unencrypted hosted commands 550.

The first communication security module then transmits the unencrypted host commands to the payload 555. The second communication security module then transmits the unencrypted hosted commands to the payload 560. Then, the payload is reconfigured according to the unencrypted host commands and/or the unencrypted hosted commands 565. A payload antenna on the vehicle then transmits payload data to a host receiving antenna and/or a hosted receiving antenna 570.

Then, the payload transmits to the first communication security module unencrypted host telemetry 575. And, the payload transmits to the second communication security module unencrypted hosted telemetry 580. The first communication security module encrypts the unencrypted host telemetry utilizing the first COMSEC variety to generate encrypted host telemetry 585. And, the second communication security module encrypts the unencrypted hosted telemetry utilizing the second COMSEC variety to generate encrypted hosted telemetry 590.

The first communication security module then transmits the encrypted host telemetry to the payload 591. Then, the payload antenna transmits the encrypted host telemetry to the host receiving antenna 592. The host receiving antenna transmits the encrypted host telemetry to the host SOC 593. Then, the host SOC decrypts the encrypted host telemetry utilizing the first COMSEC variety to generate the unencrypted host telemetry 594.

The second communication security module then transmits the encrypted hosted telemetry to a hosted telemetry transmitter 595. Then, the hosted telemetry transmitter transmits the encrypted hosted telemetry to the host SOC 596. The host SOC transmits the encrypted hosted telemetry to the HOC 597. Then, the HOC decrypts the encrypted hosted telemetry utilizing the second COMSEC variety to generate the unencrypted hosted telemetry 598. Then, the method ends 599.

FIG. 6A is a diagram 600 showing the disclosed system for a virtual transponder utilizing inband telemetry for the host user (i.e. the host SOC) 650 and the hosted user (i.e. the HOC) 660 being transmitted to a host receiving antenna 685 and a hosted receiving antenna 690, in accordance with at least one embodiment of the present disclosure. In this figure, a vehicle 610, a host SOC 650, and a HOC 660 are shown. The HOC 660 has leased at least a portion (i.e. a virtual transponder(s)) of the payload 605 of the vehicle 610 from the owner of a satellite (i.e. the host SOC) 650. It should be noted that in some embodiments, the HOC 660 may lease all of the payload 605 of the vehicle 610 from the owner of a satellite (i.e. the host SOC) 650. Also, it should be noted that is some embodiments, the HOC 660 may own the payload 605 (e.g., a steerable antenna) of the vehicle 610, and contract the host SOC 650 to transmit encrypted hosted commands to the vehicle 610.

During operation, the HOC 660 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (i.e. a virtual transponder(s)) of the payload 605 that the HOC 660 is leasing from the host SOC 650. The host SOC 650 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 605 that host SOC 650 is utilizing for itself.

It should be noted that, although in FIG. 6A the host SOC 650 is depicted to have its ground antenna located right next to its operations building; in other embodiments, the host SOC 650 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 660 then transmits 615 the encrypted hosted commands to the host SOC 650. After the host SOC 650 receives the encrypted hosted commands, the host SOC 650 transmits 620 the encrypted host commands and transmits 625 the encrypted hosted commands to the vehicle 610. The host SOC 650 transmits 620, 625 the encrypted host commands and the encrypted hosted commands utilizing an out-of-band frequency band(s) (i.e. a frequency band(s) that is not the same frequency band(s) utilized to transmit payload data). The host command receiver 635 on the vehicle 610 receives the encrypted host commands. In addition, the hosted command receiver 645 on the vehicle 610 receives the encrypted hosted commands.

It should be noted that in other embodiments, the disclosed system for a virtual transponder utilizing inband telemetry may employ more or less receivers 635, 645 than as is shown in FIG. 6A.

The host command receiver 635 then transmits 652 the encrypted host commands to a first communication security module 662. The first communication security module 662 decrypts the encrypted host commands utilizing the first COMSEC variety (i.e. COMSEC Variety 1) to generate unencrypted host commands.

It should be noted that the first communication security module 662 may comprise one or more modules. In addition, the first communication security module 662 may comprise one or more processors.

The hosted command receiver 645 then transmits 655 the encrypted hosted commands to a second communication security module 665. The second communication security module 665 decrypts the encrypted hosted commands utilizing the second COMSEC variety (i.e. COMSEC Variety 2) to generate unencrypted hosted commands.

It should be noted that the second communication security module 665 may comprise one or more modules. In addition, the second communication security module 665 may comprise one or more processors.

The first communication security module 662 then transmits 670 the unencrypted host commands to the payload (i.e. the shared host/hosted payload) 605. The second communication security module 665 transmits 675 the unencrypted hosted commands to the payload (i.e. the shared host/hosted payload) 605. The payload 605 is reconfigured according to the unencrypted host commands and/or the unencrypted hosted commands. A payload antenna 680 then transmits (e.g., in one or more antenna beams 681) payload data to a host receiving antenna 685 and/or a hosted receiving antenna 690 on the ground. It should be noted that in some embodiments, the hosted receiving antenna 690 may be air based, sea based, or ground based, as is shown in FIG. 6A.

Also, it should be noted that, although in FIG. 6A, antenna beams 681 is shown to include a plurality of circular spot beams; in other embodiments, antenna beams 681 may include more or less number of beams than is shown in FIG. 6A (e.g., antenna beams 681 may only include a single beam), and antenna beams 681 may include beams of different shapes than circular spot beams as is shown in FIG. 6A (e.g., antenna beams 681 may include elliptical beams and/or shaped beams of various different shapes).

It should be noted that in one or more embodiments, the payload antenna 680 may comprise one or more reflector dishes including, but not limited to, parabolic reflectors and/or shaped reflectors. In some embodiments, the payload antenna 680 may comprise one or more multifeed antenna arrays.

The payload 605 transmits 691 unencrypted host telemetry (i.e. unencrypted host TLM, which is telemetry data related to the portion of the payload 605 that is utilized by the host SOC 650) to the first communication security module 662. The first communication security module 662 then encrypts the unencrypted host telemetry utilizing the first COMSEC variety to generate encrypted host telemetry (i.e. encrypted host TLM).

The payload 605 transmits 692 unencrypted hosted telemetry (i.e. unencrypted HoP TLM, which is telemetry data related to the portion of the payload 605 that is leased by the HOC 660) to the second communication security module 665. The second communication security module 665 then encrypts the unencrypted hosted telemetry utilizing the second COMSEC variety to generate encrypted hosted telemetry (i.e. encrypted HoP TLM).

The first communication security module 662 then transmits 693 the encrypted host telemetry to the payload 605. The payload antenna 680 then transmits 697 the encrypted host telemetry to the host receiving antenna 685. The payload antenna 680 transmits 697 the encrypted host telemetry utilizing an inband frequency band(s) (i.e. at least one frequency band that is the same as at least one frequency band utilized to transmit payload data). The host receiving antenna 685 then transmits 698 the encrypted host telemetry to the host SOC 650. The host SOC 650 then decrypts the encrypted host telemetry utilizing the first COMSEC variety to generate the unencrypted host telemetry.

The second communication security module 665 then transmits 696 the encrypted hosted telemetry to the payload 605. The payload antenna 680 then transmits 696 the encrypted hosted telemetry to the hosted receiving antenna 690. The payload antenna 680 transmits 696 the encrypted hosted telemetry utilizing an inband frequency band(s) (i.e. at least one frequency band that is the same as at least one frequency band utilized to transmit payload data). The hosted receiving antenna 690 then transmits 699 the encrypted hosted telemetry to the HOC 660. The HOC 660 then decrypts the encrypted hosted telemetry utilizing the second COMSEC variety to generate the unencrypted hosted telemetry.

FIG. 6B is a diagram 6000 showing the disclosed system for a virtual transponder utilizing inband telemetry for the host user (i.e. the host SOC) 6050 and the hosted user (i.e. the HOC) 6060 being transmitted to a host receiving antenna 6085, in accordance with at least one embodiment of the present disclosure. In this figure, a vehicle 6010, a host SOC 6050, and a HOC 6060 are shown. The HOC 6060 has leased at least a portion (i.e. a virtual transponder(s)) of the payload 6005 of the vehicle 6010 from the owner of a satellite (i.e. the host SOC) 6050. It should be noted that in some embodiments, the HOC 6060 may lease all of the payload 6005 of the vehicle 6010 from the owner of a satellite (i.e. the host SOC) 6050. Also, it should be noted that is some embodiments, the HOC 6060 may own the payload 6005 (e.g., a steerable antenna) of the vehicle 6010, and contract the host SOC 6050 to transmit encrypted hosted commands to the vehicle 6010.

During operation, the HOC 6060 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (i.e. a virtual transponder(s)) of the payload 6005 that the HOC 6060 is leasing from the host SOC 6050. The host SOC 6050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 6005 that host SOC 6050 is utilizing for itself.

It should be noted that, although in FIG. 6B the host SOC 6050 is depicted to have its ground antenna located right next to its operations building; in other embodiments, the host SOC 6050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 6060 then transmits 6015 the encrypted hosted commands to the host SOC 6050. After the host SOC 6050 receives the encrypted hosted commands, the host SOC 6050 transmits 6020 the encrypted host commands and transmits 6025 the encrypted hosted commands to the vehicle 6010. The host SOC 6050 transmits 6020, 6025 the encrypted host commands and the encrypted hosted commands utilizing an out-of-band frequency band(s) (i.e. a frequency band(s) that is not the same frequency band(s) utilized to transmit payload data). The host command receiver 6035 on the vehicle 6010 receives the encrypted host commands. In addition, the hosted command receiver 6045 on the vehicle 6010 receives the encrypted hosted commands.

It should be noted that in other embodiments, the disclosed system for a virtual transponder utilizing inband telemetry may employ more or less receivers 6035, 6045 than as is shown in FIG. 6B.

The host command receiver 6035 then transmits 6052 the encrypted host commands to a first communication security module 6062. The first communication security module 6062 decrypts the encrypted host commands utilizing the first COMSEC variety (i.e. COMSEC Variety 1) to generate unencrypted host commands.

It should be noted that the first communication security module 6062 may comprise one or more modules. In addition, the first communication security module 6062 may comprise one or more processors.

The hosted command receiver 6045 then transmits 6055 the encrypted hosted commands to a second communication security module 6065. The second communication security module 6065 decrypts the encrypted hosted commands utilizing the second COMSEC variety (i.e. COMSEC Variety 2) to generate unencrypted hosted commands.

It should be noted that the second communication security module 6065 may comprise one or more modules. In addition, the second communication security module 6065 may comprise one or more processors.

The first communication security module 6062 then transmits 6070 the unencrypted host commands to the payload (i.e. the shared host/hosted payload) 6005. The second communication security module 6065 transmits 6075 the unencrypted hosted commands to the payload (i.e. the shared host/hosted payload) 6005. The payload 6005 is reconfigured according to the unencrypted host commands and/or the unencrypted hosted commands. A payload antenna 6080 then transmits (e.g., in one or more antenna beams 6081) payload data to a host receiving antenna 6085 and/or a hosted receiving antenna 6090 on the ground. It should be noted that in some embodiments, the hosted receiving antenna 6090 may be air based, sea based, or ground based, as is shown in FIG. 6B.

Also, it should be noted that, although in FIG. 6B, antenna beams 6081 is shown to include a plurality of circular spot beams; in other embodiments, antenna beams 6081 may include more or less number of beams than is shown in FIG. 6B (e.g., antenna beams 6081 may only include a single beam), and antenna beams 6081 may include beams of different shapes than circular spot beams as is shown in FIG. 6B (e.g., antenna beams 6081 may include elliptical beams and/or shaped beams of various different shapes).

It should be noted that in one or more embodiments, the payload antenna 6080 may comprise one or more reflector dishes including, but not limited to, parabolic reflectors and/or shaped reflectors. In some embodiments, the payload antenna 680 may comprise one or more multifeed antenna arrays.

The payload 6005 transmits 6091 unencrypted host telemetry (i.e. unencrypted host TLM, which is telemetry data related to the portion of the payload 6005 that is utilized by the host SOC 6050) to the first communication security module 6062. The first communication security module 6062 then encrypts the unencrypted host telemetry utilizing the first COMSEC variety to generate encrypted host telemetry (i.e. encrypted host TLM).

The payload 6005 transmits 6092 unencrypted hosted telemetry (i.e. unencrypted HoP TLM, which is telemetry data related to the portion of the payload 6005 that is leased by the HOC 6060) to the second communication security module 6065. The second communication security module 6065 then encrypts the unencrypted hosted telemetry utilizing the second COMSEC variety to generate encrypted hosted telemetry (i.e. encrypted HoP TLM).

The first communication security module 6062 then transmits 6093 the encrypted host telemetry to the payload 6005. The payload antenna 6080 then transmits 6097 the encrypted host telemetry to the host receiving antenna 6085. The payload antenna 6080 transmits 6097 the encrypted host telemetry utilizing an inband frequency band(s) (i.e. at least one frequency band that is the same as at least one frequency band utilized to transmit payload data). The host receiving antenna 6085 then transmits 6098 the encrypted host telemetry to the host SOC 6050. The host SOC 6050 then decrypts the encrypted host telemetry utilizing the first COMSEC variety to generate the unencrypted host telemetry.

The second communication security module 6065 then transmits 6096 the encrypted hosted telemetry to the payload 6005. The payload antenna 6080 then transmits 6096 the encrypted hosted telemetry to the host receiving antenna 6085. The payload antenna 6080 transmits 6096 the encrypted hosted telemetry utilizing an inband frequency band(s) (i.e. at least one frequency band that is the same as at least one frequency band utilized to transmit payload data). The host receiving antenna 6085 then transmits 6099 the encrypted hosted telemetry to the host SOC 6050. The host SOC 6050 transmits 6090 the encrypted hosted telemetry to the HOC 6060. The HOC 6060 then decrypts the encrypted hosted telemetry utilizing the second COMSEC variety to generate the unencrypted hosted telemetry.

FIGS. 7A, 7B, 7C, and 7D together show a flow chart for the disclosed method for a virtual transponder utilizing inband telemetry for the host user and the hosted user being transmitted to a host receiving antenna and a hosted receiving antenna, in accordance with at least one embodiment of the present disclosure. At the start 700 of the method, a hosted payload (HoP) operation center (HOC) encrypts unencrypted hosted commands by utilizing a second COMSEC variety to produce encrypted hosted commands 705. Then, the HOC transmits the encrypted hosted commands to a host spacecraft operations center (SOC) 710. The host SOC encrypts unencrypted host commands by utilizing a first COMSEC variety to produce encrypted host commands 715. Then, the host SOC transmits (out-of-band) the encrypted host commands and the encrypted hosted commands to a vehicle 720.

Then, a host command receiver on the vehicle receives the encrypted host commands 725. And, a hosted command receiver on the vehicle receives the encrypted hosted commands 730. The host command receiver transmits the encrypted host commands to a first communication security module 735. The hosted command receiver transmits the encrypted hosted commands to a second communication security module 740. The first communication security module then decrypts the encrypted host commands utilizing the first COMSEC variety to generate the unencrypted host commands 745. The second communication security module then decrypts the encrypted hosted commands utilizing the second COMSEC variety to generate the unencrypted hosted commands 750.

The first communication security module then transmits the unencrypted host commands to the payload 755. The second communication security module then transmits the unencrypted hosted commands to the payload 760. Then, the payload is reconfigured according to the unencrypted host commands and/or the unencrypted hosted commands 765. A payload antenna on the vehicle then transmits payload data to a host receiving antenna and/or a hosted receiving antenna 770.

Then, the payload transmits to the first communication security module unencrypted host telemetry 775. And, the payload transmits to the second communication security module unencrypted hosted telemetry 780. The first communication security module encrypts the unencrypted host telemetry utilizing the first COMSEC variety to generate encrypted host telemetry 785. And, the second communication security module encrypts the unencrypted hosted telemetry utilizing the second COMSEC variety to generate encrypted hosted telemetry 790.

Then, the first communication security module transmits the encrypted host telemetry to the payload 791. The payload antenna then transmits the encrypted host telemetry to the host receiving antenna 792. Then, the host receiving antenna transmits the encrypted host telemetry to the host SOC 793. The host SOC then decrypts the encrypted host telemetry utilizing the first COMSEC variety to generate the unencrypted host telemetry 794.

The second communication security module transmits the encrypted hosted telemetry to the payload 795. The payload antenna then transmits the encrypted hosted telemetry to the hosted receiving antenna 796. The hosted receiving antenna then transmits the encrypted hosted telemetry to the HOC 797. Then, the HOC decrypts the encrypted hosted telemetry utilizing the second COMSEC variety to generate the unencrypted hosted telemetry 798. Then, the method ends 799.

FIGS. 7E, 7F, 7G, and 7H together show a flow chart for the disclosed method for a virtual transponder utilizing inband telemetry for the host user and the hosted user being transmitted to a host receiving antenna, in accordance with at least one embodiment of the present disclosure. At the start 7000 of the method, a hosted payload (HoP) operation center (HOC) encrypts unencrypted hosted commands by utilizing a second COMSEC variety to produce encrypted hosted commands 7005. Then, the HOC transmits the encrypted hosted commands to a host spacecraft operations center (SOC) 7010. The host SOC encrypts unencrypted host commands by utilizing a first COMSEC variety to produce encrypted host commands 7015. Then, the host SOC transmits (out-of-band) the encrypted host commands and the encrypted hosted commands to a vehicle 7020.

Then, a host command receiver on the vehicle receives the encrypted host commands 7025. And, a hosted command receiver on the vehicle receives the encrypted hosted commands 7030. The host command receiver transmits the encrypted host commands to a first communication security module 7035. The hosted command receiver transmits the encrypted hosted commands to a second communication security module 7040. The first communication security module then decrypts the encrypted host commands utilizing the first COMSEC variety to generate the unencrypted host commands 7045. The second communication security module then decrypts the encrypted hosted commands utilizing the second COMSEC variety to generate the unencrypted hosted commands 7050.

The first communication security module then transmits the unencrypted host commands to the payload 7055. The second communication security module then transmits the unencrypted hosted commands to the payload 7060. Then, the payload is reconfigured according to the unencrypted host commands and/or the unencrypted hosted commands 7065. A payload antenna on the vehicle then transmits payload data to a host receiving antenna and/or a hosted receiving antenna 7070.

Then, the payload transmits to the first communication security module unencrypted host telemetry 7075. And, the payload transmits to the second communication security module unencrypted hosted telemetry 7080. The first communication security module encrypts the unencrypted host telemetry utilizing the first COMSEC variety to generate encrypted host telemetry 7085. And, the second communication security module encrypts the unencrypted hosted telemetry utilizing the second COMSEC variety to generate encrypted hosted telemetry 7090.

Then, the first communication security module transmits the encrypted host telemetry to the payload 7091. The payload antenna then transmits the encrypted host telemetry to the host receiving antenna 7092. Then, the host receiving antenna transmits the encrypted host telemetry to the host SOC 7093. The host SOC then decrypts the encrypted host telemetry utilizing the first COMSEC variety to generate the unencrypted host telemetry 7094.

The second communication security module transmits the encrypted hosted telemetry to the payload 7095. The payload antenna then transmits the encrypted hosted telemetry to the host receiving antenna 7096. The host receiving antenna then transmits the encrypted hosted telemetry to the host SOC 7097. The host SOC transmits the encrypted hosted telemetry to the HOC 7098. Then, the HOC decrypts the encrypted hosted telemetry utilizing the second COMSEC variety to generate the unencrypted hosted telemetry 7099. Then, the method ends 7001.

FIG. 8A is a diagram 800 showing the disclosed system for a virtual transponder utilizing inband telemetry for the host user (i.e. the host SOC) 850 and the hosted user (i.e. the HOC) 860 being transmitted to a host receiving antenna 885 and a hosted receiving antenna 890, where the telemetry is encrypted utilizing a single communication security (COMSEC) variety, in accordance with at least one embodiment of the present disclosure. In this figure, a vehicle 810, a host SOC 850, and a HOC 860 are shown. The HOC 860 has leased at least a portion (i.e. a virtual transponder(s)) of the payload 805 of the vehicle 810 from the owner of a satellite (i.e. the host SOC) 850. It should be noted that in some embodiments, the HOC 860 may lease all of the payload 805 of the vehicle 810 from the owner of a satellite (i.e. the host SOC) 850. Also, it should be noted that is some embodiments, the HOC 860 may own the payload 805 (e.g., a steerable antenna) of the vehicle 810, and contract the host SOC 850 to transmit encrypted hosted commands to the vehicle 810.

During operation, the HOC 860 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (i.e. a virtual transponder(s)) of the payload 805 that the HOC 860 is leasing from the host SOC 850. The host SOC 850 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 805 that host SOC 850 is utilizing for itself.

It should be noted that, although in FIG. 8A the host SOC 850 is depicted to have its ground antenna located right next to its operations building; in other embodiments, the host SOC 850 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 860 then transmits 815 the encrypted hosted commands to the host SOC 850. After the host SOC 850 receives the encrypted hosted commands, the host SOC 850 transmits 820 the encrypted host commands and transmits 825 the encrypted hosted commands to the vehicle 810. The host SOC 850 transmits 820, 825 the encrypted host commands and the encrypted hosted commands utilizing an out-of-band frequency band(s) (i.e. a frequency band(s) that is not the same frequency band(s) utilized to transmit payload data). The host command receiver 835 on the vehicle 810 receives the encrypted host commands. In addition, the hosted command receiver 845 on the vehicle 810 receives the encrypted hosted commands.

It should be noted that in other embodiments, the disclosed system for a virtual transponder utilizing inband telemetry may employ more or less receivers 835, 845 than as is shown in FIG. 8A.

The host command receiver 835 then transmits 852 the encrypted host commands to a first communication security module 862. The first communication security module 862 decrypts the encrypted host commands utilizing the first COMSEC variety (i.e. COMSEC Variety 1) to generate unencrypted host commands.

It should be noted that the first communication security module 862 may comprise one or more modules. In addition, the first communication security module 862 may comprise one or more processors.

The hosted command receiver 845 then transmits 855 the encrypted hosted commands to a second communication security module 865. The second communication security module 865 decrypts the encrypted hosted commands utilizing the second COMSEC variety (i.e. COMSEC Variety 2) to generate unencrypted hosted commands.

It should be noted that the second communication security module 865 may comprise one or more modules. In addition, the second communication security module 865 may comprise one or more processors.

The first communication security module 862 then transmits 870 the unencrypted host commands to the payload (i.e. the shared host/hosted payload) 805. The second communication security module 865 transmits 875 the unencrypted hosted commands to the payload (i.e. the shared host/hosted payload) 805. The payload 805 is reconfigured according to the unencrypted host commands and/or the unencrypted hosted commands. A payload antenna 880 then transmits (e.g., in one or more antenna beams 881) payload data to a host receiving antenna 885 and/or a hosted receiving antenna 890 on the ground. It should be noted that in some embodiments, the hosted receiving antenna 890 may be air based, sea based, or ground based, as is shown in FIG. 8A.

It should be noted that, although in FIG. 8A, antenna beams 881 is shown to include a plurality of circular spot beams; in other embodiments, antenna beams 881 may include more or less number of beams than is shown in FIG. 8A (e.g., antenna beams 881 may only include a single beam), and antenna beams 881 may include beams of different shapes than circular spot beams as is shown in FIG. 8A (e.g., antenna beams 881 may include elliptical beams and/or shaped beams of various different shapes).

It should be noted that in one or more embodiments, the payload antenna 880 may comprise one or more reflector dishes including, but not limited to, parabolic reflectors and/or shaped reflectors. In some embodiments, the payload antenna 880 may comprise one or more multifeed antenna arrays.

The payload 805 transmits 891 unencrypted telemetry to the first communication security module 862. The unencrypted telemetry comprises unencrypted host telemetry (i.e. unencrypted host TLM, which is telemetry data related to the portion of the payload 805 that is utilized by the host SOC 850) and unencrypted hosted telemetry (i.e. unencrypted HoP TLM, which is telemetry data related to the portion of the payload 805 that is leased by the HOC 860). The first communication security module 862 then encrypts the unencrypted telemetry utilizing the first COMSEC variety to generate encrypted telemetry (i.e. encrypted TLM).

The first communication security module 862 then transmits 893 the encrypted telemetry to the payload 805. The payload antenna 880 then transmits 897 the encrypted telemetry to the host receiving antenna 885. The payload antenna 880 transmits 897 the encrypted telemetry utilizing an inband frequency band(s) (i.e. at least one frequency band that is the same as at least one frequency band utilized to transmit payload data). The host receiving antenna 885 then transmits 898 the encrypted telemetry to the host SOC 850. The host SOC 850 then decrypts the encrypted telemetry utilizing the first COMSEC variety to generate the unencrypted telemetry. The host SOC 850 then utilizes a database that comprises host payload decommutated information and does not comprise hosted payload decommutated information (i.e. a database without hosted payload decommutated information) to read to unencrypted telemetry to determine the telemetry data related to the portion of the payload 805 that is utilized by the host SOC 850.

The payload antenna 880 then transmits 896 the encrypted telemetry to the hosted receiving antenna 890. The payload antenna 880 transmits 896 the encrypted telemetry utilizing an inband frequency band(s) (i.e. at least one frequency band that is the same as at least one frequency band utilized to transmit payload data). The hosted receiving antenna 890 then transmits 899 the encrypted telemetry to the HOC 860. The HOC 860 then decrypts the encrypted telemetry utilizing the first COMSEC variety to generate the unencrypted telemetry. The HOC 860 then utilizes a database that comprises hosted payload decommutated information and does not comprise host payload decommutated information (i.e. a database without host payload decommutated information) to read to unencrypted telemetry to determine the telemetry data related to the portion of the payload 805 that is utilized by the HOC 860.

FIG. 8B is a diagram 8000 showing the disclosed system for a virtual transponder utilizing inband telemetry for the host user (i.e. the host SOC) 8050 and the hosted user (i.e. the HOC) 8060 being transmitted to a host receiving antenna 8085, where the telemetry is encrypted utilizing a single communication security (COMSEC) variety, in accordance with at least one embodiment of the present disclosure. In this figure, a vehicle 8010, a host SOC 8050, and a HOC 8060 are shown. The HOC 8060 has leased at least a portion (i.e. a virtual transponder(s)) of the payload 8005 of the vehicle 8010 from the owner of a satellite (i.e. the host SOC) 8050. It should be noted that in some embodiments, the HOC 8060 may lease all of the payload 8005 of the vehicle 8010 from the owner of a satellite (i.e. the host SOC) 8050. Also, it should be noted that is some embodiments, the HOC 8060 may own the payload 8005 (e.g., a steerable antenna) of the vehicle 8010, and contract the host SOC 8050 to transmit encrypted hosted commands to the vehicle 8010.

During operation, the HOC 8060 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the portion (i.e. a virtual transponder(s)) of the payload 8005 that the HOC 8060 is leasing from the host SOC 8050. The host SOC 8050 encrypts unencrypted host commands (i.e. unencrypted host CMD), by utilizing a first COMSEC variety, to produce encrypted host commands (i.e. encrypted host CMD). The host commands are commands that are used to configure the portion (e.g., a transponder(s)) of the payload 8005 that host SOC 8050 is utilizing for itself.

It should be noted that, although in FIG. 8B the host SOC 8050 is depicted to have its ground antenna located right next to its operations building; in other embodiments, the host SOC 8050 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 8060 then transmits 8015 the encrypted hosted commands to the host SOC 8050. After the host SOC 8050 receives the encrypted hosted commands, the host SOC 8050 transmits 8020 the encrypted host commands and transmits 8025 the encrypted hosted commands to the vehicle 8010. The host SOC 8050 transmits 8020, 8025 the encrypted host commands and the encrypted hosted commands utilizing an out-of-band frequency band(s) (i.e. a frequency band(s) that is not the same frequency band(s) utilized to transmit payload data). The host command receiver 8035 on the vehicle 8010 receives the encrypted host commands. In addition, the hosted command receiver 8045 on the vehicle 8010 receives the encrypted hosted commands.

It should be noted that in other embodiments, the disclosed system for a virtual transponder utilizing inband telemetry may employ more or less receivers 8035, 8045 than as is shown in FIG. 8B.

The host command receiver 8035 then transmits 8052 the encrypted host commands to a first communication security module 8062. The first communication security module 8062 decrypts the encrypted host commands utilizing the first COMSEC variety (i.e. COMSEC Variety 1) to generate unencrypted host commands.

It should be noted that the first communication security module 8062 may comprise one or more modules. In addition, the first communication security module 8062 may comprise one or more processors.

The hosted command receiver 8045 then transmits 8055 the encrypted hosted commands to a second communication security module 8065. The second communication security module 8065 decrypts the encrypted hosted commands utilizing the second COMSEC variety (i.e. COMSEC Variety 2) to generate unencrypted hosted commands.

It should be noted that the second communication security module 8065 may comprise one or more modules. In addition, the second communication security module 8065 may comprise one or more processors.

The first communication security module 8062 then transmits 8070 the unencrypted host commands to the payload (i.e. the shared host/hosted payload) 8005. The second communication security module 8065 transmits 8075 the unencrypted hosted commands to the payload (i.e. the shared host/hosted payload) 8005. The payload 8005 is reconfigured according to the unencrypted host commands and/or the unencrypted hosted commands. A payload antenna 8080 then transmits (e.g., in one or more antenna beams 8081) payload data to a host receiving antenna 8085 and/or a hosted receiving antenna 8090 on the ground. It should be noted that in some embodiments, the hosted receiving antenna 8090 may be air based, sea based, or ground based, as is shown in FIG. 8B.

It should be noted that, although in FIG. 8B, antenna beams 8081 is shown to include a plurality of circular spot beams; in other embodiments, antenna beams 8081 may include more or less number of beams than is shown in FIG. 8B (e.g., antenna beams 8081 may only include a single beam), and antenna beams 8081 may include beams of different shapes than circular spot beams as is shown in FIG. 8B (e.g., antenna beams 8081 may include elliptical beams and/or shaped beams of various different shapes).

It should be noted that in one or more embodiments, the payload antenna 8080 may comprise one or more reflector dishes including, but not limited to, parabolic reflectors and/or shaped reflectors. In some embodiments, the payload antenna 8080 may comprise one or more multifeed antenna arrays.

The payload 8005 transmits 8091 unencrypted telemetry to the first communication security module 8062. The unencrypted telemetry comprises unencrypted host telemetry (i.e. unencrypted host TLM, which is telemetry data related to the portion of the payload 8005 that is utilized by the host SOC 8050) and unencrypted hosted telemetry (i.e. unencrypted HoP TLM, which is telemetry data related to the portion of the payload 8005 that is leased by the HOC 8060). The first communication security module 8062 then encrypts the unencrypted telemetry utilizing the first COMSEC variety to generate encrypted telemetry (i.e. encrypted TLM).

The first communication security module 8062 then transmits 8093 the encrypted telemetry to the payload 8005. The payload antenna 8080 then transmits 8097 the encrypted telemetry to the host receiving antenna 8085. The payload antenna 8080 transmits 8097 the encrypted telemetry utilizing an inband frequency band(s) (i.e. at least one frequency band that is the same as at least one frequency band utilized to transmit payload data). The host receiving antenna 8085 then transmits 8098 the encrypted telemetry to the host SOC 8050. The host SOC 8050 then decrypts the encrypted telemetry utilizing the first COMSEC variety to generate the unencrypted telemetry. The host SOC 8050 then utilizes a database that comprises host payload decommutated information and does not comprise hosted payload decommutated information (i.e. a database without hosted payload decommutated information) to read to unencrypted telemetry to determine the telemetry data related to the portion of the payload 8005 that is utilized by the host SOC 8050.

The host SOC 8050 transmits 8099 the encrypted telemetry to the HOC 8060. The HOC 8060 then decrypts the encrypted telemetry utilizing the first COMSEC variety to generate the unencrypted telemetry. The HOC 8060 then utilizes a database that comprises hosted payload decommutated information and does not comprise host payload decommutated information (i.e. a database without host payload decommutated information) to read to unencrypted telemetry to determine the telemetry data related to the portion of the payload 8005 that is utilized by the HOC 8060.

FIGS. 9A, 9B, 9C, and 9D together show a flow chart for the disclosed method for a virtual transponder utilizing inband telemetry for the host user and the hosted user being transmitted to a host receiving antenna and a hosted receiving antenna, where the telemetry is encrypted utilizing a single COMSEC variety, in accordance with at least one embodiment of the present disclosure. At the start 900 of the method, a hosted payload (HoP) operation center (HOC) encrypts unencrypted hosted commands by utilizing a second COMSEC variety to produce encrypted hosted commands 905. Then, the HOC transmits the encrypted hosted commands to a host spacecraft operations center (SOC) 910. The host SOC encrypts unencrypted host commands by utilizing a first COMSEC variety to produce encrypted host commands 915. Then, the host SOC transmits (out-of-band) the encrypted host commands and the encrypted hosted commands to a vehicle 920.

Then, a host command receiver on the vehicle receives the encrypted host commands 925. And, a hosted command receiver on the vehicle receives the encrypted hosted commands 930. The host command receiver transmits the encrypted host commands to a first communication security module 935. The hosted command receiver transmits the encrypted hosted commands to a second communication security module 940. The first communication security module then decrypts the encrypted host commands utilizing the first COMSEC variety to generate the unencrypted host commands 945. The second communication security module then decrypts the encrypted hosted commands utilizing the second COMSEC variety to generate the unencrypted hosted commands 950.

The first communication security module then transmits the unencrypted host commands to the payload 955. The second communication security module then transmits the unencrypted hosted commands to the payload 960. Then, the payload is reconfigured according to the unencrypted host commands and/or the unencrypted hosted commands 965. A payload antenna on the vehicle then transmits payload data to a host receiving antenna and/or a hosted receiving antenna 970.

Then, the payload transmits to the first communication security module unencrypted telemetry 975. The first communication security module encrypts the unencrypted telemetry utilizing the first COMSEC variety to generate encrypted telemetry 980.

Then, the first communication security module transmits the encrypted telemetry to the payload 985. The payload antenna then transmits the encrypted telemetry to the host receiving antenna 990. Then, the host receiving antenna transmits the encrypted telemetry to the host SOC 991. The host SOC then decrypts the encrypted telemetry utilizing the first COMSEC variety to generate the unencrypted telemetry 992. Then, the host SOC determines the telemetry data related to a portion of the payload utilized by the host SOC by using a database without hosted decommutated information to read the encrypted telemetry 993.

The payload antenna transmits the encrypted telemetry to the hosted receiving antenna 994. The hosted receiving antenna then transmits the encrypted telemetry to the HOC 995. Then, the HOC decrypts the encrypted telemetry utilizing the first COMSEC variety to generate the unencrypted telemetry 996. Then, the HOC determines the telemetry data related to a portion of the payload utilized by the HOC by using a database without host decommutated information to read the encrypted telemetry 997. Then, the method ends 998.

FIGS. 9E, 9F, 9G, and 9H together show a flow chart for the disclosed method for a virtual transponder utilizing inband telemetry for the host user and the hosted user being transmitted to a host receiving antenna, where the telemetry is encrypted utilizing a single COMSEC variety, in accordance with at least one embodiment of the present disclosure. At the start 9000 of the method, a hosted payload (HoP) operation center (HOC) encrypts unencrypted hosted commands by utilizing a second COMSEC variety to produce encrypted hosted commands 9005. Then, the HOC transmits the encrypted hosted commands to a host spacecraft operations center (SOC) 9010. The host SOC encrypts unencrypted host commands by utilizing a first COMSEC variety to produce encrypted host commands 9015. Then, the host SOC transmits (out-of-band) the encrypted host commands and the encrypted hosted commands to a vehicle 9020.

Then, a host command receiver on the vehicle receives the encrypted host commands 9025. And, a hosted command receiver on the vehicle receives the encrypted hosted commands 9030. The host command receiver transmits the encrypted host commands to a first communication security module 9035. The hosted command receiver transmits the encrypted hosted commands to a second communication security module 9040. The first communication security module then decrypts the encrypted host commands utilizing the first COMSEC variety to generate the unencrypted host commands 9045. The second communication security module then decrypts the encrypted hosted commands utilizing the second COMSEC variety to generate the unencrypted hosted commands 9050.

The first communication security module then transmits the unencrypted host commands to the payload 9055. The second communication security module then transmits the unencrypted hosted commands to the payload 9060. Then, the payload is reconfigured according to the unencrypted host commands and/or the unencrypted hosted commands 9065. A payload antenna on the vehicle then transmits payload data to a host receiving antenna and/or a hosted receiving antenna 9070.

Then, the payload transmits to the first communication security module unencrypted telemetry 9075. The first communication security module encrypts the unencrypted telemetry utilizing the first COMSEC variety to generate encrypted telemetry 9080.

Then, the first communication security module transmits the encrypted telemetry to the payload 9085. The payload antenna then transmits the encrypted telemetry to the host receiving antenna 9090. Then, the host receiving antenna transmits the encrypted telemetry to the host SOC 9091. The host SOC then decrypts the encrypted telemetry utilizing the first COMSEC variety to generate the unencrypted telemetry 9092. Then, the host SOC determines the telemetry data related to a portion of the payload utilized by the host SOC by using a database without hosted decommutated information to read the encrypted telemetry 9093.

The host SOC then transmits the encrypted telemetry to the HOC 9095. Then, the HOC decrypts the encrypted telemetry utilizing the first COMSEC variety to generate the unencrypted telemetry 9096. Then, the HOC determines the telemetry data related to a portion of the payload utilized by the HOC by using a database without host decommutated information to read the encrypted telemetry 9097. Then, the method ends 9098.

FIG. 10 is a diagram 1000 showing the disclosed system for a virtual transponder on a vehicle 1210, in accordance with at least one embodiment of the present disclosure. In this figure, a computing device 1010 is shown. The computing device 1010 may be located at a station (e.g., a host station or a hosted station). When the computing device 1010 is located at a host station (i.e. a station operated by a host user (Host SOC)), the computing device 1010 is referred to as a host computing device. And, when the computing device 1010 is located at a hosted station (i.e. a station operated by a hosted user (HOC)), the computing device 1010 is referred to as a hosted computing device. In one or more embodiments, the station is a ground station 1015, a terrestrial vehicle (e.g., a military jeep) 1020, an airborne vehicle (e.g., an aircraft) 1025, or a marine vehicle (e.g., a ship) 1030.

During operation, a user (e.g., a host user or a hosted user) 1005 selects, via a graphical user interface (GUI) (e.g., a host GUI or a hosted GUI) 1035 displayed on a screen of the computing device 1010 (e.g., a host computing device or a hosted computing device), an option (e.g., a value) for each of at least one different variable for a portion of the payload 1280 on the vehicle 1210 utilized by the user 1005. It should be noted that the details of payload 1280 as is illustrated in FIG. 12 is depicted on the GUI 1035, which is displayed on the screen of the computing device 1010.

Refer FIG. 12 to view the different variables of the payload 1280 on the vehicle 1210 that may be selected by the user 1005 by using the GUI 1035 that is displayed to the user 1005. Also, refer to FIG. 13 to view the different variables of the digital channelizer 1270 of the payload 1280 that may be selected by the user 1005 by using the GUI 1035 that is displayed to the user 1005. In one or more embodiments, various different variables may be presented by the GUI 1035 to be selected including, but not limited to, at least one transponder power, at least one transponder spectrum, at least one transponder gain setting, at least one transponder limiter setting, at least one transponder automatic level control setting, at least one transponder phase setting, at least one internal gain generation, bandwidth for at least one beam, at least one frequency band for at least one beam, at least one transponder beamforming setting, effective isotropic radiation power (EIRP) for at least one beam, at least one transponder channel, and/or beam steering for at least one beam. It should be noted that the user 1005 may select an option by clicking on the associated variable (e.g., clicking on one of the mixers 1265 to change the frequency band of the mixer's associated transmit antenna 1255) in the payload 1280 by using the GUI 1035, and by either typing in a value or selecting a value from a drop down menu (e.g., by typing in a desired transmission frequency band for the associated transmit antenna 1255). It should be noted that the payload 1280 depicted in FIG. 12 is an exemplary payload, and the depiction does not show all possible different variables that may be selected by user 1005 by using the GUI 1035.

After the user 1005 has selected, via the GUI 1035 displayed on the computing device 1010, an option for each of at least one variable for the portion of the payload 1280 on the vehicle 1210 utilized by the user 1005, the option(s) is transmitted 1040 to a configuration algorithm (CA) 1045 (e.g., an algorithm contained in an XML file, such as CAConfig.xml 1050). The CA 1045 then generates a configuration for the portion of the payload 1280 on the vehicle 1210 utilized by the user 1005 by using the option(s). Then, the CA 1045 transmits 1055 the configuration to a command generator (e.g., a host command generator or a hosted command generator) 1060. Optionally, the CA 1045 also stores the configuration in a report file 1065.

After the command generator 1060 has received the configuration, the command generator 1060 generates commands (e.g., host commands or hosted commands) for reconfiguring the portion of the payload 1280 on the vehicle 1210 utilized by the user 1005 by using the configuration. Then, the commands are transmitted 1070 to an encryption module 1075. After receiving the commands, the encryption module 1075 then encrypts the commands (e.g., by utilizing a first COMSEC variety or a second COMSEC variety) to generate encrypted commands (e.g., host encrypted commands or hosted encrypted commands).

Then, the encrypted commands are transmitted 1080 from the station (e.g., a ground station 1015, a terrestrial vehicle (e.g., a military jeep) 1020, an airborne vehicle (e.g., an aircraft) 1025, or a marine vehicle (e.g., a ship) 1030) to the vehicle 1210. It should be noted that, in one or more embodiments, the computing device 1010, the CA 1045, the command generator 1060, and the encryption module 1075 are all located at the station (e.g., the host station or the hosted station). In other embodiments, some or more of these items may be located in different locations. In addition, in one or more embodiments, the vehicle 1210 is an airborne vehicle (e.g., a satellite, an aircraft, an unmanned vehicle (UAV), or a space plane).

After the vehicle 1210 has received the encrypted commands, the vehicle decrypts the commands to generated unencrypted commands (e.g., host unencrypted commands or hosted unencrypted commands). Then, the portion of the payload 1280 on the vehicle 1210 utilized by the user 1005 is reconfigured by using the unencrypted commands. In one or more embodiments, the reconfiguring of the payload 1280 may comprise reconfiguring at least one antenna 1215, 1255 (refer to FIG. 12), at least one analog-to-digital converter, at least one digital-to-analog converter, at least one beamformer, at least one digital channelizer 1310 (refer to FIG. 13), at least one demodulator, at least one modulator, at least one digital switch matrix 1320 (refer to FIG. 13), and/or at least one digital combiner 1330 (refer to FIG. 13). It should be noted that in other embodiments, the reconfiguring of the payload 1280 may comprise reconfiguring at least one analog switch matrix.

FIG. 11 is a diagram 1100 showing an exemplary allocation of bandwidth amongst a plurality of beams (U1-U45) when utilizing the disclosed virtual transponder, in accordance with at least one embodiment of the present disclosure. In this figure, the bandwidth of each of the beams (U1-U45) is illustrated as a bar.

On the left side 1110 of the diagram 1100, a portion of the bandwidth of each of the beams (U1-U45) is shown to be utilized by only the host user (i.e. the owner of the vehicle). For this example, the host user is not leasing out any portion of the payload to a hosted user (i.e. a customer).

On the right side 1120 of the diagram 1100, a portion of the bandwidth of each of the beams is shown to be utilized by the host user (i.e. the owner of the vehicle). Also, at least some (if not all) of the portion of the bandwidth of each of the beams (U1-U45) not utilized by the host user, is shown to be utilized by the hosted user (i.e. a customer). For this example, the host user is leasing out a portion of the payload to a hosted user (i.e. a customer). Specifically, the host user is leasing out a portion the bandwidth of each of the beams (U1-U45) to the hosted user.

It should be noted that in other embodiments, the host user may lease out the entire bandwidth of some (if not all) of beam(s) to the hosted user. For these, embodiments, the hosted user alone will utilize the bandwidth of these leased beam(s).

FIG. 12 is a diagram 1200 showing the switch architecture for a flexible allocation of bandwidth amongst a plurality of beams (U1-UN) (i.e. including uplink and downlink beams) when utilizing the disclosed virtual transponder, in accordance with at least one embodiment of the present disclosure. In this figure, details of a payload 1280 on a vehicle 1210 are shown. In particular, each of a plurality (i.e. N number) of receive antennas 1215, on the vehicle 1210, is shown to be receiving one of the uplink beams (U1-UN). As such, for example, receive antenna 1215 connected to input port 1 receives uplink beam U6, receive antenna 1215 connected to input port 2 receives uplink beam U14, and receive antenna 1215 connected to input port N receives uplink beam U34. Each receive antenna 1215 is shown to be followed by a polarizer (i.e. pol) 1220 and a waveguide filter (i.e. WG Filter) 1225.

Also, in this figure, each of a plurality (i.e. N number) of transmit antennas 1255, on the vehicle 1210, is shown to be receiving one of the downlink beams (U1-UN). As such, for example, transmit antenna 1255 connected to output port 1 receives downlink beam U19, transmit antenna 1255 connected to output port 2 receives downlink beam U6, and transmit antenna 1255 connected to output port N receives downlink beam U1. Each transmit antenna 1255 is shown to be preceded by a polarizer (i.e. pol) 1245 and a waveguide filter (i.e. WG Filter) 1250.

It should be noted that, in one or more embodiments, various different types of antennas may be employed for the receive antennas 1215 and the transmit antennas 1255 including, but not limited to, parabolic reflector antennas, shaped reflector antennas, multifeed array antennas, phase array antennas, and/or any combination thereof.

During operation, a host user 1205 encrypts unencrypted host commands to produce encrypted host commands. Also, a hosted user 1230 encrypts unencrypted hosted commands to produce encrypted hosted commands. The hosted user 1230 transmits 1235 the encrypted hosted commands to the host user 1205. The host user 1205 transmits 1240 the encrypted host commands and the encrypted hosted commands to the vehicle 1210. The encrypted host commands and encrypted hosted commands are decrypted on the vehicle 1210 to produce the unencrypted host commands and unencrypted hosted commands.

Then, the payload on the vehicle 1210 receives the unencrypted host commands and unencrypted hosted commands. The digital channelizer 1270 then reconfigures the channels of the uplink beams (U1-UN) and downlink beams (U1-UN) according to the unencrypted host commands and unencrypted hosted commands. The configuring of the channels allocates the bandwidth of the uplink beams (U1-UN) and downlink beams (U1-UN) amongst the host user 1205 and the hosted user 1230.

Also, the transmit antennas 1255 and the receive antennas 1215 are configured according to the unencrypted host commands and unencrypted hosted commands. For example, some, if not all, of the transmit antennas 1255 and/or the receive antennas 1215 may be gimbaled to project their beams on different locations on the ground. Also, for example, some, if not all, of the transmit antennas 1255 and/or the receive antennas 1215 may have their phase changed such that (1) the shape of the beam is changed (e.g., has the effect of changing the coverage area of the beam, changing the peak(s) amplitude of the beam, and/or the changing the peak(s) amplitude location on the ground), and/or (2) the beam is projected on a different location on the ground (i.e. has the same effect as gimbaling the antenna 1215, 1255).

Additionally, the mixers 1260 on the input ports and/or the mixers 1265 on the output ports are configured according to the unencrypted host commands and/or unencrypted hosted commands. For example, some, if not all, of the mixers 1260 on the input ports and/or the mixers 1265 on the output ports may mix in different frequency bands to change the frequency band(s) of the beams (U1-UN).

FIG. 13 is a diagram 1300 showing details of the digital channelizer 1270 of FIG. 12, in accordance with at least one embodiment of the present disclosure. In this figure, the digital channelizer 1270 is shown to include three main parts, which are the channelizer 1310, the switch matrix 1320, and the combiner 1330. The digital channelizer 1310 divides the input beam spectrum (i.e. frequency band) from each input port into input subchannels (i.e. frequency slices). In this figure, each beam spectrum (i.e. frequency band) is shown to be divided into twelve (12) input subchannels (i.e. frequency slices). It should be noted that in other embodiments, each input beam spectrum may be divided into more or less than twelve (12) input subchannels, as is shown in FIG. 13.

The switch matrix 1320 routes the input subchannels from the input ports to their assigned respective output ports, where they are referred to as output subchannels. In this figure, five (5) exemplary types of routing that may be utilized by the switch matrix 1320 are shown, which include direct mapping 1340, in-beam multicast 1350, cross-beam multicast 1360, cross-beam mapping 1370, and cross-beam point-to-point routing 1380. The combiner 1330 combines the output subchannels to create an output beam spectrum for each output port. As previously mentioned above, during the reconfiguring of the payload 1280, the channelizer 1310, the switch matrix 1320, and/or the combiner 1330 of the digital channelizer 1270 may be reconfigured a various different number of ways (e.g., changing the dividing of the input beam spectrums into input subchannels, changing the routing of the input subchannels, and/or changing the combining of the output subchannels to create the output beam spectrums).

FIG. 14 is a diagram 1400 showing exemplary components on the vehicle (e.g., satellite) 1410 that may be utilized by the disclosed virtual transponder, in accordance with at least one embodiment of the present disclosure. In this figure, various components, on the vehicle 1410, are shown that may be configured according to the unencrypted host commands (e.g., the host channel 1430) and/or unencrypted hosted commands (e.g., the hosted channel 1420).

In this figure, the uplink antenna 1440, the downlink antenna 1450, and various components of the all-digital payload 1460 (including the analog-to-digital (ND) converter 1465, the digital channelizer 1475, the digital switch matrix 1495, the digital combiner 1415, and the digital-to-analog (D/A) converter 1435) are shown that may be configured according to the unencrypted host commands (e.g., the host channel 1430) and/or unencrypted hosted commands (e.g., the hosted channel 1420). In addition, some other components of the all-digital payload 1460 (including the uplink beamforming 1470, the demodulator 1480, the modulator 1490, and the downlink beamforming 1425) may optionally be configured according to the unencrypted host commands (e.g., the host channel 1430) and/or unencrypted hosted commands (e.g., the hosted channel 1420).

FIGS. 15A and 15B together show a flow chart for the disclosed method for a virtual transponder on a vehicle, in accordance with at least one embodiment of the present disclosure. At the start 1500 of the method, a host user, with a host graphical user interface (GUI) on a host computing device, selects an option for each of at least one variable for a portion of a payload on the vehicle utilized by the host user 1505. Also, a hosted user, with a hosted GUI on a hosted computing device, selects an option for each of at least one variable for a portion of the payload on the vehicle utilized by the hosted user 1510. Then, a configuration algorithm (CA), generates a configuration for the portion of the payload on the vehicle utilized by the host user by using the option for each of at least one variable for the portion of the payload on the vehicle utilized by the host user 1515. Also, the CA, generates a configuration for the portion of the payload on the vehicle utilized by the hosted user by using an option for each of at least one variable for the portion of the payload on the vehicle utilized by the hosted user 1520.

A host command generator then generates host commands for reconfiguring the portion of the payload on the vehicle utilized by the host user by using the configuration for the portion of the payload on the vehicle utilized by the host user 1525. And, a hosted command generator generates hosted commands for reconfiguring the portion of the payload on the vehicle utilized by the hosted user by using the configuration for the portion of the payload on the vehicle utilized by the hosted user 1530. Then, the host commands and the hosted commands are transmitted to the vehicle 1535. The portion of the payload on the vehicle utilized by the host user is then reconfigured by using the host commands 1540. Also, the portion of the payload on the vehicle utilized by the hosted user is reconfigured by using the hosted commands 1545. Then, the method ends 1550.

FIG. 16 is a diagram showing an exemplary script 1600 for inband telemetry for the hosted user, in accordance with at least one embodiment of the present disclosure. In particular, this exemplary script 1600 may be used for the inband telemetry for the hosted user as shown in the system of FIG. 2 and the method of FIGS. 3A-3D (e.g., the inband telemetry is the encrypted hosted telemetry that is transmitted 297 within a hosted telemetry signal, utilizing an inband frequency band(s), by the payload antenna 280 to a hosted receiving antenna 290).

In this figure, the script 1600 is shown to run for a duration of time that is equal to the master cycle time of N milliseconds (msec), and the script 1600 is repeated within the hosted telemetry signal. The script 1600 may be transmitted on a single stream modulated onto a spectrum monitoring system 1 (SMS1) signal. The inband telemetry data may be encoded for security.

Referring to the script 1600, the script 1600 begins with a start/sync signal minor frame start 1610. Then, the SMS1 master script 1620 begins. Then, the SMS1 spectrum monitoring configuration scripts 1630, which monitor the various portions of the payload that are configured for the hosted user, run. Then, the hosted fixed time collection scripts 1640, which collect the telemetry from the various portions of the payload that are configured for the hosted user for a fixed amount of time, run.

Then, the hosted stream switch, subchannel power (SCP), limiter, subchannel automatic level control (SALC), subchannel gain (SCG) collection scripts 1650 run. These scripts 1650 collect telemetry data regarding the switching configuration, SCP, limiter configuration, SALC, and SCG. These scripts 1650 repeat in a loop of Y number of times.

Then, the analog spectrum monitoring configuration (ASMS)/analog random access memory (ANARAM) collection scripts run 1660. These scripts 1660 collect telemetry data regarding the ASMS and the ANARAM.

Then, the SMS1 collection script start/sync signal minor frame ends 1670. It should be noted that the monitoring of each different type of telemetry data (e.g., switching configuration, SCP, limiter configuration, SALC, SCG, ASMS and ANARAM) may have an associated refresh rate and may have an associated number of times it is repeated during the script master cycle time of N msec.

FIG. 17 is a diagram showing an exemplary script 1700 for inband telemetry for the host user, in accordance with at least one embodiment of the present disclosure. In particular, this exemplary script 1700 may be used for the inband telemetry for the host user as shown in the system of FIG. 4 and the method of FIGS. 5A-5D (e.g., the inband telemetry is the encrypted host telemetry that is transmitted 497 within a host telemetry signal, utilizing an inband frequency band(s), by the payload antenna 480 to a hosted receiving antenna 485).

In this figure, the script 1700 is shown to run for a duration of time that is equal to the master cycle time of M milliseconds (msec), and the script 1700 is repeated within the host telemetry signal. The script 1700 may be transmitted on a single stream modulated onto a spectrum monitoring system 1 (SMS1) signal. The inband telemetry data may be encoded for security.

Referring to the script 1700, the script 1700 begins with a start/sync signal minor frame start 1710. Then, the SMS1 master script 1720 begins. Then, the SMS1 spectrum monitoring configuration scripts 1730, which monitor the various portions of the payload that are configured for the host user, run. Then, the host fixed time collection scripts 1740, which collect the telemetry from the various portions of the payload that are configured for the host user for a fixed amount of time, run.

Then, the host stream switch, SCP, limiter, SALC, SCG collection scripts 1750 run. These scripts 1750 collect telemetry data regarding the switching configuration, SCP, limiter configuration, SALC, and SCG. These scripts 1750 repeat in a loop of X number of times.

Then, the ASMS/ANARAM collection scripts run 1760. These scripts 1760 collect telemetry data regarding the ASMS and the ANARAM.

Then, the SMS1 collection script start/sync signal minor frame ends 1770. It should be noted that the monitoring of each different type of telemetry data (e.g., switching configuration, SCP, limiter configuration, SALC, SCG, ASMS and the ANARAM) may have an associated refresh rate and may have an associated number of times it is repeated during the script master cycle time of M msec.

FIG. 18 is a diagram showing an exemplary script 1800 for inband telemetry for the host user and the hosted user, in accordance with at least one embodiment of the present disclosure. In particular, this exemplary script 1800 may be used for the inband telemetry for the host user and the hosted user as shown in the system of FIG. 6 and the method of FIGS. 7A-7D (e.g., the inband telemetry is: (1) the encrypted host telemetry that is transmitted 697 within a host/hosted telemetry signal, utilizing an inband frequency band(s), by the payload antenna 680 to a host receiving antenna 685, and (2) the encrypted hosted telemetry that is transmitted 696 within the host/hosted telemetry signal, utilizing the inband frequency band(s), by the payload antenna 680 to a hosted receiving antenna 690).

In this figure, the script 1800 is shown to run for a duration of time that is equal to the master cycle time of Z milliseconds (msec), and the script 1800 is repeated within the host/hosted telemetry signal. The script 1800 may be transmitted on a single stream modulated onto a spectrum monitoring system 1 (SMS1) signal. The inband telemetry data may be encoded for security. Referring to the script 1800, the script 1800 begins with a start/sync signal minor frame start 1810. Then, the SMS1 master script 1820 begins. Then, the SMS1 spectrum monitoring configuration scripts 1830, which monitor the various portions of the payload that are configured for the host user and the hosted user, run. Then, the host fixed time collection scripts 1840, which collect the telemetry from the various portions of the payload that are configured for the host user for a fixed amount of time, run.

Then, the host stream switch, SCP, limiter, SALC, SCG collection scripts 1850 run. These scripts 1850 collect telemetry data regarding the switching configuration, SCP, limiter configuration, SALC, and SCG. These scripts 1850 repeat in a loop of X number of times.

Then, the hosted fixed time collection scripts 1860, which collect the telemetry from the various portions of the payload that are configured for the hosted user for a fixed amount of time, run.

Then, the hosted stream switch, SCP, limiter, SALC, SCG collection scripts 1870 run. These scripts 1870 collect telemetry data regarding the switching configuration, SCP, limiter configuration, SALC, and SCG. These scripts 1870 repeat in a loop of Y number of times.

Then, the analog spectrum monitoring configuration (ASMS)/analog random access memory (ANARAM) collection scripts run 1880. These scripts 1880 collect telemetry data regarding the ASMS and the ANARAM.

Then, the SMS1 collection script start/sync signal minor frame ends 1890. It should be noted that the monitoring of each different type of telemetry data (e.g., switching configuration, SCP, limiter configuration, SALC, SCG, ASMS and ANARAM) may have an associated refresh rate and may have an associated number of times it is repeated during the script master cycle time of Z msec.

FIG. 19 is a diagram 1900 showing two exemplary scripts (Script 1 and Script 2) for inband telemetry for the host user and the hosted user, in accordance with at least one embodiment of the present disclosure. In particular, exemplary Script 1 may be used for the inband telemetry for the host user as shown in the system of FIG. 6 and the method of FIGS. 7A-7D (e.g., the inband telemetry the encrypted host telemetry that is transmitted 697 within a host telemetry signal, utilizing an inband frequency band(s), by the payload antenna 680 to a host receiving antenna 685). And, exemplary Script 2 may be used for the inband telemetry for the hosted user as shown in the system of FIG. 6 and the method of FIGS. 7A-7D (e.g., the inband telemetry is the encrypted hosted telemetry that is transmitted 696 within a hosted telemetry signal, utilizing the inband frequency band(s), by the payload antenna 680 to a hosted receiving antenna 690).

In this figure, the Script 1 is shown to run for a duration of time that is equal to the master cycle time of N milliseconds (msec), and Script 1 is repeated within the host telemetry signal. Script 1 may be transmitted on a single stream modulated onto a spectrum monitoring system 1 (SMS1) signal. The inband telemetry data may be encoded for security.

Also in this figure, the Script 2 is shown to run for a duration of time that is equal to the master cycle time of M milliseconds (msec), and Script 2 is repeated within the hosted telemetry signal. Script 2 may be transmitted on a single stream modulated onto a spectrum monitoring system 2 (SMS2) signal. The inband telemetry data may be encoded for security.

Referring to Script 1, the Script 1 starts 1910. Then, the spectrum monitoring configuration scripts 1920, which monitor the various portions of the payload that are configured for the host user, run. Then, the host telemetry collection scripts 1930, which collect the telemetry from the various portions of the payload that are configured for the host user, run. These scripts 1930 may collect telemetry relating to the switching configuration, SCP, limiter configuration, SALC, SCG, ASMS, and ANARAM. These scripts 1930 may repeat in a loop X number of times. Then, Script 1 ends 1940. It should be noted that the monitoring of each different type of telemetry data (e.g., switching configuration, SCP, limiter configuration, SALC, SCG, ASMS and the ANARAM) may have an associated refresh rate and may have an associated number of times it is repeated during the script master cycle time of N msec.

Referring to Script 2, the Script 2 starts 1950. Then, the spectrum monitoring configuration scripts 1960, which monitor the various portions of the payload that are configured for the hosted user, run. Then, the hosted telemetry collection scripts 1970, which collect the telemetry from the various portions of the payload that are configured for the hosted user, run. These scripts 1970 may collect telemetry relating to the switching configuration, SCP, limiter configuration, SALC, SCG, ASMS, and ANARAM. These scripts 1970 may repeat in a loop Y number of times. Then, Script 2 ends 1980. It should be noted that the monitoring of each different type of telemetry data (e.g., switching configuration, SCP, limiter configuration, SALC, SCG, ASMS and the ANARAM) may have an associated refresh rate and may have an associated number of times it is repeated during the script master cycle time of M msec.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accord-

We claim:

1. A method for a virtual transponder utilizing inband telemetry, the method comprising:
   receiving, by a host spacecraft operations center (SOC), encrypted hosted commands from a hosted payload (HoP) operation center (HOC);
   transmitting, by the host SOC, encrypted host commands and the encrypted hosted commands to a vehicle, wherein the encrypted host commands are encrypted utilizing a first communication security (COMSEC) variety and the encrypted hosted commands are encrypted utilizing a second COMSEC variety;
   decrypting, by a first communication security module on the vehicle, the encrypted host commands utilizing the first COMSEC variety to generate unencrypted host commands;
   decrypting, by a second communication security module on the vehicle, the encrypted hosted commands utilizing the second COMSEC variety to generate unencrypted hosted commands;
   reconfiguring a payload on the vehicle according to at least one of the unencrypted host commands or the unencrypted hosted commands;
   transmitting, by a payload antenna on the vehicle, payload data to at least one of a host receiving antenna or a hosted receiving antenna;
   encrypting, by the first communication security module, unencrypted host telemetry from the payload by utilizing the first COMSEC variety to generate encrypted host telemetry;
   encrypting, by the second communication security module, unencrypted hosted telemetry from the payload by utilizing the second COMSEC variety to generate encrypted hosted telemetry;
   transmitting, by a host telemetry transmitter on the vehicle, the encrypted host telemetry to the host SOC;
   transmitting, by the payload antenna, the encrypted hosted telemetry to the HOC, via the hosted receiving antenna.

2. The method of claim 1, wherein the reconfiguring of the payload according to at least one of the unencrypted host commands or the unencrypted hosted commands comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

3. The method of claim 1, wherein the reconfiguring of the payload according to at least one of the unencrypted host commands or the unencrypted hosted commands comprises reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

4. The method of claim 1, wherein the vehicle is an airborne vehicle.

5. The method of claim 4, wherein the airborne vehicle is one of satellite, aircraft, unmanned aerial vehicle (UAV), or space plane.

6. The method of claim 1, wherein the method further comprises:
   encrypting, by the host SOC, the unencrypted host commands by utilizing the first COMSEC variety to produce the encrypted host commands; and
   encrypting, by the HOC, the unencrypted hosted commands by utilizing the second COMSEC variety to produce the encrypted hosted commands.

7. The method of claim 1, wherein the method further comprises:
   receiving, by a host command receiver on the vehicle, the encrypted host commands;
   receiving, by a hosted command receiver on the vehicle, the encrypted hosted commands;
   transmitting, by the host command receiver, the encrypted host commands to the first communication security module; and
   transmitting, by the hosted command receiver, the encrypted hosted commands to the second communication security module.

8. The method of claim 1, wherein the method further comprises:
   transmitting, by the first communication security module, the unencrypted host commands to the payload; and
   transmitting, by the second communication security module, the unencrypted hosted commands to the payload.

9. The method of claim 1, wherein the method further comprises:
   transmitting, by the payload, to the first communication security module the unencrypted host telemetry; and
   transmitting, by the payload, to the second communication security module the unencrypted hosted telemetry.

10. The method of claim 1, wherein the method further comprises:
    transmitting, by the first communication security module, the encrypted host telemetry to a host telemetry transmitter; and
    transmitting, by the second communication security module, the encrypted hosted telemetry to the payload.

11. The method of claim 1, wherein the method further comprises:
    decrypting, by the host SOC, the encrypted host telemetry utilizing the first COMSEC variety to generate the unencrypted host telemetry; and
    decrypting, by the HOC, the encrypted hosted telemetry utilizing the second COMSEC variety to generate the unencrypted hosted telemetry.

12. A method for a virtual transponder utilizing inband telemetry, the method comprising:
    receiving, by a host spacecraft operations center (SOC), encrypted hosted commands from a hosted payload (HoP) operation center (HOC);
    transmitting, by the host SOC, encrypted host commands and the encrypted hosted commands to a vehicle, wherein the encrypted host commands are encrypted utilizing a first communication security (COMSEC) variety and the encrypted hosted commands are encrypted utilizing a second COMSEC variety;
    decrypting, by a first communication security module on the vehicle, the encrypted host commands utilizing the first COMSEC variety to generate unencrypted host commands;
    decrypting, by a second communication security module on the vehicle, the encrypted hosted commands utilizing the second COMSEC variety to generate unencrypted hosted commands;

reconfiguring a payload on the vehicle according to at least one of the unencrypted host commands or the unencrypted hosted commands;
transmitting, by a payload antenna on the vehicle, payload data to at least one of a host receiving antenna or a hosted receiving antenna;
encrypting, by the first communication security module, unencrypted host telemetry from the payload by utilizing the first COMSEC variety to generate encrypted host telemetry;
encrypting, by the second communication security module, unencrypted hosted telemetry from the payload by utilizing the second COMSEC variety to generate encrypted hosted telemetry;
transmitting, by the payload antenna, the encrypted host telemetry to the host SOC, via the host receiving antenna;
transmitting, by a hosted telemetry transmitter on the vehicle, the encrypted hosted telemetry to the host SOC; and
transmitting, by the host SOC, the encrypted hosted telemetry to the HOC.

13. The method of claim 12, wherein the reconfiguring of the payload according to at least one of the unencrypted host commands or the unencrypted hosted commands comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

14. The method of claim 12, wherein the reconfiguring of the payload according to at least one of the unencrypted host commands or the unencrypted hosted commands comprises reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

15. The method of claim 12, wherein the vehicle is an airborne vehicle.

16. The method of claim 15, wherein the airborne vehicle is one of satellite, aircraft, unmanned aerial vehicle (UAV), or space plane.

17. A method for a virtual transponder utilizing inband telemetry, the method comprising:
receiving, by a host spacecraft operations center (SOC), encrypted hosted commands from a hosted payload (HoP) operation center (HOC);
transmitting, by the host SOC, encrypted host commands and the encrypted hosted commands to a vehicle, wherein the encrypted host commands are encrypted utilizing a first communication security (COMSEC) variety and the encrypted hosted commands are encrypted utilizing a second COMSEC variety;
decrypting, by a first communication security module on the vehicle, the encrypted host commands utilizing the first COMSEC variety to generate unencrypted host commands;
decrypting, by a second communication security module on the vehicle, the encrypted hosted commands utilizing the second COMSEC variety to generate unencrypted hosted commands;
reconfiguring a payload on the vehicle according to at least one of the unencrypted host commands or the unencrypted hosted commands;
transmitting, by a payload antenna on the vehicle, payload data to at least one of a host receiving antenna or a hosted receiving antenna;
encrypting, by the first communication security module, unencrypted host telemetry from the payload by utilizing the first COMSEC variety to generate encrypted host telemetry;
encrypting, by the second communication security module, unencrypted hosted telemetry from the payload by utilizing the second COMSEC variety to generate encrypted hosted telemetry;
transmitting, by the payload antenna, the encrypted host telemetry to the host SOC, via the host receiving antenna;
transmitting, by the payload antenna, the encrypted hosted telemetry to the HOC, via the hosted receiving antenna.

18. The method of claim 17, wherein the reconfiguring of the payload according to at least one of the unencrypted host commands or the unencrypted hosted commands comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

19. The method of claim 17, wherein the reconfiguring of the payload according to at least one of the unencrypted host commands or the unencrypted hosted commands comprises reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

20. The method of claim 17, wherein the vehicle is an airborne vehicle.

21. A method for a virtual transponder utilizing inband telemetry, the method comprising:
receiving, by a host spacecraft operations center (SOC), encrypted hosted commands from a hosted payload (HoP) operation center (HOC);
transmitting, by the host SOC, encrypted host commands and the encrypted hosted commands to a vehicle;
decrypting, by a first communication security module, the encrypted host commands utilizing a first communication security (COMSEC) variety to generate unencrypted host commands;
decrypting, by a second communication security module, the encrypted hosted commands utilizing a second COMSEC variety to generate unencrypted hosted commands;
reconfiguring the payload according to at least one of the unencrypted host commands or the unencrypted hosted commands;
transmitting, by a payload antenna on the vehicle, payload data to at least one of a host receiving antenna or a hosted receiving antenna;
encrypting, by the first communication security module, unencrypted telemetry utilizing the first COMSEC variety to generate encrypted telemetry;

transmitting, by the payload antenna, the encrypted telemetry to the host SOC, via the host receiving antenna;

transmitting, by the payload antenna, the encrypted telemetry to the HOC, via the hosted receiving antenna.

22. The method of claim 21, wherein the reconfiguring of the payload according to at least one of the unencrypted host commands or the unencrypted hosted commands comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

23. The method of claim 21, wherein the reconfiguring of the payload according to at least one of the unencrypted host commands or the unencrypted hosted commands comprises reconfiguring at least one of: at least one antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

24. The method of claim 21, wherein the vehicle is an airborne vehicle.

25. A method for a virtual transponder utilizing inband telemetry, the method comprising:

receiving, by a host spacecraft operations center (SOC), encrypted hosted commands from a hosted payload (HoP) operation center (HOC);

transmitting, by the host SOC, encrypted host commands and the encrypted hosted commands to a vehicle, wherein the encrypted host commands are encrypted utilizing a first communication security (COMSEC) variety and the encrypted hosted commands are encrypted utilizing a second COMSEC variety;

decrypting, by a first communication security module on the vehicle, the encrypted host commands utilizing the first COMSEC variety to generate unencrypted host commands;

decrypting, by a second communication security module on the vehicle, the encrypted hosted commands utilizing the second COMSEC variety to generate unencrypted hosted commands;

reconfiguring a payload on the vehicle according to at least one of the unencrypted host commands or the unencrypted hosted commands;

transmitting, by a payload antenna on the vehicle, payload data to at least one of a host receiving antenna or a hosted receiving antenna;

encrypting, by the first communication security module, unencrypted host telemetry from the payload by utilizing the first COMSEC variety to generate encrypted host telemetry;

encrypting, by the second communication security module, unencrypted hosted telemetry from the payload by utilizing the second COMSEC variety to generate encrypted hosted telemetry;

transmitting, by a host telemetry transmitter on the vehicle, the encrypted host telemetry to the host SOC;

transmitting, by the payload antenna, the encrypted hosted telemetry to the host SOC, via the host receiving antenna; and transmitting, by the host SOC, the encrypted hosted telemetry to the HOC.

26. A method for a virtual transponder utilizing inband telemetry, the method comprising:

receiving, by a host spacecraft operations center (SOC), encrypted hosted commands from a hosted payload (HoP) operation center (HOC);

transmitting, by the host SOC, encrypted host commands and the encrypted hosted commands to a vehicle, wherein the encrypted host commands are encrypted utilizing a first communication security (COMSEC) variety and the encrypted hosted commands are encrypted utilizing a second COMSEC variety;

decrypting, by a first communication security module on the vehicle, the encrypted host commands utilizing the first COMSEC variety to generate unencrypted host commands;

decrypting, by a second communication security module on the vehicle, the encrypted hosted commands utilizing the second COMSEC variety to generate unencrypted hosted commands;

reconfiguring a payload on the vehicle according to at least one of the unencrypted host commands or the unencrypted hosted commands;

transmitting, by a payload antenna on the vehicle, payload data to at least one of a host receiving antenna or a hosted receiving antenna;

encrypting, by the first communication security module, unencrypted host telemetry from the payload by utilizing the first COMSEC variety to generate encrypted host telemetry;

encrypting, by the second communication security module, unencrypted hosted telemetry from the payload by utilizing the second COMSEC variety to generate encrypted hosted telemetry;

transmitting, by the payload antenna, the encrypted host telemetry and the encrypted hosted telemetry to the host SOC, via the host receiving antenna; and transmitting, by the host SOC, the encrypted hosted telemetry to the HOC.

27. A method for a virtual transponder utilizing inband telemetry, the method comprising:

receiving, by a host spacecraft operations center (SOC), encrypted hosted commands from a hosted payload (HoP) operation center (HOC);

transmitting, by the host SOC, encrypted host commands and the encrypted hosted commands to a vehicle;

decrypting, by a first communication security module, the encrypted host commands utilizing a first communication security (COMSEC) variety to generate unencrypted host commands;

decrypting, by a second communication security module, the encrypted hosted commands utilizing a second COMSEC variety to generate unencrypted hosted commands;

reconfiguring the payload according to at least one of the unencrypted host commands or the unencrypted hosted commands;

transmitting, by a payload antenna on the vehicle, payload data to at least one of a host receiving antenna or a hosted receiving antenna;

encrypting, by the first communication security module, unencrypted telemetry utilizing the first COMSEC variety to generate encrypted telemetry;

transmitting, by the payload antenna, the encrypted telemetry to the host SOC, via the host receiving antenna; and transmitting, by the host SOC, the encrypted telemetry to the HOC.

\* \* \* \* \*